US012564959B1

(12) United States Patent
Kaufman et al.

(10) Patent No.: US 12,564,959 B1
(45) Date of Patent: Mar. 3, 2026

(54) CONTROLLING ROBOTIC DEVICES BASED ON PROXIMITY DETECTION

(71) Applicant: Amazon Technologies, Inc., Seattle, WA (US)

(72) Inventors: Seth R Kaufman, Arlington, MA (US); Wesley Roy Connell, Melrose, MA (US); Siva Aduri, Stoneham, MA (US); Joshua Zarr, Nashua, NH (US); Shaun Hayward, Waltham, MA (US)

(73) Assignee: Amazon Technologies, Inc., Seattle, WA (US)

( * ) Notice: Subject to any disclaimer, the term of this patent is extended or adjusted under 35 U.S.C. 154(b) by 204 days.

(21) Appl. No.: 18/123,587

(22) Filed: Mar. 20, 2023

(51) Int. Cl.
| | |
|---|---|
| *B25J 9/00* | (2006.01) |
| *B25J 9/16* | (2006.01) |
| *B25J 13/00* | (2006.01) |
| *B25J 13/08* | (2006.01) |
| *B25J 19/06* | (2006.01) |
| *B65G 47/90* | (2006.01) |

(52) U.S. Cl.
CPC ............. *B25J 9/1666* (2013.01); *B25J 9/161* (2013.01); *B25J 13/006* (2013.01); *B25J 13/086* (2013.01); *B25J 19/06* (2013.01); *B65G 47/905* (2013.01)

(58) Field of Classification Search
CPC ........ B25J 9/1666; B25J 9/161; B25J 13/006; B25J 13/086; B25J 19/06; B65G 47/905
See application file for complete search history.

(56) References Cited

U.S. PATENT DOCUMENTS

| | | | |
|---|---|---|---|
| 5,382,948 | A | 1/1995 | Richmond |
| 6,166,371 | A | 12/2000 | Milbrath et al. |

(Continued)

FOREIGN PATENT DOCUMENTS

| | | | | | |
|---|---|---|---|---|---|
| CA | 3025297 | C | * 9/2019 | .......... | B65G 1/0407 |
| CN | 101517622 | A | 8/2009 | | |

(Continued)

OTHER PUBLICATIONS

WO2024116221A1 (Year: 2024).*

(Continued)

*Primary Examiner* — Ramon A. Mercado
*Assistant Examiner* — Shaheda Shabnam Hoque
(74) *Attorney, Agent, or Firm* — Kilpatrick Townsend & Stockton LLP

(57) ABSTRACT

Techniques for controlling motion of physical, moving devices within a robotic work cell of an inventory system are disclosed. A user device (e.g., a wearable device) can be used within the workspace to transmit wireless signals. One of these signals can be received by one or more receiving devices associated with the robotic work cell. A proximity monitoring engine can transmit notification data to a machine controller while the signal is being received. Transmitting the notification data may cause the machine controller to execute instructions to halt motion of the robotic device (and/or other moving devices associated with the robotic work cell). The devices of the robotic work cell may remain in a halted state while the signal continues to be received. When the signal is no longer being received, the devices of the robotic work cell may be instructed to resume motion.

19 Claims, 15 Drawing Sheets

(56) References Cited

U.S. PATENT DOCUMENTS

| | | | |
|---|---|---|---|
| 6,445,979 B1 * | 9/2002 | Inoue | B25J 9/1684 |
| | | | 700/255 |
| 8,280,547 B2 | 10/2012 | D'Andrea et al. | |
| 8,412,400 B2 | 4/2013 | D'Andrea et al. | |
| 8,504,202 B2 | 8/2013 | Ichinose et al. | |
| 8,538,692 B2 | 9/2013 | Wurman et al. | |
| 8,606,392 B2 | 12/2013 | Wurman et al. | |
| 8,884,739 B2 | 11/2014 | Shimomura | |
| 8,930,133 B2 | 1/2015 | Wurman et al. | |
| 9,070,275 B1 | 6/2015 | Green et al. | |
| 9,073,736 B1 | 7/2015 | Hussain et al. | |
| 9,087,314 B2 | 7/2015 | Hoffman et al. | |
| 9,104,271 B1 | 8/2015 | Adams et al. | |
| 9,607,285 B1 | 3/2017 | Wellman | |
| 9,881,277 B2 * | 1/2018 | Brady | G06Q 10/087 |
| 10,081,106 B2 | 9/2018 | Rublee et al. | |
| 10,209,711 B1 * | 2/2019 | Brazeau | G05D 1/0088 |
| 10,224,758 B2 * | 3/2019 | Leabman | H02J 50/10 |
| 10,248,120 B1 | 4/2019 | Siegel et al. | |
| 10,255,582 B2 | 4/2019 | Shydo, Jr. et al. | |
| 10,347,369 B1 | 7/2019 | Dudzinski et al. | |
| 10,387,032 B2 | 8/2019 | Lane et al. | |
| 10,419,886 B2 | 9/2019 | Yang et al. | |
| 10,607,132 B1 | 3/2020 | Dietz et al. | |
| 11,113,777 B1 | 9/2021 | Aggarwal et al. | |
| 11,126,944 B1 | 9/2021 | Aggarwal et al. | |
| 11,449,052 B1 | 9/2022 | Kaufman et al. | |
| 11,513,530 B1 * | 11/2022 | Kaufman | H04W 12/08 |
| 11,675,878 B1 | 6/2023 | Pandya et al. | |
| 11,919,172 B1 * | 3/2024 | Ebrahimi Afrouzi | B25J 9/163 |
| 2005/0077085 A1 | 4/2005 | Zeller et al. | |
| 2007/0290040 A1 | 12/2007 | Wurman et al. | |
| 2007/0293978 A1 | 12/2007 | Wurman et al. | |
| 2008/0051984 A1 | 2/2008 | Wurman et al. | |
| 2008/0051985 A1 | 2/2008 | D'Andrea et al. | |
| 2008/0309345 A1 | 12/2008 | Zeller et al. | |
| 2009/0043462 A1 | 2/2009 | Stratton et al. | |
| 2009/0109049 A1 | 4/2009 | Frederick et al. | |
| 2009/0256751 A1 | 10/2009 | Zeller et al. | |
| 2010/0096490 A1 | 4/2010 | Gordon | |
| 2010/0219835 A1 | 9/2010 | Wentworth | |
| 2010/0271009 A1 | 10/2010 | Zeller et al. | |
| 2011/0010023 A1 | 1/2011 | Kunzig et al. | |
| 2011/0062959 A1 | 3/2011 | Zeller et al. | |
| 2011/0093134 A1 | 4/2011 | Emanuel et al. | |
| 2011/0232972 A1 | 9/2011 | McQueen et al. | |
| 2012/0151339 A1 | 6/2012 | Zhang et al. | |
| 2012/0235579 A1 | 9/2012 | Chemel et al. | |
| 2012/0239224 A1 | 9/2012 | McCabe et al. | |
| 2013/0038320 A1 | 2/2013 | Frederick | |
| 2013/0275045 A1 | 10/2013 | Tsujimoto et al. | |
| 2013/0302132 A1 | 11/2013 | D'Andrea | |
| 2013/0304253 A1 | 11/2013 | Wurman et al. | |
| 2013/0314503 A1 | 11/2013 | Nix et al. | |
| 2013/0317642 A1 | 11/2013 | Asaria et al. | |
| 2014/0070934 A1 | 3/2014 | Chau et al. | |
| 2014/0100998 A1 | 4/2014 | Mountz et al. | |
| 2014/0100999 A1 | 4/2014 | Mountz et al. | |
| 2015/0066283 A1 | 3/2015 | Wurman et al. | |
| 2015/0073589 A1 | 3/2015 | Khodl et al. | |
| 2015/0334582 A1 * | 11/2015 | Liu | H04W 4/023 |
| | | | 370/254 |
| 2015/0353280 A1 | 12/2015 | Brazeau et al. | |
| 2016/0121487 A1 | 5/2016 | Mohan et al. | |
| 2016/0129917 A1 | 5/2016 | Gariepy et al. | |
| 2016/0259061 A1 | 9/2016 | Carter | |
| 2016/0271800 A1 | 9/2016 | Stubbs et al. | |
| 2017/0244659 A1 * | 8/2017 | Muthukrishnan | H04L 51/214 |
| 2017/0278051 A1 * | 9/2017 | Cohn | G06Q 10/087 |
| 2017/0334644 A1 * | 11/2017 | Otto | B66F 9/12 |
| 2017/0334696 A1 | 11/2017 | Otto et al. | |
| 2017/0344023 A1 | 11/2017 | Laubinger et al. | |
| 2018/0039402 A1 | 2/2018 | Lane et al. | |
| 2018/0053141 A1 | 2/2018 | Shydo, Jr. | |
| 2018/0062328 A1 | 3/2018 | Westbury | |

| | | | |
|---|---|---|---|
| 2018/0143321 A1 | 5/2018 | Skowronek et al. | |
| 2019/0013960 A1 | 1/2019 | Sadwick | |
| 2019/0089193 A1 | 3/2019 | Ranjan et al. | |
| 2019/0105779 A1 * | 4/2019 | Einav | B25J 9/1689 |
| 2019/0176323 A1 | 6/2019 | Coady et al. | |
| 2019/0196488 A1 * | 6/2019 | Holmberg | G05D 1/0225 |
| 2019/0226266 A1 | 7/2019 | Eslami et al. | |
| 2019/0381223 A1 | 12/2019 | Culbert et al. | |
| 2020/0066054 A1 | 2/2020 | Yin et al. | |
| 2020/0206928 A1 * | 7/2020 | Denenberg | G01S 17/04 |
| 2020/0301432 A1 | 9/2020 | Bose et al. | |
| 2021/0064035 A1 * | 3/2021 | Park | G05D 1/0223 |
| 2021/0065107 A1 | 3/2021 | Jajula | |
| 2021/0069906 A1 * | 3/2021 | Vu | B25J 9/1666 |
| 2022/0274269 A1 * | 9/2022 | Fan | B25J 13/086 |

FOREIGN PATENT DOCUMENTS

| | | | | | |
|---|---|---|---|---|---|
| CN | 108064212 | A | | 5/2018 | |
| CN | 209526452 | U | * | 10/2019 | |
| DE | 102015116510 | A1 | * | 3/2017 | |
| GB | 2112350 | A | * | 7/1983 | B25J 18/02 |
| JP | 1124750 | A | | 1/1999 | |
| JP | 2001129776 | A | * | 5/2001 | B25J 9/1684 |
| JP | 2010023183 | A | | 2/2010 | |
| JP | 2017024097 | A | * | 2/2017 | B25J 9/1674 |
| JP | 7505791 | B2 | * | 6/2024 | B25J 9/1676 |
| KR | 101450843 | B1 | * | 10/2014 | B25J 11/002 |
| WO | WO-0134336 | A1 | * | 5/2001 | B23K 9/1276 |
| WO | 201835295 | A1 | | 2/2018 | |
| WO | WO-2018022265 | A1 | * | 2/2018 | B25J 19/023 |
| WO | WO-2019140706 | A1 | * | 7/2019 | F41A 29/00 |
| WO | WO-2024116221 | A1 | * | 6/2024 | |

OTHER PUBLICATIONS

C. Bererton and P. K. Khosla, "Towards a team of robots with reconfiguration and repair capabilities," Proceedings 2001 ICRA. IEEE International Conference on Robotics and Automation (Cat. No.01CH37164), Seoul, Korea (South), 2001, pp. 2923-2928 vol. 3 (Year: 2001).*

U.S. Appl. No. 17/853,118, "Light Activated Access Control Techniques", filed Jun. 29, 2022.

U.S. Appl. No. 17/951,689, "Operational Planning Techniques Using Vision-Based Entity Localization", filed Sep. 23, 2022.

Non-Final Office Action, U.S. Appl. No. 14/660,247, 39 pages, Jul. 29, 2016.

Notice of Allowance, U.S. Appl. No. 14/660,247, 14 pages, Dec. 2, 2016.

PCT/US2017/047296, "International Search Report and Written Opinion", Nov. 20, 2017, 12 pages.

Non-Final Office Action, U.S. Appl. No. 15/450,692, 15 pages, Nov. 1, 2018.

Notice of Allowance, U.S. Appl. No. 15/240,938, 10 pages, Nov. 28, 2018.

PCT/US2017/047296, "International Preliminary Report on Patentability", Feb. 28, 2019, 8 pages.

Notice of Allowance, U.S. Appl. No. 15/450,692, 16 pages, Mar. 19, 2019.

Non-Final Office Action, U.S. Appl. No. 16/406,424, 32 pages, Feb. 1, 2022.

Durocher, et al., An Overview of Remote Isolation Systems Applied in Process Industries, IEEE Transactions on Industry Applications, vol. 53, No. 4, 6 pages, Aug. 2017.

United States Department of Labor Occupational Safety and Health Administration, OSHA Fact Sheet, 2 pages, 2002.

Notice of Allowance, U.S. Appl. No. 16/406,424, 7 pages, May 20, 2022.

Notice of Allowance, U.S. Appl. No. 16/406,424, 7 pages, Aug. 4, 2022.

Du et al., "Active Collision Avoidance for Human-robot Interaction With Ukf, Expert System, and Artificial Potential Field Method",

(56) References Cited

OTHER PUBLICATIONS

Frontiers in Robotics and AI, vol. 5, No. 125, Nov. 6, 2018, 11 pages.

* cited by examiner

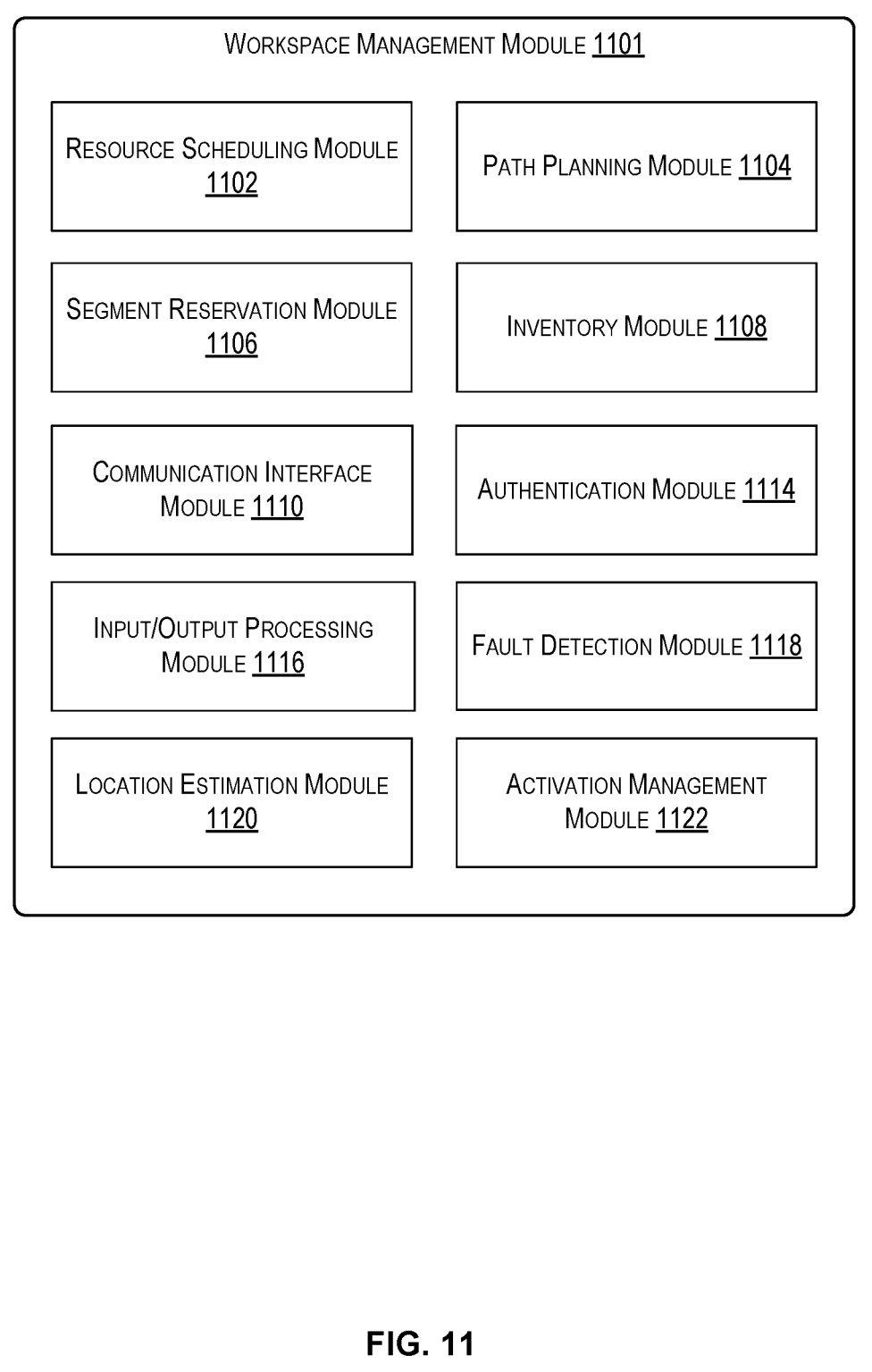

WORKSPACE MANAGEMENT MODULE 1101

RESOURCE SCHEDULING MODULE 1102

PATH PLANNING MODULE 1104

SEGMENT RESERVATION MODULE 1106

INVENTORY MODULE 1108

COMMUNICATION INTERFACE MODULE 1110

AUTHENTICATION MODULE 1114

INPUT/OUTPUT PROCESSING MODULE 1116

FAULT DETECTION MODULE 1118

LOCATION ESTIMATION MODULE 1120

ACTIVATION MANAGEMENT MODULE 1122

FIG. 11

CONTROLLER MANAGEMENT MODULE 1301

PROCESSING MODULE 1302

DEVICE MANAGEMENT MODULE 1304

FEEDBACK MODULE 1306

Figure 15:
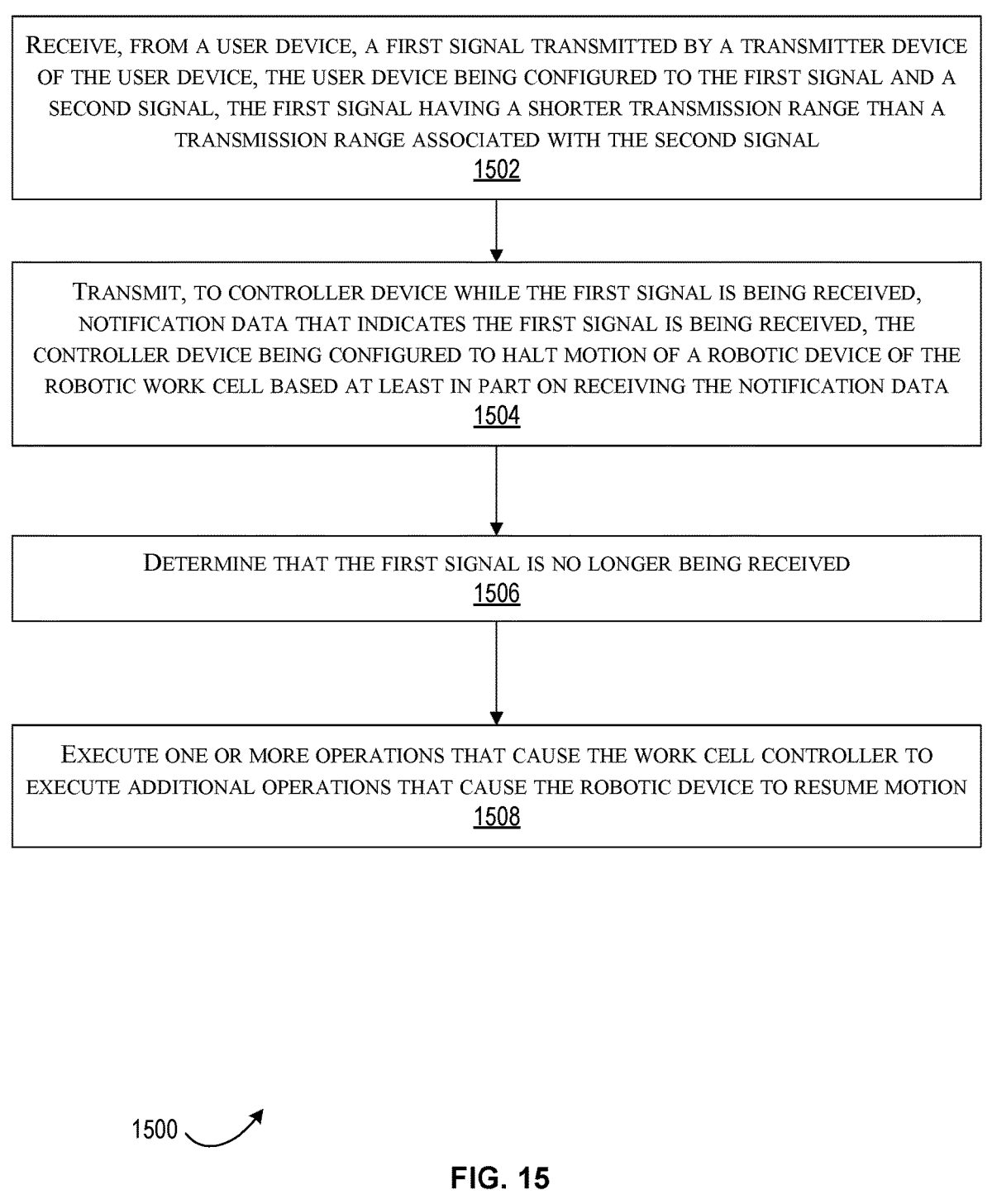

RECEIVE, FROM A USER DEVICE, A FIRST SIGNAL TRANSMITTED BY A TRANSMITTER DEVICE OF THE USER DEVICE, THE USER DEVICE BEING CONFIGURED TO THE FIRST SIGNAL AND A SECOND SIGNAL, THE FIRST SIGNAL HAVING A SHORTER TRANSMISSION RANGE THAN A TRANSMISSION RANGE ASSOCIATED WITH THE SECOND SIGNAL
1502

TRANSMIT, TO CONTROLLER DEVICE WHILE THE FIRST SIGNAL IS BEING RECEIVED, NOTIFICATION DATA THAT INDICATES THE FIRST SIGNAL IS BEING RECEIVED, THE CONTROLLER DEVICE BEING CONFIGURED TO HALT MOTION OF A ROBOTIC DEVICE OF THE ROBOTIC WORK CELL BASED AT LEAST IN PART ON RECEIVING THE NOTIFICATION DATA
1504

DETERMINE THAT THE FIRST SIGNAL IS NO LONGER BEING RECEIVED
1506

EXECUTE ONE OR MORE OPERATIONS THAT CAUSE THE WORK CELL CONTROLLER TO EXECUTE ADDITIONAL OPERATIONS THAT CAUSE THE ROBOTIC DEVICE TO RESUME MOTION
1508

CONTROLLING ROBOTIC DEVICES BASED ON PROXIMITY DETECTION

BACKGROUND

Modern inventory systems, such as those in mail order warehouses, supply chain distribution centers, airport luggage systems, and custom-order manufacturing facilities, often utilize mobile robotic devices to move items and/or storage containers within a workspace. Coordinating tasks between the various components of these systems can be cumbersome. As inventory systems grow, the challenges of simultaneously completing a large number of packing, storing, and other inventory-related tasks utilizing these components becomes non-trivial. In systems tasked with responding to large numbers of diverse task requests, inefficient utilization of system resources, including space and equipment can result in lower throughput, unacceptably long response times, an ever-increasing backlog of unfinished tasks, and, in general, poor system performance. Coordination between various components of these systems is desirable to improve efficiency and throughput.

BRIEF DESCRIPTION OF THE DRAWINGS

Various embodiments in accordance with the present disclosure will be described with reference to the drawings, in which:

FIG. 11 illustrates in greater detail the components of a particular embodiment of a workspace management module, in accordance with at least one embodiment;

FIG. 15 illustrates a flow diagram of an example method for utilizing various components of an inventory management system, in accordance with at least one embodiment.

DETAILED DESCRIPTION

Figure 1:
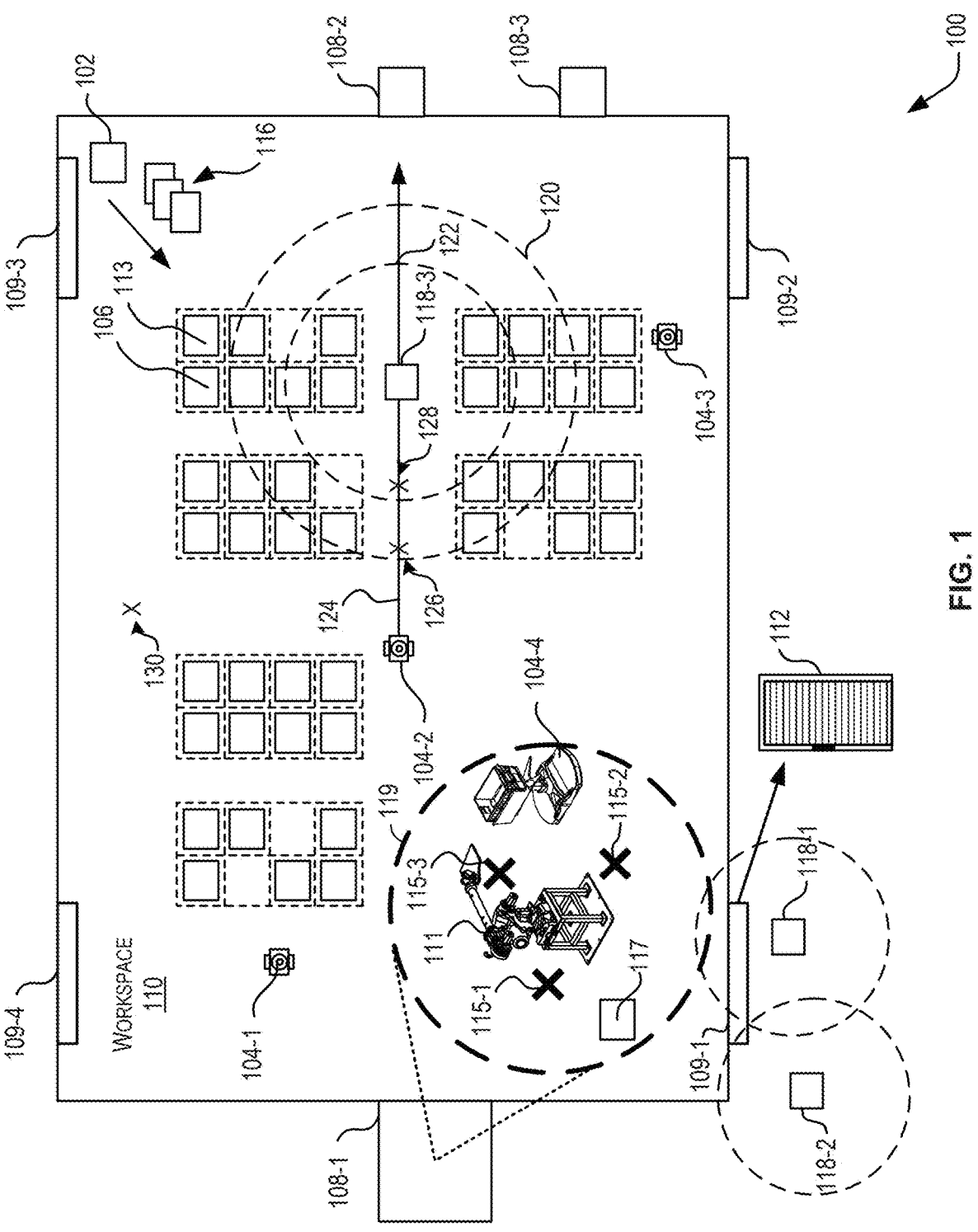
FIG. 1 is a schematic diagram illustrating an example environment suitable for implementing aspects of an inventory management system, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order so as not to obscure the embodiment being described. Although examples may be provided which include an inventory system and/or workspace, it should be appreciated that the same techniques may be applied in a variety of contexts such as mail order warehouses, supply chain distribution centers, airport luggage systems, grocery stores, and custom-order manufacturing facilities, to name a few.

Embodiments herein are directed to an inventory management system having multiple storage containers and mobile drive units (MDUs) for moving the storage containers and other items within a workspace managed by the inventory management system. The inventory management system may include one or more robotic work cells that include robotic arms, gantries, or any suitable robotic device that is configured to move items to and/or from the storage containers. A "robotic work cell" refers to an area where at least one robotic device operates within the workspace. A "robotic device" may include any suitable device that is configured to move in an automated manner from a stationary position within the workspace. As used herein, a "mobile drive unit" (MDU) may include any suitable autonomous guided vehicle that is configured to move to various locations within the workspace, or other suitable automated or semi-automated vehicle associated with an inventory management system. Access to various areas of the workspace may be restricted by the system using a variety of barrier devices (e.g., doors, gates, light curtains, etc.). A variety of user devices (e.g., handheld devices, wearable devices, etc.) may be utilized within the inventory management system. A variety of interactions may occur between components of the inventory management system. System and methods are disclosed for managing these device interactions.

In at least one embodiment, mobile drive units (MDUs) and robotic devices (e.g., robotic arms, gantry devices, etc.) may operate within the workspace in an autonomous or semi-autonomous fashion to perform a variety of tasks assigned by the inventory management system. By way of example, the MDUs may be used to move containers that are configured to store various inventory items to a robotic work cell (e.g., a workstation in which the robotic device operates) where a robotic device may be used to move the inventory items to and/or from a given container. A user may enter the workspace through any suitable number of access points. The user may wear or otherwise carry a user device (e.g., a vest) that is configured with one or more transmitters that periodically transmit one or more signals (e.g., two frequency signals of differing frequencies and having different transmission ranges). In response to receiving a signal transmitted by the user device, the robotic device and the MDUs may be configured to modify their motion within the workspace. As a non-limiting example, the robotic devices and/or MDUs may slow or stop all together when and/or while the signal(s) are received.

Conventionally, when a user needed to access the robotic work cell, a number of manual actions were required in which the user manually shut down the devices of the robotic work cell (e.g., through interaction with a button, switch, key, or other user interface). The user could utilize an interface to cause the robotic devices to halt. The user could then go about his task. Upon completion, the user would be required to once again interact with the user interface to perform additional manual actions to cause the robotic device to resume motion. This manual process required that the user being experienced and knowledgeable with respect to the manual actions required to shut down each device (e.g., the robotic device(s), other computing device, etc.) in the robotic work cell. Additionally, the manual process caused delay for the user and increased the risk of user error.

The disclosed techniques enable the signals transmitted by the user device (e.g., a vest worn by the user) to control motion of the devices within a robotic cell. In some embodiments, the same user device that may be used to access the workspace (e.g., to control barrier devices), to control motion of MDUs moving about the workspace, and to automatically control motion of various robotic and/or computing devices operating within a robotic work cell. The integration of these various devices of the workspace enable the user to perform a variety of functions within the workspace without having independent knowledge of the process of affection motion of each of the moving devices. This may result in an enhanced user experience and reduce the chance of user error over conventional techniques. By utilizing the described techniques, the efficiency of the system may be improved as the procedures for stopping/starting various moving devices within the workspace are simplified. The system may experience increased throughput and improved efficiency by reducing the chance of collisions and/or of utilizing faulty devices within the workspace that might detrimentally affect various components of the workspace.

Moving on to FIG. 1, a schematic diagram is provided that illustrates an example workspace 110 suitable for implementing aspects of an inventory management system 100, in accordance with at least one embodiment. As a non-limiting example, the inventory management system 100 may include a workspace management module 102, one or more mobile drive units (e.g., mobile drive unit 104-1, mobile drive unit 104-2, mobile drive unit 104-3, and mobile drive unit 104-4 hereinafter collectively referred to as "mobile drive units 104"), one or more storage containers 106, one or more workstations (e.g., workstations 108-1, 108-2, and 108-3, herein collectively referred to as, "workstation(s) 108") within the workspace 110, one or more access points (e.g., access point 109-1, access point 109-2, access point 109-3, access point 109-4, herein collectively referred to as "access points 109"), and one or more robotic devices (e.g., robotic device 111). In some embodiments, workstation(s) 108 may include an area for which specific tasks are performed (e.g., packing items within a shipping container, taking inventory of the items within workspace 110, managing other operators of the workspace 110, and the like).

Workspace 110 may include any suitable number of workstation(s) 108 and/or access points 109, not necessarily the number depicted in FIG. 1.

In some embodiments, the mobile drive units 104 may transport storage containers 106 between points within a workspace 110 (e.g., a warehouse, a storage facility, or the like) in response to commands communicated by workspace management module 102. While the workspace management module 102 is depicted in FIG. 1 as being separate from the mobile drive units 104, it should be appreciated that the workspace management module 102, or at least some aspects of the workspace management module 102, may be additionally or alternatively be performed by a processor of the mobile drive units 104. Within the workspace 110, each of the storage containers 106 may store one or more types of inventory items. As a result, the inventory system may be capable of moving inventory items between locations within the workspace 110 to facilitate the entry, processing, and/or removal of inventory items from inventory system and the completion of other tasks involving inventory items.

The workspace management module 102 may assign tasks to appropriate components (e.g., mobile drive units 104, various operators, etc.) of the inventory management system and coordinate operation of the various components in completing the tasks. The workspace management module 102 may select components of inventory system (e.g., one or more mobile drive units 104, one or more robotic devices such as robotic device 111, and/or one or more operators, etc.) to perform these tasks and communicate appropriate commands and/or data to the selected components and/or devices associated with the selected components to facilitate completion of these operations. In some embodiments, an operator may utilize a handheld user device such as a scanner, a smart device, or the like to receive such commands or exchange any suitable information with the workspace management module 102. Although shown in FIG. 1 as a single, discrete component, the workspace management module 102 may represent multiple components and may represent or include portions of the mobile drive units 104, robotic devices (e.g., robotic device 111), or other elements of the inventory management system.

The mobile drive units 104 may move storage containers 106 between locations within the workspace 110. The mobile drive units 104 may represent any devices or components appropriate to move (e.g., propel, pull, etc.) a storage container from one location to another within the workspace 110 based on the characteristics and configuration of the storage containers 106 and/or other elements of inventory system. In a particular embodiment of inventory system, the mobile drive units 104 represent independent, self-powered devices configured to freely move about the workspace 110. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, the mobile drive units 104 represent elements of a tracked inventory system configured to move the storage containers 106 along tracks, rails, cables, crane system, or other guidance or support elements traversing the workspace 110. In such an embodiment, the mobile drive units 104 may receive power and/or support through a connection to the guidance elements, such as a powered rail. Additionally, in particular embodiments of the inventory system, the mobile drive units 104 may be configured to utilize alternative conveyance equipment to move within the workspace 110 and/or between separate portions of the workspace 110.

Additionally, the mobile drive units 104 may be capable of communicating with the workspace management module 102 to receive information identifying selection of the storage containers 106, transmit the locations of the mobile drive units 104, or exchange any other suitable information to be used by the workspace management module 102 or the mobile drive units 104 during operation. The mobile drive units 104 may communicate with the workspace management module 102 wirelessly, using wired connections between the mobile drive units 104 and the workspace management module 102, and/or in any other appropriate manner. As one example, particular embodiments of the mobile drive unit 104 may communicate with the workspace management module 102 and/or with one another using 802.11, Bluetooth, or Infrared Data Association (IrDA) standards, or any other appropriate wireless communication protocol. As another example, in a tracked inventory system, tracks or other guidance elements upon which the mobile drive units 104 move may be wired to facilitate communication between the mobile drive units 104 and other components of the inventory system. In general, the mobile drive units 104 may be powered, propelled, and controlled in any manner appropriate based on the configuration and characteristics of the inventory system.

The robotic devices (e.g., robotic device 111) may be positioned in a stationary manner (e.g., affixed to a floor, ceiling, or wall of the workspace or other apparatus) such that the robotic device 111 does not move about the workspace. However, the robotic device 111 may move (e.g., pivot, bend, raise, lower, grasp, etc.) various sub-components from its stationary positioned in the workspace. The robotic device 111 may be capable of communicating with the workspace management module 102 to receive information identifying selection items or storage locations from which items (e.g., individual items, totes/bins/crates that store individual items, etc.) may be retrieved and/or stored, transmit statue data, or exchange any other suitable information to be used by the workspace management module 102 or the mobile drive units 104 during operation. The robotic device 111 may communicate with the workspace management module 102 wirelessly, using wired connections between the robotic device 111 and the workspace management module 102, and/or in any other appropriate manner. As one example, particular embodiments of the robotic device 111 may communicate with the workspace management module 102, with the mobile drive units, and/or with one another using 802.11, Bluetooth, or Infrared Data Association (IrDA) standards, or any other appropriate wireless communication protocol. As another example, computing components with which the robotic device 111 may be wired may be used to facilitate communication between the robotic device 111 and other components of the inventory system. In general, the robotic device 111 may be powered and controlled in any manner appropriate based on the configuration and characteristics of the inventory system.

In at least one embodiment, the storage containers 106 store inventory items. The storage containers 106 are capable of being carried, rolled, and/or otherwise moved by the mobile drive units 104. In some embodiments, the storage containers 106 may include a plurality of faces, and each storage component (e.g., a bin, a tray, a shelf, an alcove, etc.) may be accessible through one or more faces of the storage container 106. The mobile drive units 104 may be configured to rotate the storage containers 106 at appropriate times to present a particular face to an operator or other components of the inventory system.

In at least one embodiment, inventory items represent any objects suitable for storage, retrieval, and/or processing in an automated inventory system. For the purposes of this description, "inventory items" (also referred to as "items" or "an item") may represent any one or more objects of a particular type that are stored in the inventory system. In at least one example, the inventory system may represent a mail order warehouse facility (e.g., operated by an electronic marketplace provider), and the items within the warehouse facility may represent merchandise stored in the warehouse facility. As a non-limiting example, the mobile drive units 104 may retrieve the storage containers 106 containing one or more inventory items requested in an order to be packed for delivery to a customer. Moreover, in some embodiments of the inventory system, boxes containing completed orders may themselves represent inventory items.

In some embodiments, the inventory system may also include one or more workstation(s) 108. The workstation(s) 108 represent locations designated for the completion of particular tasks involving inventory items. Such tasks may include the removal of inventory items from the storage containers 106, the placement of inventory items into the storage containers 106, the counting of inventory items in the storage containers 106, the decomposition of inventory items (e.g. from pallet- or case-sized groups to individual inventory items), the consolidation of inventory items between the storage containers 106, and/or the processing or handling of inventory items in any other suitable manner, to name a few. In particular embodiments, the workstation(s) 108 may represent the physical locations where a particular task involving inventory items can be completed within the workspace 110. In some embodiments, the workstation(s) 108 may represent both the physical location and also any appropriate equipment for processing or handling inventory items, such as robotic arms (e.g., robotic device 111), scanners for monitoring the flow of inventory items in and out of the inventory system, communication interfaces for communicating with the workspace management module 102, and/or any other suitable components. The workstation(s) 108 and devices within the workstation(s) 108 may be controlled, entirely or in part, by operators or may be fully automated. Moreover, operators may be capable of performing certain tasks involving inventory items, such as packing, counting, or transferring inventory items, as part of the operation of the inventory system. By way of example, workstation 108-1 may include robotic device 111, although any suitable number or type of robotic devices can be utilized within workstation 108-1 In at least one embodiment, the workspace 110 represents an area associated with the inventory system in which the mobile drive units 104 can move, the robotic device 111 can operate, and/or the storage containers 106 can be stored. For example, the workspace 110 may represent all or part of the floor of a mail-order warehouse in which the inventory system operates. Although FIG. 1 shows, for the purposes of illustration, an embodiment of the inventory system in which the workspace 110 includes a fixed, predetermined, and finite physical space, particular embodiments of the inventory system may include a workspace of variable dimensions and/or an arbitrary geometry. As depicted, workspace 110 is intended to include the areas corresponding to workstation(s) 108. While FIG. 1 is intended to illustrate a workspace 110 that is entirely enclosed in a building, in some embodiments, some or all of the workspace 110 is located outdoors, within a vehicle (such as a cargo ship), or otherwise unconstrained by any fixed structure.

In operation, the workspace management module 102 may select appropriate components to complete particular tasks and may transmit task assignments 116 to the selected components to trigger completion of the relevant tasks. Each of the task assignments 116 defines one or more tasks to be completed by a particular component (e.g., one or more mobile drive units 104, the robotic device 111, one or more operators, etc.). These tasks may relate to the retrieval, storage, replenishment, and counting of inventory items and/or the management of the mobile drive units 104, the robotic device 111, the storage containers 106, the operators, the workstation(s) 108 and/or other components of the inventory system. Depending on the component and the task to be completed, a task assignment may identify locations, components, and/or actions/commands associated with the corresponding task and/or any other appropriate information to be used by the relevant component in completing the assigned task.

In particular embodiments, the workspace management module 102 may generate task assignments 116 based, in part, on inventory requests that the workspace management module 102 receives from other components of the inventory system and/or from external components in communication with the workspace management module 102. These inventory requests identify particular operations to be completed involving inventory items stored or to be stored within the inventory system and may represent communication of any suitable form. For example, in particular embodiments, an inventory request may represent a shipping order specifying particular inventory items that have been purchased by a customer and that are to be retrieved from the inventory system for shipment to the customer. The workspace management module 102 may generate the task assignments 116 based at least in part on any suitable stimuli such as user input and/or a system determination indicating a maintenance task to be performed. After generating one or more of the task assignments 116, the workspace management module 102 may transmit the generated task assignments 116 to appropriate components (e.g., mobile drive units 104, computing devices associated with operators, etc.) for completion of the corresponding task. The relevant components may then execute their assigned tasks.

With respect to the mobile drive units 104 specifically, the workspace management module 102 may, in particular embodiments, communicate task assignments 116 to selected mobile drive units 104 that identify one or more destinations for the selected mobile drive units 104. The workspace management module 102 may select a mobile drive unit (e.g., mobile drive unit 104-2) to assign the relevant task based on the location or state of the selected mobile drive unit, an indication that the selected mobile drive unit has completed a previously assigned task, a predetermined schedule, and/or any other suitable consideration. These destinations may be associated with an inventory request the workspace management module 102 is executing or a management objective the workspace management module 102 is attempting to fulfill. For example, the task assignment may define the location of a storage container 106 to be retrieved, a workstation to be visited (e.g., workstation 108-1), or a location associated with any other task appropriate based on the configuration, characteristics, and/or state of inventory system, as a whole, or individual components of the inventory system.

As part of completing these tasks the mobile drive units 104 may dock with and transport the storage containers 106 within the workspace 110. The mobile drive units 104 may dock with the storage containers 106 by connecting to, lifting, and/or otherwise interacting with the storage containers 106 in any other suitable manner so that, when docked, the mobile drive units 104 are coupled to and/or support the storage containers 106 and can move the storage containers 106 within the workspace 110. The mobile drive units 104 and storage containers 106 may be configured to dock in any manner suitable to allow a mobile drive unit to move a storage container within workspace 110. In some embodiments, the mobile drive units 104 represent all or portions of the storage containers 106. In such embodiments, the mobile drive units 104 may not dock with the storage containers 106 before transporting the storage containers 106 and/or the mobile drive units 104 may each remain continually docked with a storage container.

In some embodiments, the workspace management module 102 may be configured to communicate the task assignments 116 to user devices (e.g., handheld user devices such as scanners, tablets, smartphones, a computing device located in the workstation(s) 108 and associated with tasks to be performed with the robotic device 111, etc.) associated with an operator to instruct the operator to perform one or more tasks. The user device may further be configured to enable the user to view, via a graphical user interface, various components of the workspace while in operation. The user device may further be configured to enable a user to provide planned path data indicating an intended traversal path of the user within the workspace. The mobile drive units 104 and/or the user devices (e.g., handheld user devices) may individually be configured to provide task performance information to the workspace management module 102. Task performance information may include any suitable data related to the performance of an assigned task. By way of example, a mobile drive unit may send task performance information to the workspace management module 102 indicating that the task of moving a particular storage container to a particular station has been completed. A user device associated with a particular operator may transmit task performance information to the workspace management module 102 indicating that an item has been placed in or removed from the selected storage container, a maintenance task has been completed, or the like. Generally, any suitable information associated with task performance (e.g., a task identifier, a time of completion, an error code or other indication that the task was unsuccessful, a reason code or other indication as to why task performance was unsuccessful, etc.) may be provided as part of the task performance information.

In some embodiments, the robotic device 111 may be communicatively coupled with a computing device configured to receive task assignments from the workspace management module 102. These task assignments may assign various activities to be performed with the robotic device 111. The task assignment may identify a storage location (e.g., within storage container 113, within storage container 106, etc.) at which an item (e.g., an inventory item such as a physical item, bin, tote, crate, and the like) may be stored and/or from which the item may be retrieved.

Additional user devices (e.g., user device 118-1, user device 118-2, user device 118-3, etc., herein after collectively referred to as "user devices 118). The user devices 118 may individually include one or more transmitter devices (e.g., one or more ultra-wide band (UWB) radio transmitters), one or more feedback devices (e.g., a light emitting diode, a speaker, a haptic feedback device, etc.), one or more user input devices, and one or more batteries. In some embodiments, the user devices 118 may be wearable. By way of example, the user device 118 may be worn by the user via a vest, straps, backpack, or other wearable article.

The user device 118 may be configured to operate in a variety of states (e.g., power on, activate, deactivate, etc.). A user device 118 may include one or more feedback devices each configured to provide any suitable combination of feedback (e.g., haptic feedback, visual feedback, audible feedback) indicating the operational state of the user device 118 and the user devices 118 may be configured to provide an indication of their respective operational state to the workspace management module 102 at any suitable time. Each transmitter device of the user devices 118 may be configured to communicate via one or more communication channels (e.g., WiFi, short-range radio, etc.). By way of example, a transmitter device may include a first antenna for conducting communications via WiFi and a second antenna for conducting communications utilizing short-range radio signals. Although referred to as "transmitter devices," it should be appreciated that each of these devices may be configured to receive data from its corresponding communications channel(s). In some embodiments, each transmitter device may be configured to transmit one or more radio signals having a particular frequency (e.g., 125 kHz, 925 MHz, 433 MHz, etc., or any suitable combination of the above) and a particular range (e.g., 5-7 meters, 25-30 meters, etc.). By way of example, a first radio signal may have a range indicated at 120, while a second radio signal may have a range indicated at 122. In some embodiments, the transmitter devices may be configured to alternate responsibility for transmitting the one or more radio signals according to a predetermined scheme. For example, a first transmitter device may transmit the first and second radio signals for a predetermined time period. At the end of this predetermined time period, the first transmitter device may cease its transmission(s) and the second transmitter device may begin transmitting the one or more radio signals. The transmitter devices may alternate transmission responsibility at any suitable rate (e.g., a set rate, a modulating rate, etc.) and/or according to any suitable predetermined scheme and/or schedule.

The mobile drive units 104 may each be configured with one or more receiver devices configured to receive radio signals transmitted by the user devices 118. In some embodiments, the mobile drive units 104 may be configured to slow when a particular frequency signal (e.g., a 925 MHz signal) is received. Similarly, the mobile drive units may be configured to stop when a different frequency signal (e.g., a 125 kHz signal) is received. The mobile drive units 104 may provide (e.g., to the workspace management module 102) an indication that a particular frequency signal has been received by the mobile drive units 104. This information may be provided at any suitable time and in any suitable manner. In some embodiments, the indication that a particular radio signal has been received may be provided along with or separate from navigational information indicating, among other things, a location, a speed of the mobile drive unit, or the like. The mobile drive units 104 may be configured with one or more feedback devices (e.g., one or more LED lights, one or more speakers, etc.) that indicate when the mobile drive unit is receiving a radio signal (e.g., a particular radio signal). By way of example, a feedback device of the mobile drive unit 104-1 may present a yellow light while the MDU receives a 925 MHz (or 433 MHZ) signal and a red light while the MDU receives a 125 kHz signal. In some embodiments, the mobile drive unit 104-1 may present a blue (or another) colored light when receiving the 925 MHz (or 433 MHZ) signal and/or the 125 kHz signal. The color of the light provided may vary. In some embodiments, the light may be solid or blinking. A speaker of the mobile drive units 104 may similarly be utilized to present an audible indication indicating that a particular signal is being received.

The robotic device 111 may be in communication with a proximity monitoring engine 117 that is configured to identify when one of the user devices 118 has breached a predefined threshold distance from the robotic device 111. In some embodiments, the proximity monitoring engine 117 is configured to communicate with any suitable number of receiver devices (also referred to as "receiving devices"). In some embodiments, logic of the proximity monitoring engine 117 may be collocated at one of the receiving device(s) (e.g., at receiving device 115-1) or proximity monitoring engine 117 may be separate from the receiving devices 115-1, 115-2, and 115-3 (collectively, "receiving device(s) 115"). Each of the receiving device(s) 115 may each be configured to receive radio signals transmitted by the user devices 118. In some embodiments, proximity monitoring engine may be configured to cause the robotic device 111 (and/or any suitable device of the workstation(s) 108) to slow when a particular frequency signal (e.g., a 925 MHz signal) is received. Similarly, the mobile drive units may be configured to stop when a different frequency signal (e.g., a 125 kHz signal) is received. The proximity monitoring engine 117 may provide (e.g., to the workspace management module 102) an indication that a particular frequency signal has been received. This information may be provided at any suitable time and in any suitable manner. In some embodiments, the indication that a particular radio signal has been received may be provided along with identification information corresponding to a particular receiving device (e.g., receiving device 115-1, a receiving device that was expected to receive a given signal but has been determined to have failed to receive the signal). The proximity monitoring engine 117 may be configured with one or more feedback devices (e.g., one or more LED lights, one or more speakers, etc.) that indicate when the proximity monitoring engine 117 is receiving a radio signal (e.g., a particular radio signal). By way of example, a feedback device of the proximity monitoring engine 117 may present a colored light or particular sound while the proximity monitoring engine 117 receives a 925 MHz (or 433 MHZ) signal and a differently colored light or different sounds while the proximity monitoring engine 117 receives a 125 kHz signal.

The receiving device(s) 115 may be configured in a predefined configuration depending on the placement, number, or configuration of the robotic devices to which they are associated. In some embodiments, the configuration and/or placement of the receiving device(s) 115 may correspond to an area of interest (e.g., area 119) that represents an outer perimeter that, when breached by a user (e.g., a user wearing user device 118) should cause the robotic device(s) to slow and/or halt motion all together. Although one area of interest is depicted in FIG. 1, multiple areas of interest are contemplated. By way of example, area 119 may correspond to an area around the robotic device 111 that, when breached by a user device (e.g., user device 118), motion of the robotic device 111 will be halted. Another area of interest (not depicted), that is larger than the area 119, may correspond to an area around the robotic device 111 that, when breached by the user device, causes the motion of the robotic device 111 to slow. In some embodiments, the motion of the robotic device 111 (and/or any motion and/or operations of robotic or computing devices of the workstation(s) 108) may be altered in one manner (e.g., slowed) upon breaching an outer area of interest) and altered in a different manner (e.g., stopped, shut down, halted, etc.) upon breaching an inner area of interest (e.g., the area 119). The proximity monitoring engine 117 may be configured to receiving signals from the receiving device(s) 115 indicating a breach and may communicate notification data (e.g., identifying the breach, identifying a command such as a slow command or halt command, etc.) to one or more computing components that are associated with the workstation(s) 108 (e.g., one or more controllers (not depicted) of the robotic device 111 or any suitable computing device associated with the workstation 108-1).

While the appropriate components of inventory system complete assigned tasks, the workspace management module 102 may interact with the relevant components (e.g., the mobile drive units 104, the operators, the user device 118, etc.) to ensure the efficient use of the resources available to inventory system. As one specific example of such interaction, workspace management module 102 is responsible, in particular embodiments, for planning the paths and managing the speed the mobile drive units 104 utilize when moving within the workspace 110 and for allocating use of a particular portion of the workspace 110 to a particular mobile drive units 104 for purposes of completing an assigned task. In such embodiments, the mobile drive units 104 may, in response to being assigned a task, request a path to a particular destination associated with the task.

Components of the inventory system (e.g., the mobile drive units 104, the robotic device 111, and/or the computing devices associated with the operators, and/or the user device 118) may provide information to the workspace management module 102 regarding their current state, navigational data, other components of the inventory system with which they are interacting, and/or other conditions relevant to the operation of the inventory system. This may allow the workspace management module 102 to utilize feedback from the relevant components to update algorithm parameters, adjust policies, or otherwise modify its decision-making to respond to changes in operating conditions or the occurrence of particular events.

In addition, while the workspace management module 102 may be configured to manage various aspects of the operation of the components of the inventory system, in particular embodiments, the components themselves may also be responsible for decision-making relating to certain aspects of their operation, thereby reducing the processing load on the workspace management module 102.

Thus, based on its knowledge of the location, current state, and/or other characteristics of the various components of the inventory system and an awareness of all the tasks currently being completed, the workspace management module 102 can generate tasks, allot usage of system resources, and otherwise direct the completion of tasks by the individual components in a manner that optimizes operation from a system-wide perspective.

Access to the workspace 110 may be controlled via one or more access points (e.g., access points 109). Each access point may include a physical barrier device (e.g., barrier device 112, such as a door, a gate, or as depicted, a light curtain). By default, the barrier device 112 may operate in a state in which access to the workspace 110 is blocked. If the access point is used for both ingress and egress, the access point may allow egress at any suitable time. That is, egress from the workspace 110 may not be blocked by default.

In some embodiments, user devices 118 may initially be deactivated. In some embodiments, while in a deactivated state, the user devices 118 (e.g., user device 118-1) may periodically broadcast respective identification information (e.g., an identifier that uniquely the user device) via one or more transmitters of the user device. In some embodiments, the identification information may be provided (e.g., via WiFi, etc.) by another user device (e.g., a handheld device such as a tablet or smartphone, a stationary computing station, not depicted). By way of example, a user may carry a tablet with which input may be entered to indicate a planned path for the user device 118-1 and/or access point (e.g., 109-1) at which the user plans to gain entry to the workspace 110. An access control unit (not depicted) may receive the identification information for the user device 118-1 from the user device 118-1 via its transmission and/or from the user device with which the planned path was entered. In some embodiments, the planned path may be transmitted by the user device with which it was entered and provided to the workspace management module 102, which in turn may transmit the information to the access point 109-1. In some embodiments, an access point (e.g., access point 109-1) may be breached based at least in part on user input such as receiving an indication of user interaction with a lock, push bar, button, knob, or the like.

In some embodiments, a user device (e.g., user device 118-1), may be activated by a computing module associated with the access point. By way of example, a feedback device (e.g., a light emitting diode) of the user device may be positioned at a receiving device of the access point 109-1. In some embodiments, the feedback device may be configured to transmit data associated with the user device 118-1 (e.g., identification information that uniquely identifies the user device 118-1). In some embodiments, this data is transmitted by modulating light emitted from the feedback device. The data may be received by the receiving device (e.g., a computing device configured to receive light signals). The access control unit of access point 109-1 may verify whether the previously received information (e.g., the identification information received from the user device 118-1, or from the workspace management module 102, or from another user device with which the planned path was entered, etc.) matches the identification information received from the feedback. As additional identification information may be received from other user devices (e.g., user device 118-2), the identification information received at the receiving device can be used to differentiate which user device is requesting activation and/or access. If the data does not match, the access control unit may be configured to deny access (e.g., keep a locked door locked, maintain a light curtain, etc.). If the identification information provided at the receiving device matches the previously received identification information, the access control unit may perform operations for requesting activation of the user device 118-1 and/or for enabling access to the workspace via access point 109-1. By way of example, the access control unit may transmit the identification information of the user device (e.g., a user device identifier uniquely identifying the user device 118-1), an access point identifier uniquely identifying the access point, or any suitable information related to the pending access and/or the operational status of the user device 118-1. The workspace management module 102 may be configured to perform operations for verifying that one or more components of the user device are operating correctly. In some embodiments, the workspace management module 102 may communicate directly (e.g., via WiFi) with the user device 118-1 to exchange any suitable information with which the operational status of the components of the user device 118-1 may be ascertained. If the workspace management module 102 determines that the user device 118-1 is operating correctly (e.g., according to a number of predefined rules), the workspace management module 102 may transmit (e.g., to the access control unit of access point 109-1, to the user device 118-1, etc.) an indication that the user device 118-1 has been activated. In some embodiments, the workspace management module 102 may transmit to the user device 118-1 information to indicate to the user device 118-1 that is active.

Upon receiving this information, the user device 118-1 may present an indication (e.g., via the feedback device) that the user device 118-1 has been activated. By way of example, the feedback device (e.g., a LED) may present a feedback light signal (e.g., a solid green light, a blinking light, etc.). This feedback light signal may be separate and distinct from the light used to transmit the identification information (referred to herein as a "verification light signal"). For example, the feedback light signal may be modulated at a different rate and/or pattern than the verification light signal. In some embodiments, the feedback light signal and its modulation rate and/or pattern may be visible to the human eye while the verification light signal may be at a rate and/or pattern that is not perceptible by the human eye.

Upon receiving the indication that the user device 118-1 has been activated, the access control unit at access point 109-1 may execute any suitable operations for allowing access to the workspace 110. By way of example, the access control unit may communicate with one or more actuators at the access point 109-1 to unlock a door, gate, or other physical barrier. As another example, the access control unit may execute operations for deactivating a light curtain or deactivating an alarm system associated with a light curtain. The user may then enter the workspace 110 with the user device 118-1.

An activated user device (e.g., user device 118-3) may modify movements of various components within the workspace. By way of example, the user device 118-3 may have been previously activated prior to entering the workspace 110 in the manner described above. While operating in an activated state, the user device 118-3 may transmit, utilizing a first transmitter device, a first signal (e.g., a first radio signal) corresponding to a first range as indicated at 120. While operating in the activated state, the user device 118-3 may transmit, utilizing a second transmitter device, a second signal (e.g., a second radio signal) corresponding to a second range as indicated at 122. The mobile drive unit 104-2 may be travelling along a planned path 124 corresponding to a task that was previously assigned by the workspace management module 102.

At location 126, the mobile drive unit 104-2 may begin receiving the first signal from the user device 118 (e.g., a wearable device). Based at least in part on receiving the first signal, the mobile drive unit 104-2 may be configured to slow its speed (e.g., to a speed corresponding to predetermined reduced speed or to a speed at or less than a predetermined threshold). In some cases, the mobile drive unit 104-2 may provide a visual and/or audible indication that it is in receipt of the first signal. Further, the mobile drive unit 104-2 may provide navigational information and/or state information to the workspace management module 102 indicating, at least, its current location, speed, and/or state indicating that it is currently receiving the first signal.

The mobile drive unit 104-2 may continue traversing its planned path 124 until it reaches location 128. At location 128, the mobile drive unit 104-2 may begin receiving a second signal from the user device 118-3. Based at least in part on receiving the second signal, the mobile drive unit 104-2 may be configured to stop motion. In some cases, the mobile drive unit 104-2 may provide a visual and/or audible indication that it is in receipt of the second signal. Further, the mobile drive unit 104-2 may provide navigational information and/or state information to the workspace management module 102 indicating, at least, its current location, speed, and/or state indicating that it is currently receiving the second signal.

Subsequently, the operator of the user device 118-3 may move to a location 130. As the user device 118-3 is moved away from the mobile drive unit 104-2 located at location 128, the mobile drive unit 104-2 may no longer receive the second signal. In some embodiments, the mobile drive unit 104-2 may continue traversing along the planned path 124. Should the mobile drive unit 104-2 still be receiving the first signal from the user device 118, the traversal may be at a reduced speed (e.g., a speed corresponding to predetermined reduced speed and/or a speed at or less than a predetermined threshold). When the mobile drive unit 104-2 is no longer in receipt of the first signal, the mobile drive unit 104-2 may be configured and/or instructed to increase its speed (or resume traveling at its intended speed) to perform its assigned task. The mobile drive unit 104-2 may provide navigational information and/or an indication of an operational state of the mobile drive unit and/or an indication of one or more signals currently being received at any suitable time (e.g., at a set periodicity, at change to an operational parameter such as speed, etc.). The robotic device 111 may be slowed and/or stopped in a similar manner should the user device 118-3 travel to a location with area 119.

In some embodiments, initial activation of the user device 118-3 may trigger a fault detection process performed by the workspace management module 102 to monitor the connections and/or state of the transmitter devices of the user device 118-3. The workspace management module 102 may be configured to receive fault indications from any suitable transmitter device. Should the workspace management module 102 detect a fault associated with one or more transmitter devices (e.g., by detecting one or more transmitter devices are no longer connected to a wireless network associated with the workspace 110, by receiving a fault indication from a transmitter device, etc.), the workspace management module 102 may be configured to transmit a stop command to any suitable number of the mobile drive units 104 (e.g., any/all of the mobile drive units 104) to cause the receiving mobile drive units to halt motion. The stop command may be addressed to particular mobile drive units and/or the stop command may be broadcasted to all of the mobile drive units 104. In some embodiments, the stop command may not be transmitted until a predetermined time period (e.g., 120 seconds, 160 seconds, five minutes, etc.) has elapsed by which the fault has not been resolved.

In some embodiments, activation of the user device 118-3 may additionally or alternatively trigger a fault detection process performed by the workspace management module 102, the proximity monitoring engine 117, and/or the receiving device(s) 115. The particulars of this fault detection process will be discussed in more detail with respect to FIGS. 6-8 below.

In some embodiments, access points 109 may be utilized at any suitable time to enable users to exit the workspace 110 with their respective user device(s) (e.g., user device 118-3).

An indication (e.g., a light, an audible alarm, etc.) may be provided at access point utilized for exiting the workspace 110 to remind the user to deactivate his user device (e.g., user device 118-3). The indication (herein referred to as "a deactivation reminder" or "a deactivation indication") may be triggered based at least in part on input received at the access point. For example, pressing a button at the access point, pressing against a push bar of a door of the access point, passing through one or more light curtains, and the like may be used to trigger the deactivation reminder. As a non-limiting example, the access point may include two or more light curtains. In this scenario, the user device may be identified as exiting the workspace 110 based at least in part on an order by which the light curtains are breached. In some embodiments, the user may position the feedback device at the receiving device of the access point (e.g., a receiving device positioned at a location outside the workspace 110) to once again provide its identification information (e.g., via LED modulations). The access control unit may transmit the received identification information to the workspace management module 102. The workspace management module 102 may perform any suitable number of operations to determine whether the user device is to be deactivated based at least in part on a number of predefined conditions. If the workspace management module 102 determines the user device is to be deactivated, the management system may transmit deactivation information (e.g., a deactivation indicator) to the user device (e.g., user device 118-3) to cause the user device to deactivate. In a deactivated state, the user device no longer transmits data that would cause MDUs or robotic devices in the workspace to modify their movements.

Figure 2:
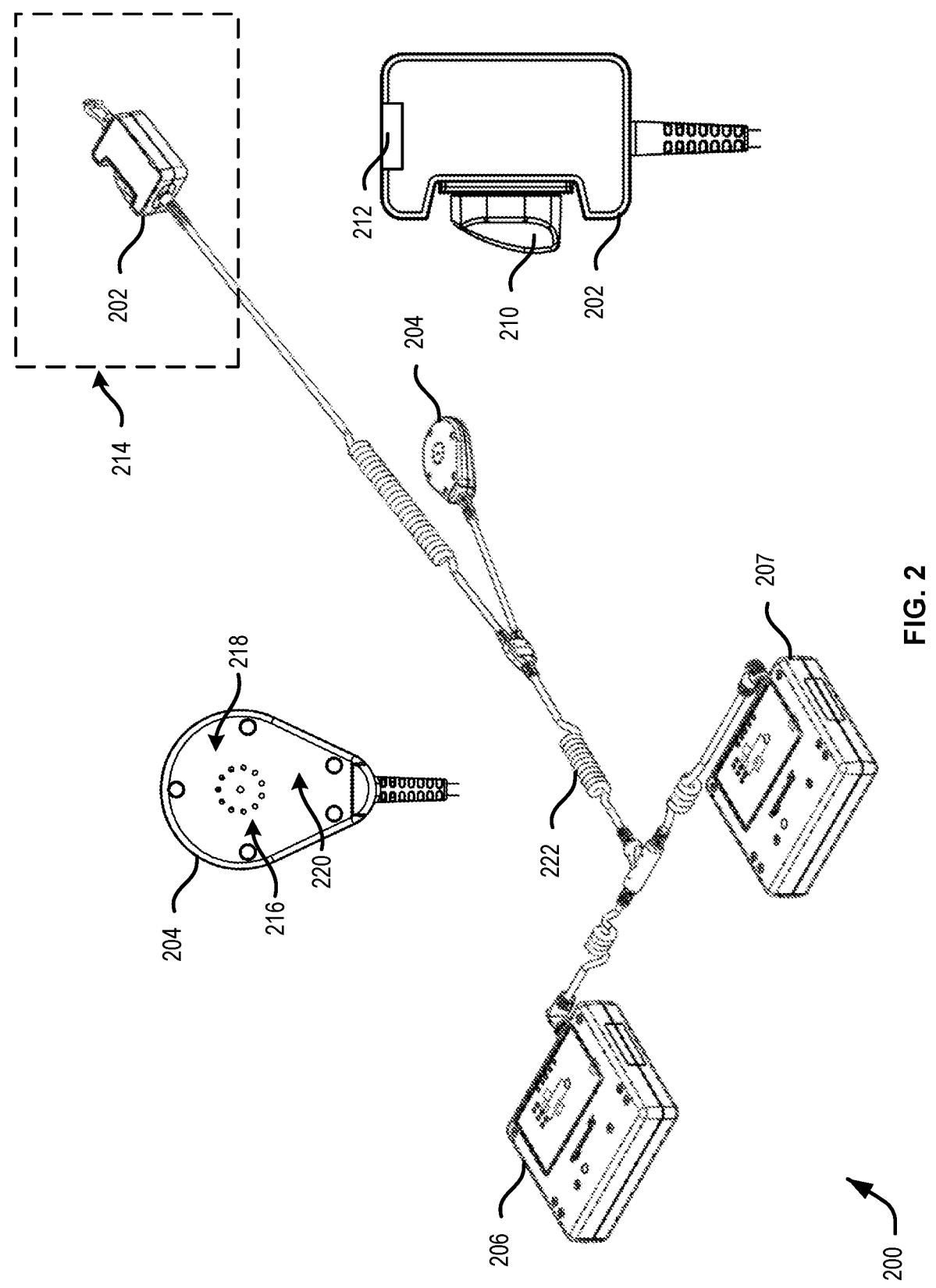
FIG. 2 illustrates example components of a user device, in accordance with at least one embodiment.

FIG. 2 illustrates example components of a user device 200, in accordance with at least one embodiment. The user device 200 may be an example of the user device 118 of FIG. 1. The user device 200 may include one or more user input device(s) (e.g., the user input device 202), one or more feedback device(s) (e.g., feedback device 204), one or more transmitters (e.g., the transmitter device 206, the transmitter device 207, etc.), or any suitable combination of the above. It should be appreciated that, in some embodiments, one or more user input device(s) and one or more feedback device(s) may be combined into a single component of the user device 200, such that that component may collect user input and/or provide feedback at the same component.

In the embodiment depicted in FIG. 2, the user device 200 includes user input device 202. A user input device (e.g., the user input device 202) may include any suitable user interface elements. By way of example, the user input device 202 may include a knob, a button, a keypad, a rotatable switch, a touch screen, or the like with which user input may be provided. In some embodiments, to enable manual modification of the operational state of the user device 200, the user input device 202 may include a rotational switch (e.g., rotational switch 210), buttons, or other physical input devices. In some embodiments, the physical input devices may be manipulated in a manner corresponding to an action and/or an operational state. By way of example, the rotational switch 210 may rotated in a counter-clockwise fashion for a period of time (e.g., 1 second, 2 seconds, etc.) to indicate a power on action corresponding to powering on the user device 200. As another example, once powered on, the rotational switch 210 may be rotated clockwise for a predetermined amount of time (e.g., 2 second, three seconds, etc.) to indicate an activate action corresponding to activating the user device 200. Once the user device 200 has been activated, the rotational switch 210 may be rotated clockwise for a predetermined amount of time (e.g., three seconds, four seconds, a time period different than the time period associated with the activate action, etc.) to indicate a deactivate action corresponding to deactivating the user device 200. It should be appreciated that the particular manner with which the user input device is manipulated and/or the particular user input (e.g., keystrokes, button selections, etc.) utilized to indicate a corresponding action may vary.

In the example depicted in FIG. 2, user input device 202 may also include a feedback device 212. The combination of the user input device 202 and the feedback device 212 may collectively be referred to as the component 214. In some embodiments, the feedback device 212 may include any suitable feedback device configured to provide visual, audible, and/or haptic feedback. For example, the feedback device 212 may include one or more LED lights for providing visual feedback. In some embodiments, the LED lights may provide any suitable color and/or pattern associated with a particular operational state of the user device 200. In some embodiments, the LED lights may be modulated and/or transmitted at any suitable frequency, rate, and/or pattern to provide one or more light signals that indicate an operational status of the user device 200 and/or to provide any suitable data related to the user device 200 (e.g., an identifier that uniquely identifies the user device 200). In some embodiments, the feedback device 212 may be configured to transmit both types of light signals (indicating operational status and identity). In some embodiments, the transmission of these signals may be offset in a manner that transmission of one does not interfere with the transmission of the other. In some embodiments, the light signals used to indicate operational status are visible while the light signals used to provide identification information are not perceptible to the human eye.

In some embodiments, the user input device 202 may include attachment mechanism (not depicted). By way of example, the attachment mechanism may include a carabiner, a hook, a belt, a button, or any suitable means for attaching the user input device 202 (component 214) to a wearable article (e.g., a vest, a shirt, a coat, a hat, pants, etc.). An example of such an article will be described further in connection with FIG. 3.

In some embodiments, the user device 200 may include feedback device 204. In some embodiments, the feedback device 204 may include a speaker 216, a haptic feedback device 218, and/or a visual feedback device 220. For example, the feedback device 204 may include a visible LED light, an audible intelligible speaker to generate sound, and a vibrating eccentric motor for providing haptic feedback. In some embodiments, feedback device 204 may be contained in a zippered semi-transparent pouch that is configured to mount to a wearable article (e.g., the wearable article 300 of FIG. 3). In some embodiments, the visual feedback device 220 includes at least one LED coupled to a silicone light diffuser to cause the feedback device 204 to glow and be equally visible from all viewing angles. Similar to the feedback device 212, the visual feedback device 220 may be utilized to provide visual feedback corresponding to an operational state of the user device 200. The visual feedback may be any suitable color and/or pattern associated with a particular operational state of the user device 200. In some embodiments, the visual feedback provided by the visual feedback device 220 may correspond to the visual feedback provided at the feedback device 212 (e.g., a light signal indicating an operational status of the user device 200). The speaker 216 may provide audible feedback corresponding to an operational state of the user device 200. Particular audible feedback associated with operational states of the user device 200 may vary in pitch, duration, and/or patterns such that one audible feedback is distinguishable from other audible feedback and identifiable as being related to a particular operational state. The haptic feedback device 218 may provide, via a haptic transducer, haptic feedback corresponding to an operational state of the user device 200. Particular haptic feedback associated with operational states of the user device 200 may vary in frequency, strength, duration, and/or pattern such that one haptic feedback is distinguishable from other haptic feedback and may be identifiable as being related to a particular operational state.

In some embodiments, the user device 200 may include one or more transmitter devices (e.g., transmitter devices 206 and 207). Transmitter devices 206 and 207 may each include one or more ultra-wide band radio transmitters. In some embodiments, the transmitter device 206 and the transmitter device 207 may each be preconfigured to transmit one or more radio signals at one or more frequencies (e.g., 125 kHz, 925 MHz, 433 MHZ, etc., or any suitable combination of the above). In some embodiments, the one or more radio signals may include identification information corresponding to the user device 200 (e.g., an identifier that uniquely identifies the user device 200 and/or distinguishes the user device 200 from other user devices). In some embodiments, one signal transmitted by transmitter device 206 and/or the transmitter device 207 may have a shorter range than another signal transmitted by the same device. Each of the transmitter devices may include a wireless antenna (not depicted) for communication with the workspace management module 102 of FIG. 1 via a wireless communications protocol (e.g., WiFi). In some embodiments, the transmitter device 206 and/or the transmitter device 207 may include a battery (not depicted) that may be utilized to provide power to the various components of the user device 200 (e.g., the component 214, the feedback device 204, the transmitter devices 206 and/or 207) directly, or via power cable 222.

The transmitter device 206 and the transmitter device 207 may each be configured to monitor its internal components for errors/faults as well as monitoring the other transmitter for errors/faults. In some embodiments, the transmitter device 206 and the transmitter device 207 may be configured to alternate between transmitting the one or more radio signals and monitoring the transmission of the one or more radio signals by the other transmitter device. By way of example, a first transmitter device may transmit one or more radio signals at particular frequencies (e.g., 125 kHz, 925 MHz, 433 MHZ, or any suitable combination of the above). While the first transmitter device is transmitting, a second transmitter device may be configured to monitor the transmissions of the first transmitter device. Should the second transmitter device fail to detect one or more of the expected transmissions of the first transmitter device, the second transmitter device may be configured to an indication of the fault to a remote computer (e.g., the workspace management module 102 of FIG. 1). The first transmitter device and the second transmitter device can be configured to alternate between transmitting the radio signal(s) and monitoring the transmission(s) of the other transmitter device in accordance with a predetermined scheme. For example, the transmitter devices may be configured to alternate between transmission and monitoring functions upon a predetermined schedule and/or according to a predetermined periodicity (e.g., every 250 ms). It should also be appreciated that each of the transmitter devices may be configured to monitor its corresponding components for errors/faults and transmit an indication of such errors/faults to the management system.

While manual activation may be allowed, in some embodiments, manual deactivation may be restricted. That is, while the user may take manual actions to activate the device, once activated, the device may not be manually deactivated by manipulating various physical components of the computing device. Instead, the user may be required to perform operations discussed as part of the flow of FIG. 10. For example, to deactivate the computing device, the feedback device 212 may be used at a receiving device to transmit identification information with which deactivation may be initiated. In some embodiments, no other action taken at the computing device may initiate deactivation of the device. This may ensure that a user may not deactivate a previously activated device while the device is within the workspace (e.g., workspace 110 of FIG. 1).

Figures 3A, 3B:
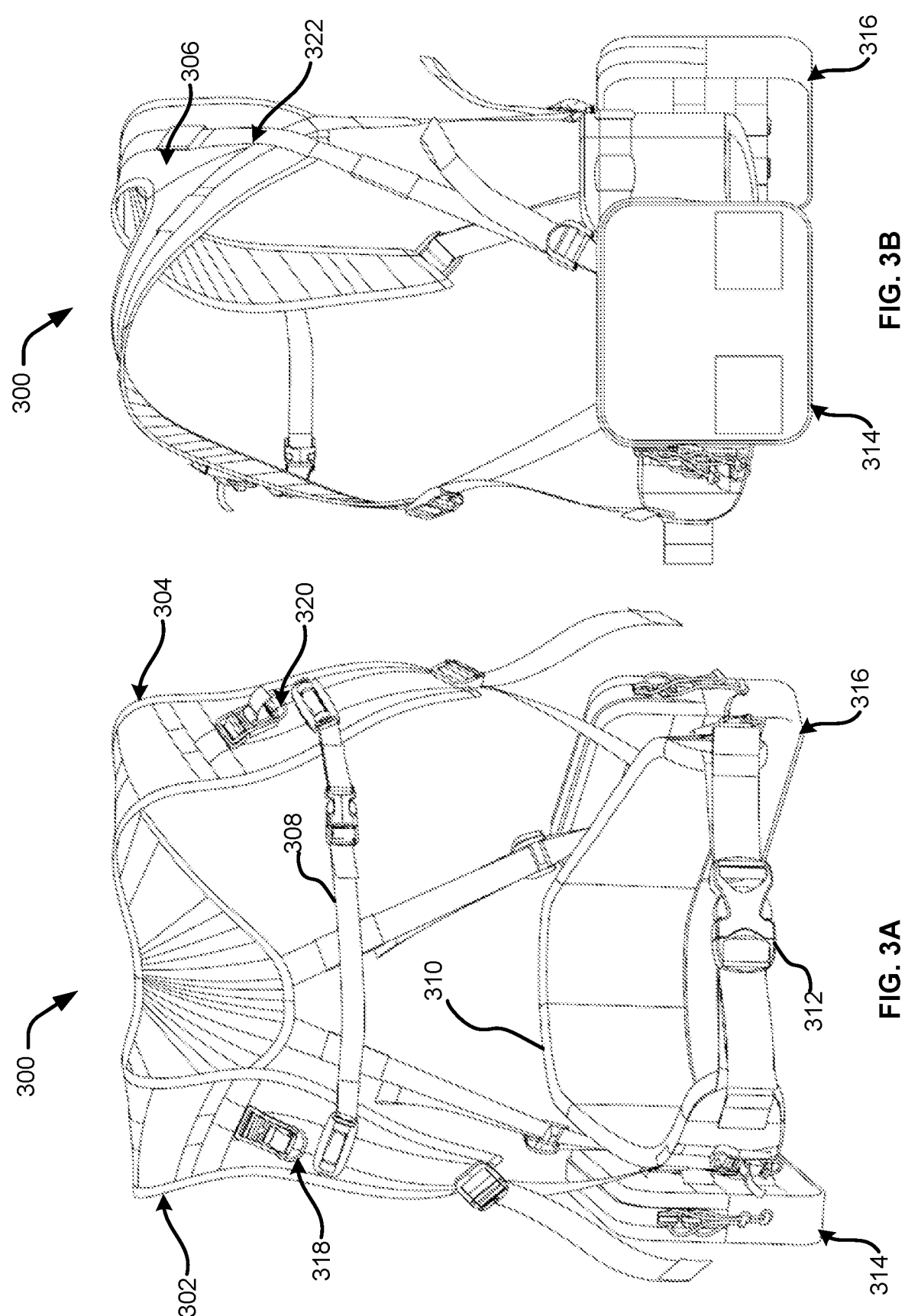
FIGS. 3A and 3B illustrates schematic diagrams depicting alternate views of a wearable article configured to receive the user device of FIG. 2, in accordance with at least one embodiment.

FIGS. 3A and 3B illustrates schematic diagrams depicting alternate views of a wearable article 300 configured to receive the user device 200 of FIG. 2, in accordance with at least one embodiment. FIG. 3A depicts a front view of the wearable article 300, while FIG. 3B depicts a side view of the wearable article 300. As depicted, the wearable article 300 is a vest. However, it should be appreciated that the wearable article may be in any suitable form (e.g., a shirt, a coat/jacket, or the like).

As depicted in FIG. 3A, the wearable article 300 may include two shoulder straps 302 and 304. Shoulder straps 302 and 304 may be connected to one another as depicted at 306 of FIG. 3B. A chest strap 308 may connect shoulder straps 302 and 304 from a front side of the wearable article 300 as depicted in FIG. 3A. The chest strap 308 may include a buckle and may be adjustable to increase and/or decrease a distance between the shoulder straps 302 and 304 when worn by a user. The wearable article 300 may further include a belt 310. The belt 310 may attach to the shoulder straps 302 and 304 and the shoulder straps 302 and 304 may individually be adjustable to lengthen or shorten to fit a torso area of the user. The belt 310 may also include a buckle 312 and may be adjustable to tighten or loosen the belt 310 around a waist area of the user when worn.

In some embodiments, the belt 310 may be attached to a pouch 314 and a pouch 316. The pouch may be zippered as depicted, or may have alternative closing mechanisms (e.g., Velcro®, buttons, etc.). Each of the pouches 314 and 316 may be configured to receive a transmitter device (e.g., the transmitter device 206 or the transmitter device 207 of FIG. 2). The placement of the pouches 314 and 316 may distribute weight of the transmitter devices 206 and/or 207 such that the weight of the user device 200 of FIG. 2 is evenly distributed over the wearable article 300.

In some embodiments, the wearable article 300 may include an attachment mechanism such as loop 318 and loop 320. The loop 318 and the loop 320 may individually be configured to attach to the user input device 202 of FIG. 2 (also referred to as component 214 of FIG. 2) via the attachment mechanism described in connection with FIG. 2. As depicted in FIGS. 2, the user device 200 may include an attachment mechanism (e.g., a carabiner) that may attach to either the loop 318 or the loop 320 to position the user input device 202 (or component 214) at a chest area of the user when wearing the wearable article 300. A carabiner and loop are used for illustrative purposes only, it is contemplated that a different attachment component may be utilized to attach the user input device 202 (component 214) to the wearable article 300.

In some embodiments, the feedback device 204 of FIG. 2 may be attached to a back of the wearable article as depicted at 322 of FIG. 3B. The feedback device 204 may be attached utilizing any suitable attachment mechanism. By way of example, the feedback device 204 may be contained in a zippered semi-transparent pouch that mounts to the back of the wearable article at 322. Placement of the feedback device 204 may ensure that the wearer can hear audible feedback from a speaker of the feedback device. The speaker (e.g., the speaker 216 of FIG. 2) may be configured to provide sound at a level that is predetermined as optimal given at least the distance from the wearer's ear. Additionally, the placement of the feedback device 204 at 322 may ensure that haptic feedback is felt by the user at a location approximately between the user's shoulder blades. This may provide an optimal location for providing a haptic indication of an operational state of the user device 200 of FIG. 2 without startling and/or annoying the user.

In some embodiments, the power cable 222 may run from the pouches 314 and 316, up the back of the wearable article 300. One segment of the power cable 222 may connect the feedback device 204 to a battery source. Another segment of the power cable 222 may be placed over a shoulder corresponding to loop 318 or loop 320 and may connect the user input device 202 (component 214 to the battery source).

The particular placement of the various components of the user device 200 on the wearable article 300 may increase the wearer's and other observer's awareness of the operational state of the user device 200. By way of example, by placing the feedback device 204 on the back of the wearable article at 322, the feedback device 204 may be easily viewable by other observers and thus, the operational state of the user device 200 may be easily ascertainable by an observer even some distance away from the user device 200. Similarly, the placement of component 214 at the loop 318 or loop 320 may similarly enable the wearer and/or an observer viewing the front of the wearable article 300 to easily ascertain the operational state of the user device 200. The combination of feedback provided via the component 214 and/or the feedback device 204 of FIG. 2 may increase the likelihood that the wearer is aware of the operational state of the user device 200. This may reduce frustration of the wearer/operator, as well as reduce operator error when operating the user device 200. Additionally, or alternatively, the combination of feedback provided at the user device 200 may decrease the likelihood that a wearer/operator enters the workspace 110 when the user device 200 is operating in a state other than an activated state.

Figure 4:
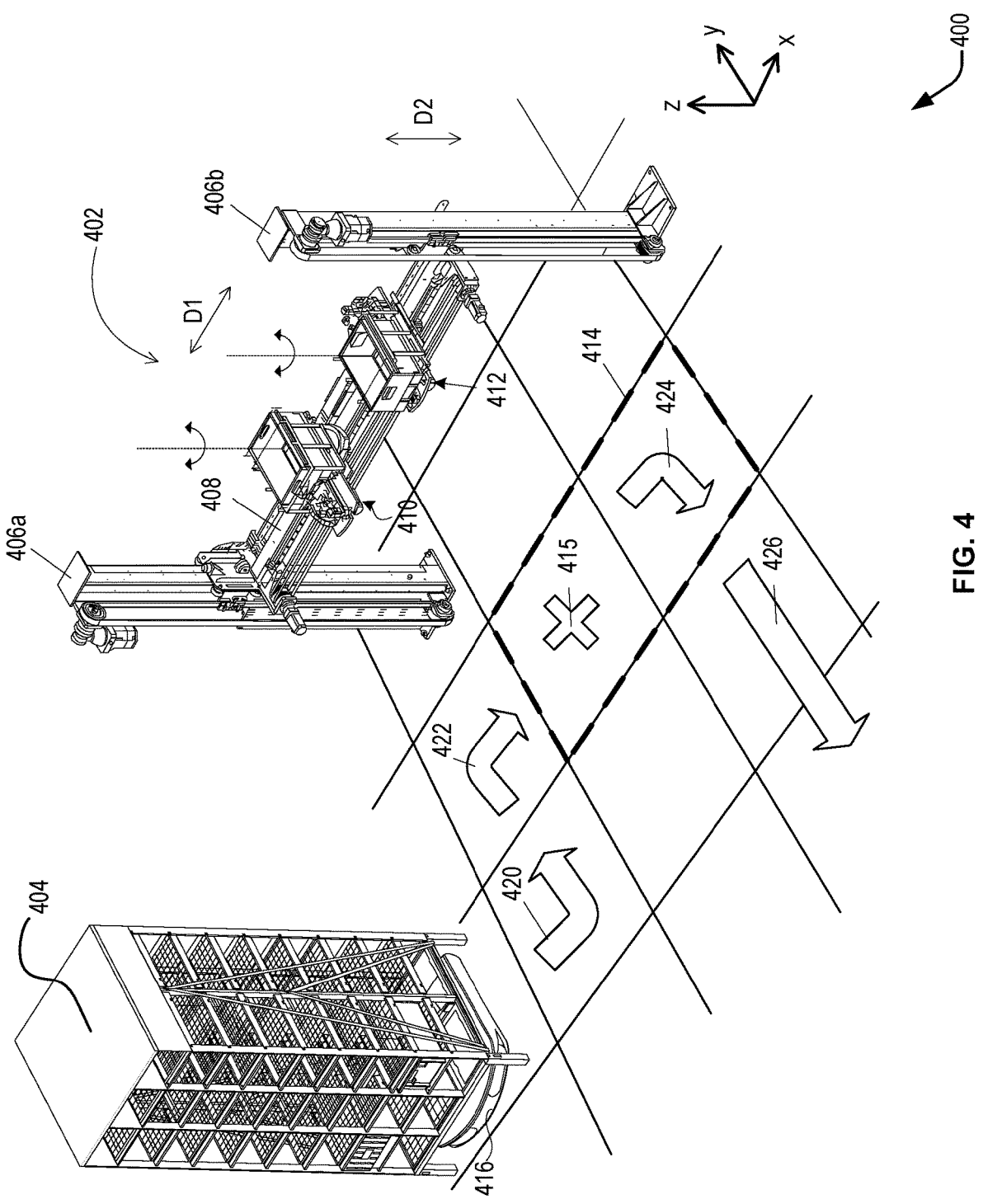
FIG. 4 depicts a first view of a robotic work cell that is configured with a robotic device that moves items from a moveable inventory holder, in accordance with at least one embodiment.

FIG. 4 depicts a first view of a robotic work cell 400 (an example of the workstation 108-1 of FIG. 1) that is configured with a robotic device (e.g., robotic device 402, an example of the robotic device 111 of FIG. 1) that moves items from a moveable inventory holder (e.g., inventory holder 404, an example of the storage containers 106 of FIG. 1), in accordance with at least one embodiment. A robot work cell is intended to refer to an area (e.g., a subarea of a workstation) in which a robotic device (e.g., robotic device 402) operates.

The robotic device 402 (also referred to as a "transfer apparatus") can include an upright frame components (406a and 406b, collectively referred to as "frame 406") and a lateral frame component (e.g., lateral frame 408), and at least one rotatable head (e.g., a first rotatable head 410. In some embodiments, the robotic device 402 may further include a second rotatable head 412. The lateral frame 408 may extend in or along a first direction D1 (e.g., a horizontal direction or x-axis) within the space between an input area (e.g., area 414) or access points of an operator work area (e.g., operator work area 502 of FIG. 5). Area 414 may be part of the workspace 110 of FIG. 1. The upright frame 406 may be arranged to guide and support movement of the lateral frame 408 in or along a second direction D2 (e.g., a vertical direction or z-axis). The first rotatable head 410 may be supported by the lateral frame 408. The first rotatable head 410 can rotate about an axis (e.g., z-axis) perpendicular to the lateral frame 408 and translate along the lateral frame 408 in the first direction D1. This rotation and translation movement can be performed independently or simultaneously. The second rotatable head 412 may be similar to the first rotatable head 410 and spaced from the first rotatable head 410 along the lateral frame 408. The second rotatable head 412 can rotate about the z-axis and translate along the lateral frame 408 in the first direction D1. This rotation and translation movement can also be performed independently or simultaneously. Furthermore, the second rotatable head 412 can rotate and translate independently of the first rotatable head 410.

In some embodiments, a robotic device (e.g., MDU 416, an example of the MDUs 104 of FIG. 1) may be assigned a task of moving inventory holder 401 to a location within the workstation 108-1 (e.g., location 418). The location 418 may be designated as a location from which robotic device 402 can access various faces, alcoves, containers, etc. of the inventory holder 404. In some embodiments, multiple inventory holders may be brought to different locations in area 414 and the rotatable heads 410 and 412 may be utilized to move items and/or containers to and/or from the multiple inventory holders at substantially the same time.

When inventory holder 404 is positioned in area 414, the rotatable heads 410 and 412 can be moved simultaneously to facilitate faster item transfer compared to serial movements. For example, at a workstation (e.g., the workstation 108-1 of FIG. 1) the second rotatable head may remove a container (e.g., a bin, a tote, etc.) from the inventory holder 404 (i) for replenishing the container with one or more items from an input area or (ii) to remove the container to make space for another container in the inventory holder 404. Additionally, the first rotatable head 410 and/or the second rotatable head 412 can also include an extractor extendible in or along a third direction (e.g., y-direction) to extract or deliver items in or along a third direction (e.g., y-direction).

During items transfer, the rotatable heads 410 and 412 can be rotated and translated independently of each other to facilitate fast item transfer. The rotatable heads 410 and 412 can be vertically aligned by moving the lateral frame 408 along the upright frame 406. By such movement, the rotatable heads 410 and 412 can be vertically aligned with the receiving station discussed in connection with FIG. 5 to pick up or deliver an item, for example. The rotatable heads 410 and 412 can be vertically aligned to reach different levels of the inventory holder. The first rotatable head 410 and the second rotatable head 412 can interface with the inventory holder 404 on one side, or a portion of receiving station on another side.

The rotatable heads 410 and 412 are only examples and other types of heads are possible. For example, one or more heads may be or include a translation system configured to push or pull through an item pushed or pulled from one end to another without rotating the head. For example, an item can be extracted at one end and passed through a length of the head to an opposite side to deliver the item at the receiving station.

In some embodiments, the MDU 416 may be configured to approach the area 414 (e.g., specifically location 415)

according to a predefined path indicated with arrows 420 and 422. The MDU 416 may halt motion and/or rotated the inventory holder 404 according to the task(s) associated with the inventory holder 404, robotic device 402, or workspace. Once the task(s) have been completed (or are determined to be unperformable), the MDU 416 (or a different MDU) may be tasked with removing the inventory holder 404 from area 414, perhaps along an egress route indicated by arrows 424 and 426. In some embodiments, the MDU 416 may wait with the inventory holder 404 at location 415 while the task(s) are completed, or the MDU 416 may leave the inventory holder 404 at location 415 and the MDU 416 (or a different MDU) may return later to retrieve the inventory holder.

Figure 5:
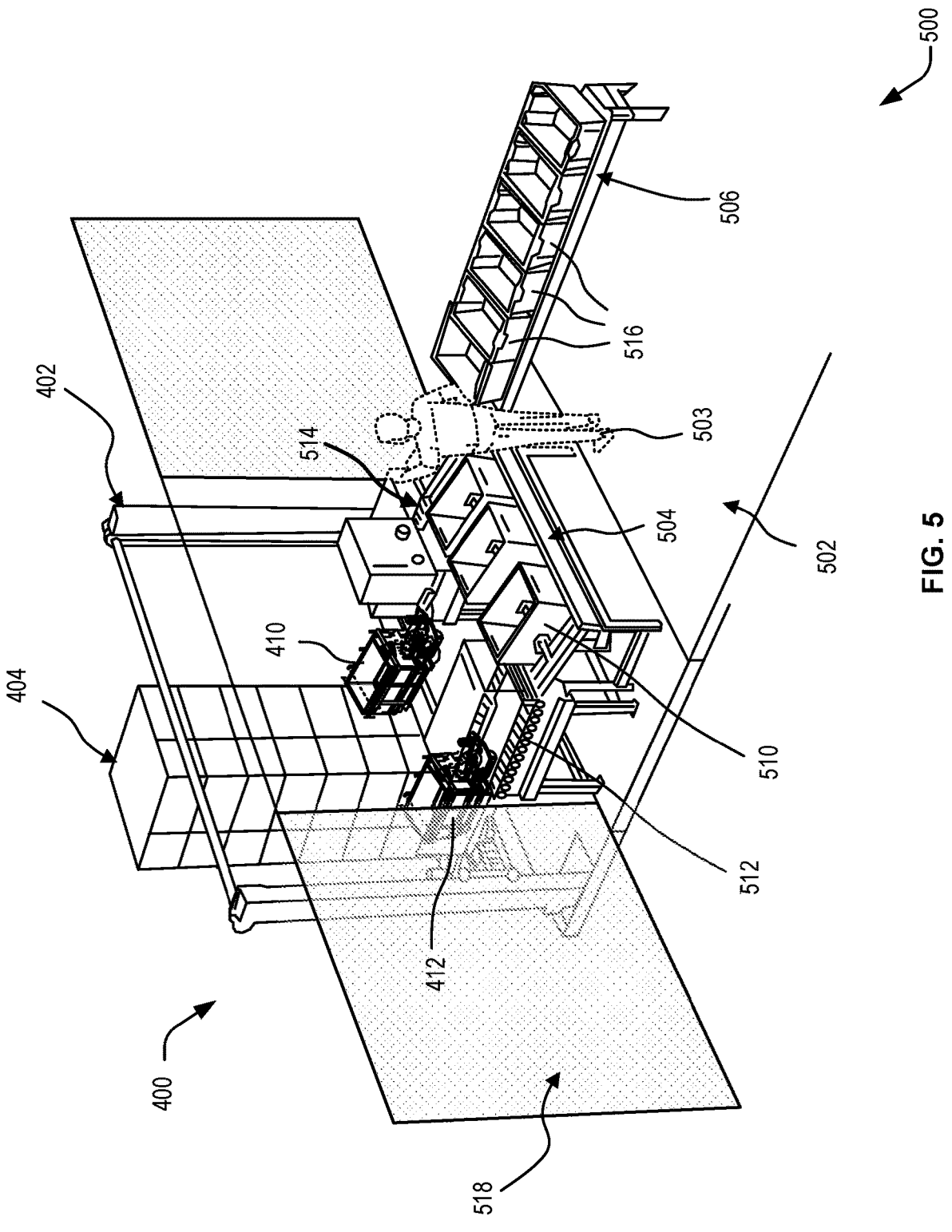
FIG. 5 depicts a view of an example workstation that includes a robotic work cell, in accordance with at least one embodiment.

FIG. 5 depicts a view of an example workstation 500 that includes a robotic work cell (e.g., the robotic work cell 400 of FIG. 4), in accordance with at least one embodiment. The robotic work cell 400 may be a part of a workstation (e.g., workstation 108-1) that includes an operator work area 502 within which one or more operators (e.g., operator 503) may perform a task with robotic device 402 and inventory holder 404. The workstation may include an operator area within which operator 503 may be configured in a similar manner as the robotic work cell 400.

In the illustrated embodiment of FIG. 5, the inventory holder 404 may be positioned adjacent to the robotic device 402 in reach of rotating heads 410 and 412. The operator work area 502 may include any suitable number and/or configuration of workstations such as workstations 504 and 506.

As shown, rotatable head 412 of the robotic device 402 may extract a specified container (e.g., container 510) from the inventory holder 404. The rotatable head 412 may rotate and/or translate vertically and/or horizontally to move the specified container 510 to a suitable position for processing at the workstation (e.g., within operator work area 502). The container 510 may be conveyed, (e.g., via a conveyor 512), to the first workstation 504. The operator 503 may pick up and/or access the container 510. In an example, the operator 503 may extract an item from the container 510. In yet another example, the operator 503 may place the container 510 on a second workstation 506 to be conveyed (e.g., via another conveyor) to a destination.

Additionally or alternatively, a second rotatable head 410 of the robotic device 402 may be used to retrieve containers from the first workstation 504 and induct the retrieved container(s) into the inventory holder 404. For example, the second rotatable head 410 may receive another container from a first platform at a delivery end of the first workstation 504 (e.g., delivery end 514). In another example, the second rotatable head 410 may deliver a container to be replenished by the operator 503. The replenished container can be further conveyed to the delivery end 514 to be stored in the inventory holder 404. In another example, containers 516 or items may be conveyed to the delivery end 514 of the first platform to induct the container 516 into the inventory holder 404. In some embodiments, one or more barriers (e.g., barrier 518) may be utilized to restrict the MDUs or robotic devices from approaching the operator 503 and/or to restrict the operator 503 from nearing the MDUs and/or the robotic devices.

In at least one embodiment, a workspace may utilize any suitable number or type of robotic devices which are positioned at a stationary location of the workspace but configured to move at that stationary location. The specific robotic devices depicted in the examples included herein are illustrative and not intended to limit the scope of this disclosure.

Figure 6:
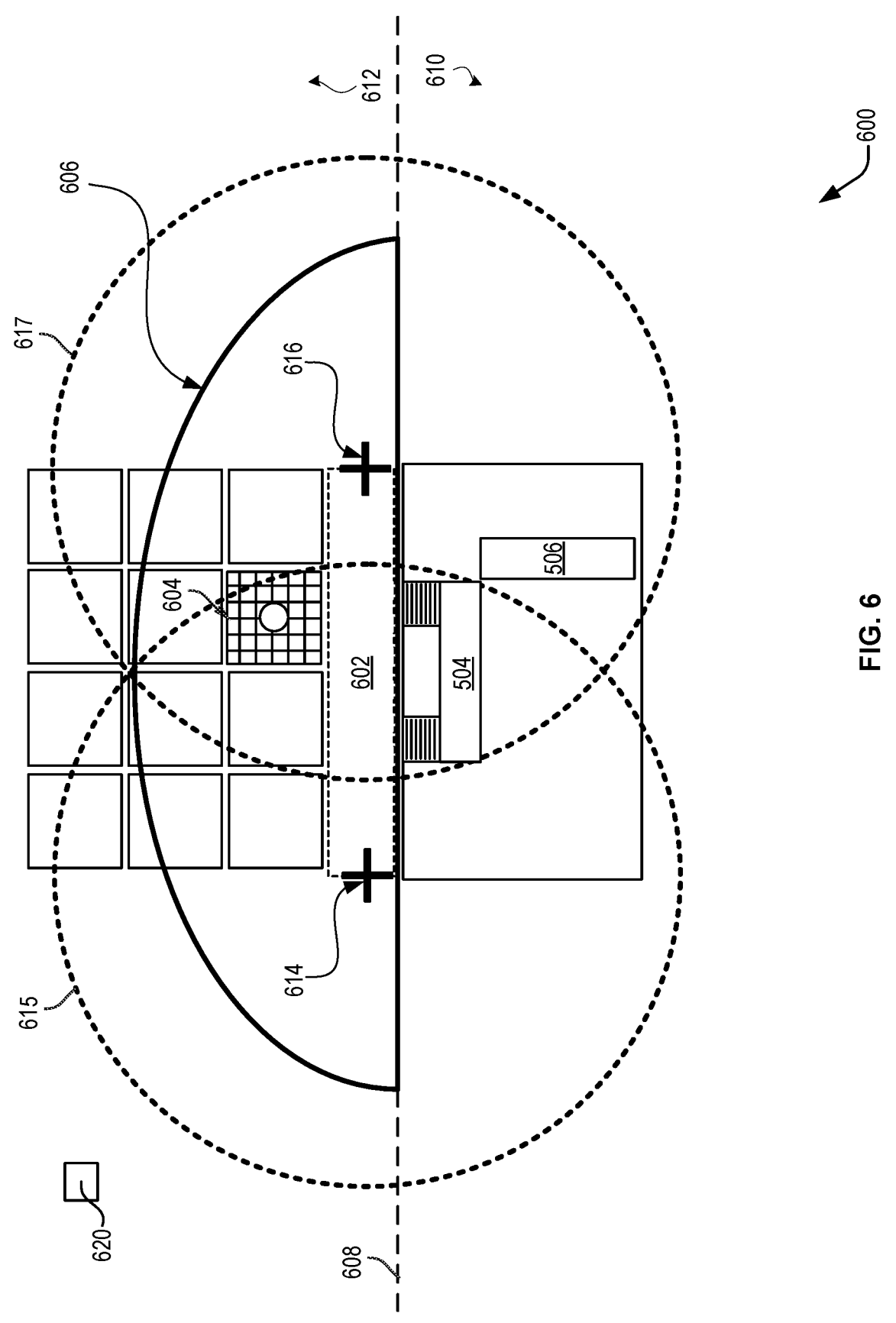
FIG. 6 depicts an aerial view of an example workstation including a robotic work cell that is configured with two receiving devices that are configured in a first configuration, in accordance with at least one embodiment.

FIG. 6 depicts an aerial view of an example workstation 600 (an example of the workstation 500 of FIG. 5) including a robotic work cell that is associated with two receiving devices that are configured in a first configuration, in accordance with at least one embodiment.

Robotic device 602 (an example of the robotic device 402 of FIGS. 4 and 5) may be positioned within the workstation 600 (an example of the workstation 108-1 of FIG. 1) as depicted. An inventory holder 604 (e.g., inventory holder 404) may be positioned within an area (e.g., the area 414 of FIG. 4) adjacent to the robotic device 602.

In some embodiments, the robotic device 602 may be associated with an area of interest (e.g., area 606). In some embodiments, the robotic work cell may be defined by the area perimeter of area 606 or the robotic work cell may be a larger area that includes a larger set or all of the components of a workstation (e.g., workstation computers, robotic devices, workspaces, etc.). Area 606 may correspond to an area in which detection or reception of one or more of the signals provided by the user device 200 of FIG. 2 causes alteration of the motion of the robotic device 602 and/or any suitable robotic or computing component associated with the workstation 600. The perimeter, shape, and measurements of area 606 may be predefined based at least in part on a stopping time associated with the robot device 602. By way of example, it may be known that the robot device 602 takes a total of approximately two seconds to come to a full stop once a stop has been initiated. In some embodiments, the area 606 may include a minimum distance from the robotic device 602 that, if a user walked an average speed toward the robotic device 602 (or at a maximum speed assumed for the user device, or at a known or calculated speed), the robotic device 602 would be able to come to a complete stop before the user device reached the robotic device 602. Or said another way, the distance and/or time needed for the user to travel from the point at which area 606 is breached to reach the robotic device 602 is greater than two seconds corresponding to the time needed for the robotic device 602 to halt motion.

The specific area of interest associated with a robotic device may be differently situated or shaped than the area 606 based at least in part on the specific robotic device(s) and/or placement and configuration of the robotic devices and/or operator work area (e.g., the work area of side 612, an example of the operator work area 502 of FIG. 5). As a non-limiting example, the area 606 may align with boundary 608 corresponding to barriers (e.g., fences, light curtains, etc.) similar to those discussed above (e.g., barrier 518 of FIG. 5). Because in this example, users/operators are restricted from approaching the robotic device 602 from one side (e.g., side 610) of the boundary 608, the area of interest may not be configured to extend onto side 610 and may only extend to side 612, a side facing and/or included in the workspace 110 of FIG. 1.

As depicted in FIG. 6, the robotic work cell and/or workstation 600 includes two receiving devices (e.g., receiving devices 614 and 616), although any suitable number of receiving devices may be used. Each of the receiving devices may be configured to receive signal(s) from the transmitter devices 206 and/or 207 of the user device 200 of FIG. 2. The particular placement and/or configuration of the receiving devices 614 and 616 may be predefined and may depend on the particular robotic device(s) within the robotic work cell and the particular mechanics employed by those device(s). In some embodiments, the particular placement and/or configuration of the receiving devices 614 and 616 may depend on a distance that is determined to be great enough to account for a user device traveling (e.g., at a presumed speed, at a known speed, etc.) toward the robotic device such that robotic device is able to halt motion completely (or substantially completely) prior to the user device reaching the robotic device.

In some embodiments, the receiving device 614 may be configured to receive a signal (e.g., a signal transmitted by transmitter devices 206 and/or 207) within area 615. Similarly, receiving device 616 may be configured to receive a signal within area 617. In some embodiments, the receiving devices 614 and 616 may include more than one receiving device. By way of example, each of the receiving devices 614 and 616 may include two or more receivers. In some embodiments, the receivers of the receiving devices may be configured to receive the same signal (e.g., the shorter-range signal transmitted by the transmitter device 206 and/or 207, corresponding to a stop command) or different signals (e.g., both the shorter-range and longer-range signals transmitted by the transmitter devices 206 and/or 207).

In some embodiments, the receiving devices 614 and/or 616 may be configured with one or more transmitters configured to be used to transmit signals with which the receivers of the receiving devices 614 and 616 may be tested. The transmitters may be configured to simulate transmissions provided by the user devices 118 of FIG. 1. In some embodiments, the receiving devices 614 and/or 616 may transmit indications that they are receiving transmissions (e.g., from the transmitter devices 206 and/or 207, or from transmitters corresponding to the receivers of receiving devices 614 and/or 616. In some embodiments, the proximity monitoring engine 620 (an example of the proximity monitoring engine 117 of FIG. 1) may receive the indications from the receiving devices 614 and/or 616. The proximity monitoring engine 620 may be configured to identify when a receiving device is expected to receive a transmission (e.g., from transmitters configured to simulate transmission provided by the user devices 118) and/or when other receiving devices are receiving a transmission that should be received by the receiving device. As a non-limiting example, the receiving device 614 may include two, redundant receivers that are configured to receive the same frequency signal(s). In some embodiments, the proximity monitoring engine 620 may identify that one receiver, and not the other, is receiving a signal (e.g., a short-range signal transmitted by a user device 118-1, a transmission provided by a corresponding transmitter of the receiving device that is different from the user device 118-1).

In some embodiments, the proximity monitoring engine 620 may identify a lack of signal receipt as being problematic and may transmit data to other components of the workstation 600 that may cause the robotic device 602 and/or any suitable computing device of the workstation 600 to alter a speed or operations based at least in part on receiving the indication. By way of example, if the receiving device 614 includes two receivers and the proximity monitoring engine 620 determines that both receivers of the receiving device 614 are failing to receive a transmission (e.g., a transmission provided by a transmitter of receiving device 614) the proximity monitoring engine 620 may transmit data to one or more computing components to cause the motion of robotic device 602 to halt. The number of receiving devices 614 and 616, the number of receivers at each of the receiving devices, the placement and positioning of the receiving devices with respect to one another and the robotic device 602 (and/or other robotic device(s) of the workspace) may be configured to ensure redundant devices are provided to increase the chance that a breach of the area 606 is detected appropriately.

In some embodiments, the proximity monitoring engine 620 may be configured to identify when an area 606 is not covered by any working receiver of the receiving devices 614 and/or 616. If coverage of any suitable portion of the area 606 is determined to be missing, or in other words, there is a subsection of area 606 in which transmissions from the transmitter devices 206 and/or 207 cannot be received, the proximity monitoring engine 620 may execute operations to cause the robotic device 602 to halt motion. In some embodiments, the proximity monitoring engine 620 may be configured to identify from predefined rules or predefined subsets of necessary working receivers that the area 606 is not fully covered. If the area 606 is not fully covered (e.g., a necessary subset of receivers are not operating properly) instructions may include transmitting data (e.g., a notification, notification data, a command, etc.) to one or more controller devices that are configured to control the robotic device 602 (or some component of the robotic device 602 such as actuators, rotating heads, etc.). The proximity monitoring engine 620 may transmit this data directly, or the proximity monitoring engine 620 may be configured to transmit this indication to the workspace management module 102 of FIG. 1, which in turn can send instructions to various controllers to cause the robotic device 602 or any suitable computing device of the workstation 600 to alter operations (e.g., to slow and/or halt). The proximity monitoring engine 620 may execute at one of the receiving devices 614 or 616, in a distributed manner across the receiving devices 614 and 616, or at a computing device separate from the receiving devices 614 and 616 but in communication (e.g., wired or wireless) with the receiving devices 614 and 616.

In some embodiments, when a fault is detected indicating a receiver and/or transmitter is malfunctioning or is not operational, the proximity monitoring engine 620 may, depending on predefined rules and/or or known subsets of necessary receivers, transmit information to the workspace management module 102 to identify this status. If the area 606 is still entirely covered (e.g., a necessary subset of receivers are still working), the proximity monitoring engine 620 may refrain from instructing slowing or halting operations to be performed. The status information could be used by the workspace management module 102 to assign a subsequent task (e.g., a maintenance or repair task corresponding to replacing or repairing the faulty component) to be performed.

Although a single robotic device 602 is depicted in workstation 600, it should be appreciated that in some embodiments multiple robotic devices may be positioned within workstation 600. Each of these robotic devices may be associated with a respective set of receiving devices. Some of these receiving devices may be configured and/or placed in locations at which the receipt of a signal could cause the proximity monitoring engine 620 to execute operations that slow and/or halt one or more of the robotic devices. In some embodiments, determining a particular receiver is receiving the signal(s) could cause alteration of the operation of one robotic device (a first set of robotic devices and/or computing devices) while the operation of another robotic device (a second set of robotic devices and/or computing devices) is intentionally left unaltered. By way of example, in a workstation that includes two robotic devices, receiving a signal at one receiving device may cause operations to be performed to halt operation/motion at one robotic device, while the operation/motion of the other robotic is left unaltered to the signal indicating a breach of an area of interest associated with the first robotic device, but not of the area of interest associated with the second robotic device. In this manner, the movement of the user device, and the effects of that motion can be isolated to particular devices within the workstation (e.g., the devices that the user device is nearing). If the user device travels to a different location in the workstation and the transmissions of the user device are received at a receiver indicating a breach of the area of interest associated with the other robotic device, that robotic device can be slowed and/or halted as well. The operations of both robotic devices may be slowed and/or halted and may remain so while signals from the user device are determined to correspond to the respective areas of interest associated with each robotic device. Should the user device move again to a location in which its signal is received and determined to correspond only to the area of interest of the second robotic device, the first robotic device may be instructed to resume or speed up operations and/or motion based on a determination that the signal provided by the user device is no longer received or determined to correspond to the area of interest corresponding to the first robotic device.

Figure 7:
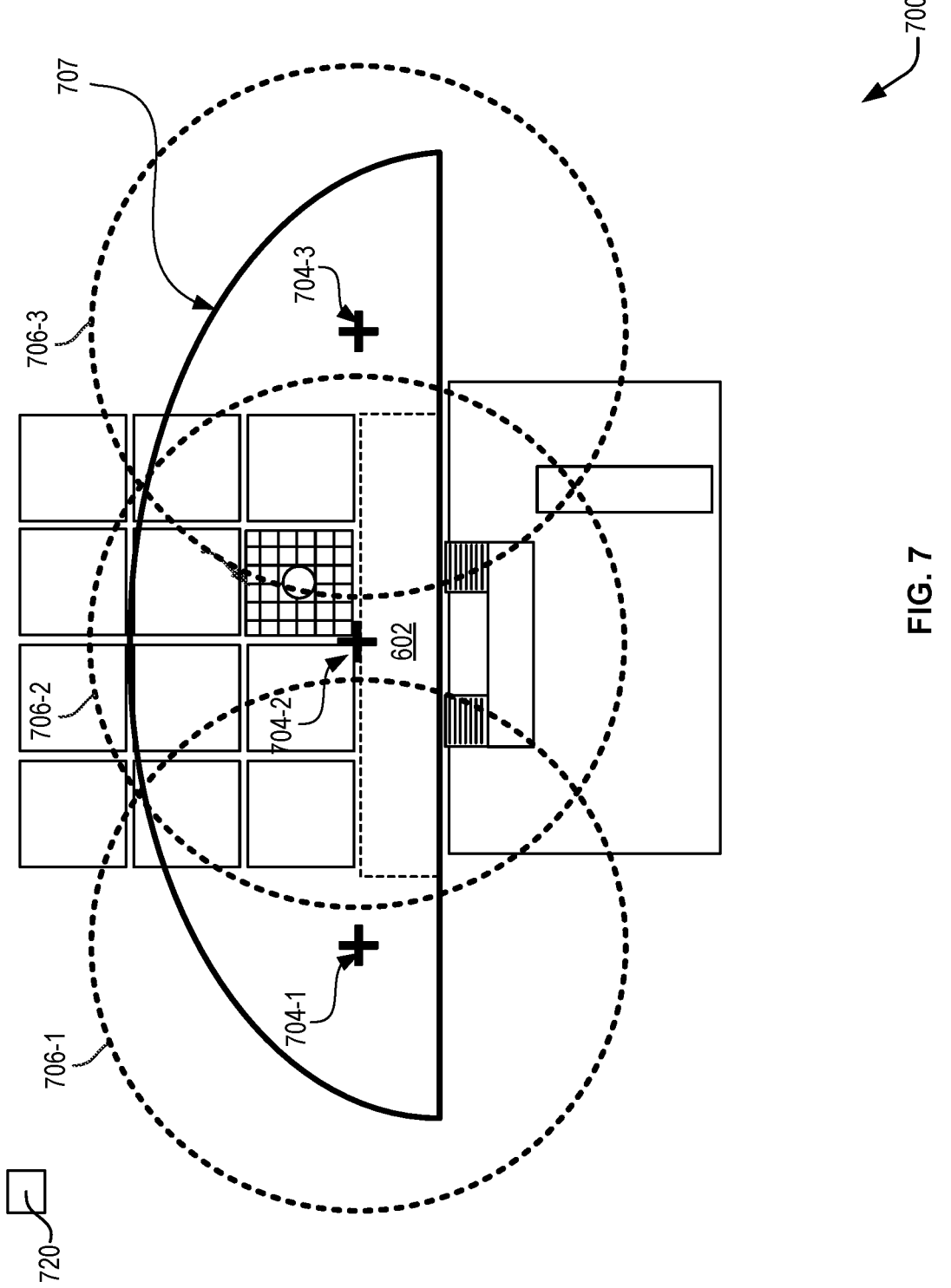
FIG. 7 depicts an aerial view of the workstation and/or robotic work cell of FIG. 6 that is alternatively configured with three receiving devices, each receiving device being configured in a second configuration, in accordance with at least one embodiment.

FIG. 7 depicts an aerial view of the workstation 600 and/or robotic work cell of FIG. 6 that is alternatively configured with three receiving devices, each receiving device being configured in a second configuration, in accordance with at least one embodiment. The robotic device 602 may be associated with area 707 (e.g., area 606 of FIG. 6) as discussed in connection with FIG. 6. However, workstation 600 may include receiving devices 704-1, 704-2, and 704-3, collectively referred to as "receiving devices 704." The receiving devices 704 may individually be associated with areas 706-1, 706-2, and 706-3 (collectively referred to as "areas 706"), respectively. The receiving devices 704 may individually be an example of the receiving devices 614 and/or 616 of FIG. 6 (e.g., the receiving devices 115 of FIG. 1).

The receiving devices may be positioned as depicted in FIG. 7 according to a predefined configuration. The positions and configurations of the receiving devices 704 may depend on the particular robotic device(s) (e.g., robotic device 602) and/or computing devices operating within the workspace 700. The configuration of the receiving devices 704 may provide more redundancy as there is more total area in which areas 706 overlap one another (as compared to the overlap of areas 615 and 617 of FIG. 6.

Proximity monitoring engine 720 (an example of the proximity monitoring engine 620 of FIG. 6, and 117 of FIG. 1) may be configured to receive signals from the receiving devices 704, to identify when the area 707 has been breached by a user device, determine one or more faults of the receiving devices 704, to communicate operational information related to the receiving devices 704 (including indications of the one or more faults), and to instruct or otherwise communication with one or more computing devices to cause those, or different, computing devices to alter motion (e.g., to stop and/or slow).

Figure 8:
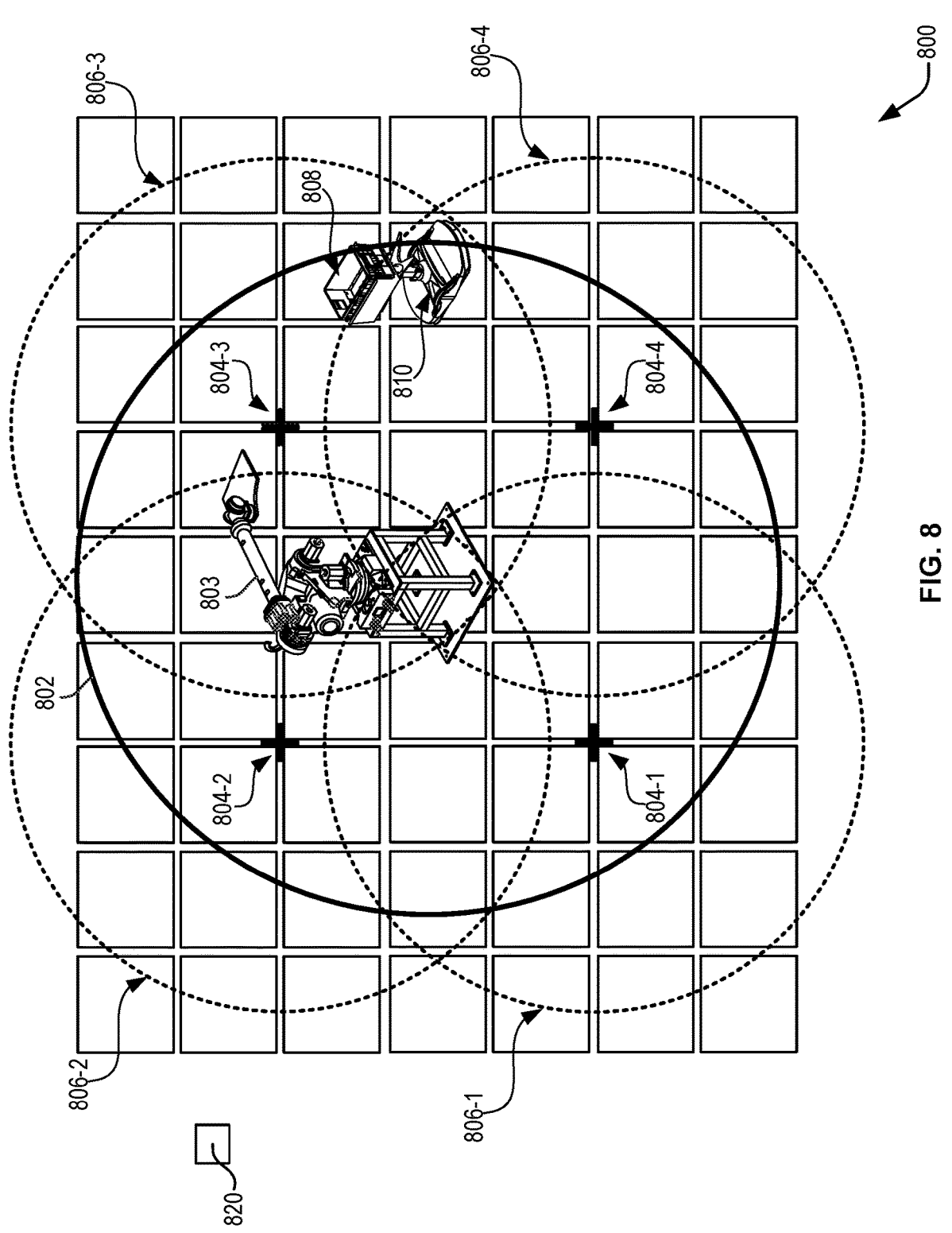
FIG. 8 depicts an aerial view of another example workstation including a robotic work cell, the robotic cell being configured with four receiving devices, in accordance with at least one embodiment.

FIG. 8 depicts an aerial view of another example workstation 800 including a robotic work cell (an area within which robotic device 803 operates, can reach, etc.), the robotic work cell being configured with four receiving devices (e.g., receiving device 804-1, 804-2, 804-3, and 804-4, collectively referred to as "receiving devices 804"), in accordance with at least one embodiment. Robotic work cell (e.g., an example of area 119 of FIG. 1) may include an area 802 that, if breached by a user device (e.g., user device

118-1, as detected by receiving a signal from the user device 118-1 of FIG. 1) should result in shut down of the robotic device 803 (e.g., an example of the robotic device 111 of FIG. 1).

The receiving devices 804 may individually be associated with areas 806-1, 806-2, 806-3, and 806-4 (collectively referred to as "areas 806"), respectively. The receiving devices 806 my individually be an example of the receiving devices 704 of FIG. 7, the receiving devices 614 and/or 616 of FIG. 6, the receiving devices 115 of FIG. 1, and the like. The receiving devices 804 may be positioned as depicted in FIG. 8, according to a predefined configuration. The positions and configurations of the receiving devices 804 may depend on the particular robotic device(s) (e.g., robotic device 802) and/or computing devices operating within the workstation 800. As a non-limiting example, the receiving devices 804 can include a greater number than the receiving devices 614 and 616 of FIG. 6 due to the area 802 being larger than the area 606 of FIG. 6. As depicted, the robotic device 803 may rotate around a fixed point within the area 806 to grasp containers (e.g., container 808) or other items from inventory holders (e.g., storage containers 106 of FIG. 1) and/or from MDUs (e.g., MDU 810, an example of the MDUs 104 of FIG. 1). The configuration of the receiving devices 804 may provide more redundancy as there is more total area within area 802 in which areas 806 overlap one another (as compared to the overlapped of areas 615 and 617 of FIG. 6 within area 606, or the overlapped areas of areas 706 within area 707 of FIG. 7).

Proximity monitoring engine 820 (an example of the proximity monitoring engine 720 of FIG. 7, 620 of FIG. 6, and 117 of FIG. 1) may be configured to receive signals from the receiving devices 804, to identify when any one of the areas 806 have been breached by a user device, to determine one or more faults of the receiving devices 804, to communicate operational information related to the receiving device 804 (including indications of the one or more faults), and to instruct or otherwise communication with one or more computing devices to cause those, or different, computing devices to alter motion (e.g., to stop and/or slow).

Figure 9:
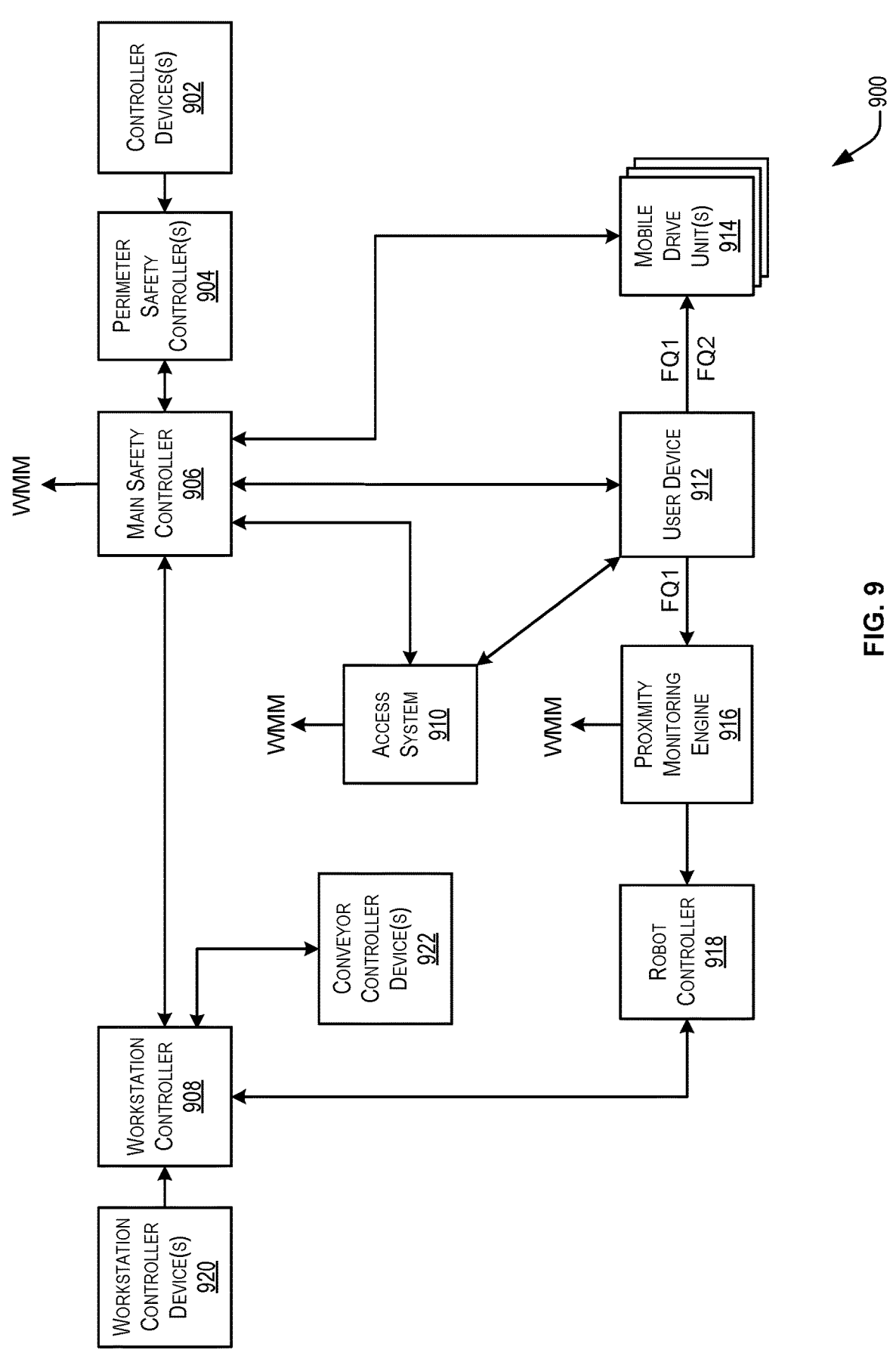
FIG. 9 is a block diagram depicting an example communication flow between computing components of the workspace, in accordance with at least one embodiment.

FIG. 9 is a block diagram depicting an example architecture 900 and communication flow between computing components of a workspace (e.g., the workspace 110 of FIG. 1), in accordance with at least one embodiment. Architecture 900 may include controller device(s) 902. Controller device(s) 902 may include any suitable interface such as a switch, key, lock, button, or gate that may be manipulated by a user to access the workspace. In some embodiments, the controller device(s) 902 may be associated with perimeter safety controller(s) 904. Perimeter safety controller(s) 904 may be configured to execute various safety procedures and/or protocols regarding the input provided at controller device(S) 902. In some embodiments, the perimeter safety controller(s) 904 may be configured to allow or deny access based at least in part on the input provided at controller device(s) 902. Controller device(s) 902 and perimeter safety controller(s) 904 may communicate with each other using a wired or wireless connection (e.g., WiFi, Bluetooth, etc.). Each of the controller device(s) 902 and perimeter safety controller(s) 904 may be an example of the controller device(s) 1012 discussed in connection with FIG. 10.

Perimeter safety controller(s) 904 may communicate via a wired or wireless connection, with main safety controller 906. Main safety controller 906 may be device or computing component that is configured to receive inputs various controller devices (e.g., perimeter safety controller(s) 904, workstation controller 908, access system 910, and/or user device 912 (e.g., the user devices 118 of FIG. 1), and/or MDU(s) 914 (e.g., the MDUs 104 of FIG. 1). Main safety controller 906 may be configured to receive data from these devices/systems and transmit data to the workspace management module (e.g., the workspace management module 102 of FIG. 1, an example of which is workspace management module 1081 discussed below in connection with FIG. 10. In some embodiments, at least one of those devices/systems may be configured to transmit data to the workspace management module directly (e.g., rather than through main safety controller 906. Main safety controller 906 may operate as part of the workspace management module or may be separate from the workspace management module.

Access system 910 may be a controller device that is configured to grant or deny access to the workspace 110 of FIG. 1 based at least in part on interactions between the access system 910 and the user device 912. The user device 912 may be an example of the user devices 118 of FIG. 1. The user device 912 may be used to interact with input devices of the access system 910 in order to obtain access to and/or to leave workspace 110. In some embodiments, interactions between the user device 912 and the access system 910 may cause the user device 912 to be activated in the mannered discussed herein. Thus, in some embodiments, the access system 910 may authenticate and/or validate that the user of user device 912 has permission to enter the workspace and that the components of the user device 912 are activated and/or operating correctly before access to the workspace is granted. It the user does not have permission to enter the workspace and/or one or more of the components of the user device 912 are not activated and/or are faulty or operating outside of expected parameters, the access system 910 may deny access to the workspace. Any suitable information related to authenticating the user, determining whether the user device 912 is activated, determining that one or more components of the user device 912 is faulty or operating outside of expected/allowed parameters, or the like may be communicated (e.g., by the access system 910 and/or the user device 912) via any suitable wired and/or wireless communication.

As discussed in connection with FIG. 1, the user device 912 may be configured to transmit one or more signals (e.g., frequency 1 "FQ1," corresponding to a short-range wireless transmission signal (e.g., 125 kHz) having a particular transmission range, and frequency 2 "FQ2," corresponding to a longer-range wireless transmission signal (e.g., 925 MHz, 433 MHZ, etc.), having a longer transmission range with respect to FQ2. MDU(s) 914 may receive either/both FQ1 and/or FQ2. Receipt of FQ1 by the MDU(s) may cause the MDU(s) 914 to fully stop, while receipt of FQ2 by the MDU(s) 914 may cause the MDU(s) 914 to slow but continuing moving. The signals may be received in any suitable order, but typically, the longer-range wireless transmission signal is received first, causing an MDU to slow, before the short-range wireless transmission signal is received, causing the MDU to stop altogether. In some embodiments, the MDU may be slowed and/or stopped for as long as the signal is being received from the user device 912.

Similarly, proximity monitoring engine 916 (e.g., an example of the proximity monitoring engine 117 of FIG. 1) may be configured to receive one or more signals from user device 912. In some embodiments, the proximity monitoring engine 916 may receive the signals via one or more receiving devices such as those discussed above in connections with FIGS. 1 and 6-8. The proximity monitoring device 916 may operate at one of these receiving devices, or the proximity monitoring device 916 may operate separate from the receiving devices but be configured to communicate with the receiving devices via any suitable wired or wireless communication connections. Although depicted as only receiving FQ1, proximity monitoring engine 916 may receive either/both FQ1 and/or FQ2. Receipt of FQ1 by the proximity monitoring engine 916 may cause the robotic device(s) and/or computing device(s) of the workspace to slow and/or stop, depending on the signal received. As a non-limiting example, the proximity monitoring engine 916 may be configured to transmit (via a wired or wireless communication connection) notification data indicating the receipt of the signal (e.g., signal FQ1 as depicted and/or signal FQ2) to robot controller 918.

Robot controller 918 may be configured to control any suitable components of a robotic device (e.g., the robotic device 111 of FIG. 1) such as actuators, motors, computing devices, and the like. In some embodiments, the proximity monitoring engine 916 and/or the robot controller 918 may transmit (via a wired or wireless communication connection) to the workstation controller 908. In some embodiments, the workstation controller 908 may be configured to exchange data with one or more controller devices of one or more subsystems of the workstation. By way of example, other robotic devices of the workstation, access gates, actuators, or the like may be controlled by workstation controller device(s) 920. In some embodiments, conveyor controller device(s) 922 may be configured to control one or more conveyor devices within a workspace. The workstation controller 908 may be configured to receive task information (e.g., directly or indirectly from workspace management module 102 of FIG. 1), to instruct various subsystem controllers (e.g., robot controller 918, workstation controller device(s) 920, and/or conveyor controller device(s) 922) according to the task information received. In some embodiments, the workstation controller 908 and/or the robot controller 918 can act as main controlling units of the various devices operating within the workspace. The proximity monitoring engine 916 may utilize the signals received from user device 912 to identify a breach of an area of interest within the workspace (e.g., a predefined area around a robotic device). The proximity monitoring engine 916 may be configured to monitor receiving devices for faults in the manner discussed in more detail with respect to FIG. 14. The proximity monitoring engine 916 utilize predefined configuration and/or placement data corresponding to one or more receiving devices (not depicted here) to identify whether particular faults should result in a remedial action (e.g., slowing and/or stopping of the robotic and/or computing devices of the workstation/workspace).

Any suitable combination of the workstation controller device(s) 920, the workstation controller 908, the conveyor controller device(s) 922, the robot controller 918, and/or the proximity monitoring engine 916, and/or the receiving devices 115 of FIG. 1 (not depicted here in FIG. 9) may be combined in any suitable manner such that any suitable functionality of these components can be combined and provided according to a different arrangement of computing components.

Figure 10:
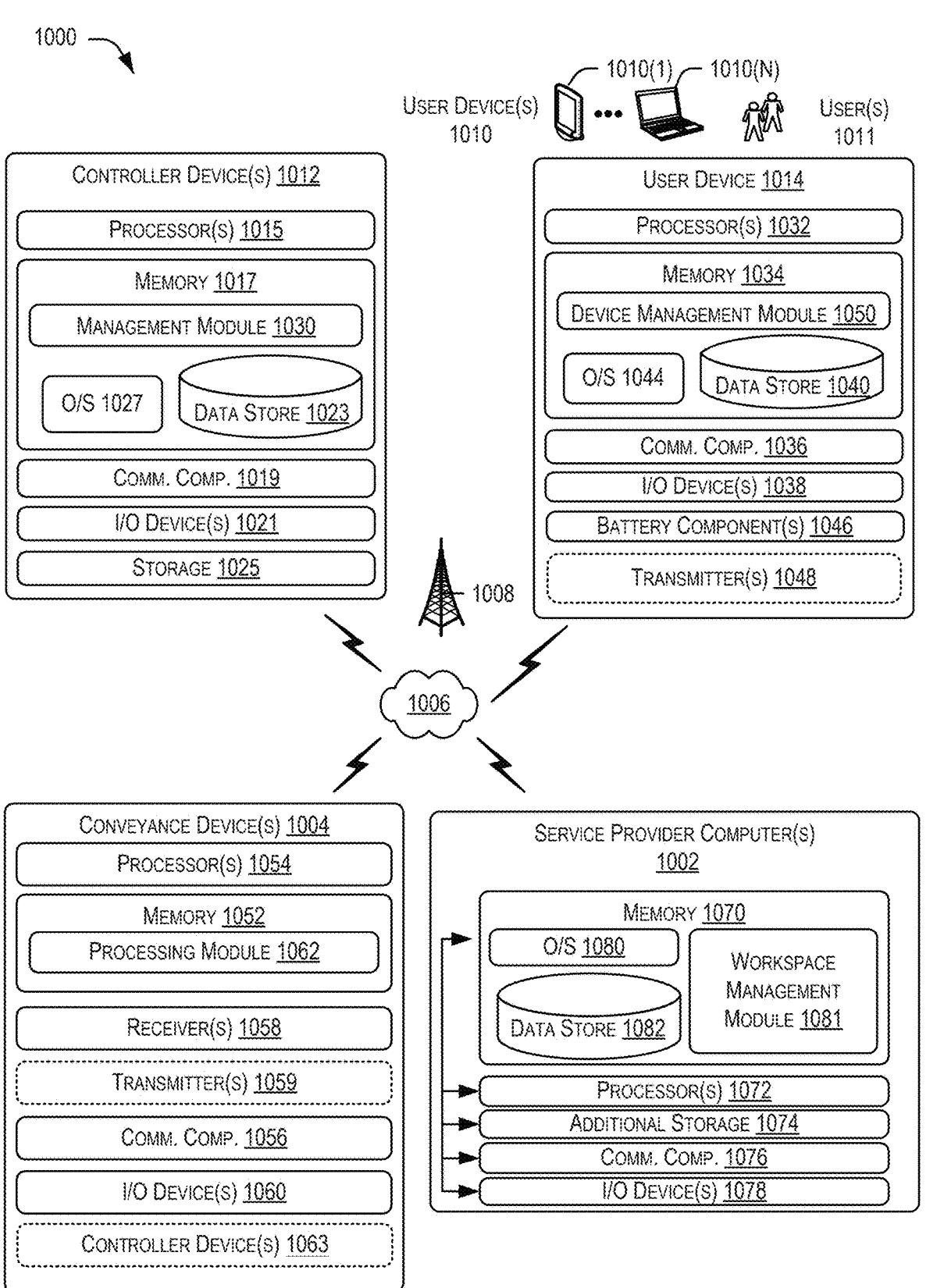
FIG. 10 is an example system architecture for an inventory system, in accordance with at least one embodiment.

FIG. 10 is an example system 1000 for implementing aspects of the inventory management system depicted in FIG. 1, in accordance with at least one embodiment. System 1000 may be an example of the inventory management system 100 of FIG. 1. System 1000 may include any suitable combination of service provider computer(s) 1002, conveyance device(s) 1004 (MDU(s) 104 of FIG. 1, robotic device 111 of FIG. 1, etc.), user device(s) 1010, (e.g., handheld devices, user device 118 of FIG. 1, etc.), and controller device(s) 1012 (e.g., access controller devices corresponding to the access points 109 of FIG. 1). In some embodiments, the service provider computer(s) 1002 may support an electronic marketplace (not shown) and interface with purchase and delivery services of the electronic marketplace. In this manner, the service provider computer(s) 1002 may coordinate receiving, storing, packaging, and shipping of items in a warehouse operated by, or on behalf of, the electronic marketplace provider. In some examples, the service provider computer(s) 1002 may be a stand-alone service operated on its own or in connection with an electronic marketplace.

In some embodiments, service provider computer(s) 1002, conveyance device(s) 1004, user device(s) 1010 (e.g., a handheld user device, user devices 118 of which user device 1014 is an example, etc.), may communicate via one or more network(s) 1006 (hereinafter, "the network(s) 1006"). In some embodiments, user device 1014 may be configured to be a wearable device (e.g., based at least in part on being affixed to the wearable article 300 of FIG. 3, etc.). The network(s) 1006 may include any one or a combination of many different types of networks, such as cable networks, the Internet, wireless networks, cellular networks, radio networks, and other private and/or public networks. At least one of the network(s) 1006 may be accessible via access device 1008. The access device 1008 may include any suitable device that act as a transmitter and/or receiver of local area wireless network signals (e.g., "Wi-Fi", Long Term Evolution (LTE), Bluetooth, WirelessHD and WiGig, and Z-Wave).

User device(s) 1010 may be operable by one or more user(s) 1011. The user device(s) 1010 may be any suitable device (e.g., portable or non-portable) capable of communicating with the network(s) 1006 and operable by the user(s) 1011. In some embodiments, at least one of the user device(s) 1010 may be handheld, wearable, or stationary, and may include any suitable computing device such as, but not limited to, the user device 200 of FIG. 2, a mobile phone, a smart phone, a personal digital assistant (PDA), a laptop computer, a thin-client device, a tablet PC, a desktop computer, a scanner, or other computing device.

User device(s) 1010, including user device 1014, may include corresponding processor(s) 1032, memory 1034, communication component(s) 1036, I/O device(s) 1038, one or more data store 1040, an operating system 1044, transmitter(s) 1048 (e.g., the transmitters of user device 118 discussed above in connection with FIG. 1, the transmitter devices 206 and/or 207 of FIG. 2, etc.), and, in particular embodiments, a device management module 1050. In some embodiments, the user device 1014 is battery operated and includes battery component(s) 1046. The processor(s) 1032 may be implemented as appropriate in hardware, computer-executable instructions, software, firmware, or combinations thereof. Computer-executable instruction, software or firmware implementations of the processor(s) 1032 may include computer-executable or machine-executable instructions written in any suitable programming language to perform the various functions described. The memory 1034 may include more than one memory and may be distributed throughout the user device 1014. The memory 1034 may store program instructions (e.g., the device management module 1050) that are loadable and executable on the processor(s) 1032, as well as data generated during the execution of these programs.

Depending on the configuration and type of memory, the memory 1034 may be volatile (such as random-access memory (RAM)) and/or non-volatile (such as read-only memory (ROM), flash memory, or other memory). The memory 1034 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 1034 may include multiple different types of memory, such as static random-access memory (SRAM), dynamic random-access memory (DRAM), or ROM. Turning to the contents of the memory 1034 in more detail, the memory 1034 may include an operating system 1044 and one or more application programs, modules or services for implementing the features disclosed herein including at least the device management module 1050.

In some examples, the user device 1014 may also include additional storage (not depicted), which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices.

The memory 1034, and/or the additional storage, may include volatile or non-volatile, removable or non-removable media implemented in any method or technology for storage of information such as computer-readable instructions, data structures, program modules, or other data. The memory 1034 and the additional storage are all examples of non-transitory computer storage media. Additional types of non-transitory computer storage media that may be present in the user device 1014 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the user device 1014. Combinations of any of the above should also be included within the scope of non-transitory computer-readable media.

The user device 1014 may also contain communication component(s) 1036 that allow the user device 1014 to communicate with a data store, access control units (e.g., an example of the controller device(s) 1012 corresponding to a particular access point such as access point 109-1 of FIG. 1), another computing device or server, user terminals and/or other devices via the network(s) 1006. In some embodiments, the communication component(s) 1036 may include transmitter(s) 1048 which individually may be examples of the transmitter device 206 and/or 207 of FIG. 2), or the transmitter(s) 1048 may be separate from the communication component(s) 1036.

In some embodiments, the one or more transmitter(s) 1048 may each be an ultra-wide band (UWB) radio transmitter. In some embodiments, more than one (e.g., two) transmitters may be included in the user device 1014. Each transmitter may be preconfigured to transmit one or more radio signals via on or more particular frequencies each associated with a particular range. For example, each of the transmitter(s) 1048 may be configured to transmit a first radio signal at a particular frequency (e.g., 925 MHz, 433 MHZ, etc.) associated with a particular range and a second radio signal at a different frequency (e.g., 125 kHz) associated with a different range that is less than the range of the first radio signal. In some embodiments, the transmitter(s) may individually include the processor(s) 1032, the components of the memory 1034 (including the device management module 1050), and/or the communication components(s) 1036. Accordingly, each transmitter may operate an instance of the device management module 1050. In some embodiments, the transmitter(s) 1048 may be configured to communicate with one another to exchange operational state information, to coordinate amongst one another with respect to radio signal transmission and/or fault monitoring efforts, and/or to exchange any suitable information associated with the transmitter(s) 1048.

The user device 1014 may include I/O device(s) 1038, such as any suitable combination of user input device 202 of FIG. 2, feedback device 212 of FIG. 2, visual feedback device 220 of FIG. 2, a keyboard, a mouse, a pen, a voice input device, a touch input device, a display, speakers, a printer, or the like.

The user device 1014 may include data store 1040. The data store 1040 may include one or more databases, data structures, or the like for storing and/or retaining information associated with the user device 1014 such as any suitable data related to task assignments, instructions, and/or task performance information.

In some embodiments, the device management module 1050 may be configured to provide one or more graphical user interfaces at the user device 1014 (e.g., via a display of the user device 1014). By way of example, the device management module 1050 may be configured to provide user interfaces for selecting a user device (e.g., the user device 118-1 of FIG. 1, the user device 200 of FIG. 2, etc.). Selection of the user device may associate the user of the user device used for selection with a particular user device (e.g., user device 118-1) to be used to gain access to the workspace. The association may be maintained at the user device 1014 and/or transmitted to and maintained by the service provider computer(s) 1002. The device management module 1050 may be configured to receive task assignments (e.g., the task assignments 116 of FIG. 1) from the service provider computer(s) 1002 (e.g., the workspace management module 1081). Any suitable information related to the task assignment may be presented via the I/O device(s) 1038. In some embodiments, the device management module 1050 may provide one or more user interfaces for collecting any suitable user input such as a planned path of the user, task performance information, or the like. The device management module 1050 may be configured to transmit and receive any suitable information from any suitable component of the user device 1014, the conveyance device(s) 1004, and/or the service provider computer(s) 1002 via the network(s) 1006. Any suitable data received, transmitted, and or collected by the user device 1014 may be presented at the user device 1014 via the I/O device(s) 1038 (e.g., via a display and/or speaker of the user device 1014).

The user device 1014 may also include one or more battery component(s) 1046. The battery component(s) 1046 may be configured to provide battery power to any suitable combination of the components of the user device 1014.

The user device 1014 may be configured to communicate with any suitable component of the inventory management system such as the controller device(s) 1012, an example of which is an access control unit of an access point (e.g., the access points 109 of FIG. 1), the conveyance device(s) 1004, and/or the service provider computer(s) 1002 via the network(s) 1006. The specific functionality of the device management module 1050 may be discussed further with respect to FIG. 12. Various components of FIG. 9, such as perimeter safety controller(s) 904, controller device(s) 902, workstation controller device(s) 920, workstation controller 908, conveyor controller device(s) 922, robot controller 918 (corresponding to robotic device 111 of FIG. 1), and access system 910 are each an example of the controller device(s) 1012.

System 1000 may include controller device(s) 1012 that may be configured to perform operations corresponding to controlling one or more devices of the workspace (e.g., a gate, light curtain, or other barrier device of the access points 109 of FIG. 1, one or more robotic devices such as the robotic device 111 of FIG. 1, one or more of the user device 1014, or any suitable device operating in the workspace 110 of FIG. 1 and/or, specifically, a device operating as part of the workstation(s) 108). The controller device(s) 1012 may include at least one memory 1017 and one or more processing units or processor(s) 1015. The memory 1017 may store program instructions that are loadable and executable on the processor(s) 1015, as well as data generated during the execution of these programs. Depending on the configuration and type of the controller device(s) 1012, the memory 1017 may be volatile (such as random-access memory (RAM)) and/or non-volatile (such as read-only memory (ROM), flash memory, etc.). The controller device(s) 1012 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the controller device(s) 1012. In some implementations, the memory 1017 may include multiple different types of memory, such as static random-access memory (SRAM), dynamic random-access memory (DRAM), or ROM.

In some embodiments, the controller device(s) 1012 may include communication components(s) 1019 for communicating with one or more other components and/or devices of the system 1000 (e.g., service provider computer(s) 1002, one or more computing device(s) (e.g., actuators, light curtain emitters/receivers, etc. (not depicted)) that are associated with an access point, a workstation, or the workspace, etc.) via any suitable wireless protocol (e.g., WiFi, Bluetooth®, Bluetooth Low Energy®, etc.). In some embodiments, a barrier device (not depicted) is configured to remove a physical barrier (e.g., a door, a gate, a light curtain, etc.) from blocking access to the workspace through the access point or activate a physical barrier to block access to the workspace. In some embodiments, the controller device(s) 1012 may include any suitable component (e.g., actuators, light emitters, etc.) configured to provide the functionality of a barrier device (e.g., to enable or restrict access to the workspace via manipulating a physical barrier). In some embodiments, the controller device(s) 1012 may include any suitable component (e.g., actuators, control units, etc.) configured to modify motion of any suitable component of the robotic devices. Although not depicted, in some embodiments, the controller device(s) 1012 may include one or more receiver(s) for receiving signals (e.g., radio signals) from the one or more transmitter(s) 1048 of the user device 1014.

In some embodiments, the controller device(s) 1012 may include one or more input/output (I/O) device(s) 1021. The I/O device(s) 1021 may include any suitable combination of sensors such as time of flight sensors, imaging devices (e.g., one or more cameras), infrared sensors, thermal sensors, optical sensors, scanners, and the like. In some embodiments, the I/O device(s) 1021 may include any suitable number and/or type of user interface. By way of example, the I/O device(s) 1021 may include a speaker, keyboard, keypad, switch, key, display, or the like.

The management module 1030 may be configured to receive and/or transmit any suitable data (e.g., via communication components(s) 1019 and/or input/output device(s) 1021) related to verifying user device identification information (e.g., identification information of user device 1014), transitioning (or causing transition) of an operational state of the user device 1014, and/or enabling or restricting access to a workspace via one or more access points (e.g., access point 109-1). In operation, management module 1030 can receive and/or transmit any suitable data to the service provider computer(s) 1002 and/or user device(s) 1010 at any suitable time. For example, the management module 1030 may receive identification information from the user device(s) 1010 and/or the service provider computer(s) 1002. In some embodiments, the management module 1030 may receive light signals via I/O device(s) 1021 (e.g., light signals emitted by I/O device(s) 1038, such as feedback device 212 of FIG. 2).

In some embodiments, the management module 1030 may be configured to control one or more actuators or computing components of the conveyance device(s) 1004 or any suitable computing device within the workspace 110 of FIG. 1 (e.g., the user device(s) 1010, the conveyance device(s) 1004, etc.). In some embodiments, one or more of the controller device(s) 1012 may be operating at one or more of the conveyance device(s) 1004 (e.g., as depicted by controller device(s) 1063), or the controller device(s) 1012 may operate as separate components different from the conveyance device(s) 1004.

System 1000 may include conveyance device(s) 1004 (e.g., MDUs, robotic device 111) that may be configured to move within a workspace. By way of example, the conveyance device(s) 1004 may each be an example of MDU(s) 104 of FIG. 1 and/or the robotic devices described in connection with FIGS. 4-9. The conveyance device(s) 1004 may include at least one memory 1052 and one or more processing units or processor(s) 1054. The memory 1052 may store program instructions that are loadable and executable on the processor(s) 1054, as well as data generated during the execution of these programs. Depending on the configuration and type of the conveyance device(s) 1004, the memory 1052 may be volatile (such as random-access memory (RAM)) and/or non-volatile (such as read-only memory (ROM), flash memory, etc.). The conveyance device(s) 1004 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the conveyance device(s) 1004. In some implementations, the memory 1052 may include multiple different types of memory, such as static random-access memory (SRAM), dynamic random-access memory (DRAM), or ROM.

In some embodiments, the conveyance device(s) 1004 (e.g., the MDU(s) 104, the robotic device 111, etc.) may include communication component(s) 1056 for communicating with one or more other components and/or devices of the system 1000 such as the user device(s) 1010 (including the user device 1014), and/or the service provider computer(s) 1002 via any suitable wireless protocol (e.g., WiFi, Bluetooth®, Bluetooth Low Energy®, etc.). In some embodiments, the conveyance device(s) 1004 may also include one or more receiver(s) 1058 for receiving radio signals from the one or more transmitter(s) 1048 of the user device 1014. The conveyance device(s) 1004 may further include one or more input/output (I/O) device(s) 1060. The I/O device(s) 1060 may include any suitable combination of sensors such as time of flight sensors, imaging devices (e.g., one or more cameras), infrared sensors, thermal sensors, optical sensors, scanners, and the like. In some embodiments, the I/O device(s) 1060 may include feedback devices such as one or more speakers, one or more lights (e.g., LED lights), or the like.

The processing module 1062 may be configured to receive and/or transmit any suitable data related to task assignments (e.g., the task assignments 116), space reservation requests, navigational information of the conveyance device(s) 1004 (of the MDUs 104), operational state information of the conveyance device(s) 1004, movement commands, and/or any suitable data related to operating within the system 1000. In operation, processing module 1062 can receive and/or transmit any suitable data to the service provider computer(s) 1002 at any suitable time. For example, the processing module 1062 may receive a task assignment and/or instructions from the workspace management module 1081 and may be configured to perform a variety of operations according to the task assignment and/or instructions received. During performance of a task, or at any suitable time, the processing module 1062 (of an MDU) may be configured to transmit navigational information (e.g., current location, current speed, etc.), sensor data received from the I/O device(s) 1060, and/or operational state information (e.g., any suitable data indicating that the MDU or robotic device is operating in a particular state such as "slow" or "stop," that the MDU or robotic device is receiving one or more radio signals and/or the corresponding frequencies of the radio signal(s) being received, or the like).

The processing module 1062 may be configured to detect that the receiver(s) 1058 are receiving one or more signals provided by the transmitter(s) 1048 of the user device 1014. In response, the processing module 1062 may be configured to transmit navigational information, operational state information, or any suitable data to the workspace management module 1081. In some embodiments, upon detecting that a radio signal(s) corresponding to the transmitter(s) 1048 is being received by the receiver(s) 1058, the processing module 1062 may be configured to indicate the same via one or more I/O device(s) 1060. By way of example, receipt of a signal of a particular frequency may cause the processing module 1062 to present (e.g., via a LED light and/or a speaker) an indication that a signal of that particular frequency is being received. The particular indications provided by the processing module 1062 via the I/O device(s) 1060 may vary based at least in part on the frequency of the signal currently being received by the receiver(s) 1058. In some embodiments, the processing module 1062 may provide any suitable combination of the functionality of the proximity monitoring engine described in the above figures (e.g., proximity monitoring engine 117 of FIG. 1).

In some embodiments, the conveyance device(s) 1004 may include one or more transmitter(s) 1059. Transmitter(s) 1059 may be configured to transmit signals of the same frequency/frequencies as the transmitter(s) 1048 of the user device 1014. These transmitter(s) 1059 may be utilized to test reception of the receiver(s) 1058. The signals transmitted by transmitter(s) 1059 may be initiated by the transmitter(s) 1059 according to a predefined schedule or periodicity, and/or the signals transmitted by the transmitter(s) 1059 may be controlled and/or initiated by the processing module 1062. The signals transmitted by the transmitter(s) 1059 are, in some embodiments, configured to be differentiable from the signals transmitted by the transmitter(s) 1048 of user device 1014.

The service provider computer(s) 1002, perhaps arranged in a cluster of servers or as a server farm, may host web service applications. These servers may be configured to host a website (or combination of websites) viewable via the user device(s) 1010. In at least one example, the service provider computer(s) 1002 may be configured to manage the conveyance device(s) 1004 as part of an inventory management system. The service provider computer(s) 1002 may include at least one memory 1070 and one or more processing units (or processor(s)) 1072. The processor(s) 1072 may be implemented as appropriate in hardware, computer-executable instructions, software, firmware, or combinations thereof. Computer-executable instruction, software or firmware implementations of the processor(s) 1072 may include computer-executable or machine-executable instructions written in any suitable programming language to perform the various functions described.

The memory 1070 may include more than one memory and may be distributed throughout the service provider computer(s) 1002. The memory 1070 may store program instructions (e.g., workspace management module 1081, an example of the workspace management module 102 of FIG. 1) that are loadable and executable on the processor(s) 1072, as well as data generated during the execution of these programs. Depending on the configuration and type of memory, the memory 1070 may be volatile (such as random-access memory (RAM)) and/or non-volatile (such as read-only memory (ROM), flash memory, or other memory). The service provider computer(s) 1002 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1070 may include multiple different types of memory, such as static random-access memory (SRAM), dynamic random-access memory (DRAM), or ROM.

Turning to the contents of the memory 1070 in more detail, the memory 1070 may include an operating system 1080 and one or more application programs, modules or services for implementing the features disclosed herein including at least the workspace management module 1081. In some examples, the conveyance device(s) 1004 may individually execute some portion of the workspace management module 1081 to operate, at least partially, independent of the service provider computer(s) 1002.

In some examples, the service provider computer(s) 1002 may also include additional storage 1074, which may include removable storage and/or non-removable storage. The additional storage 1074 may include, but is not limited to, magnetic storage, optical disks, and/or tape storage. The disk drives and their associated computer-readable media may provide non-volatile storage of computer-readable instructions, data structures, program modules, and other data for the computing devices.

The memory 1070 and the additional storage 1074, both removable and non-removable, are examples of computer-readable storage media. For example, computer-readable storage media may include volatile or non-volatile, remov-able, or non-removable media implemented in any suitable method or technology for storage of information such as computer-readable instructions, data structures, program modules, or other data. As used herein, modules may refer to programming modules (e.g., software programs) that are executed by computing systems (e.g., processors) that are part of the service provider computer(s) 1002. The modules of the service provider computer(s) 1002 may include one or more components. The service provider computer(s) 1002 may also include input/output (I/O) device(s) 1078 and/or ports, such as for enabling connection with a keyboard, a mouse, a pen, a voice input device, a touch input device, a display, speakers, a printer, or other I/O device.

In some examples, the I/O device(s) 1078 may present one or more user interfaces for interacting with the service provider computer(s) 1002. These user interfaces may include graphical user interfaces, web-based applications, programmatic interfaces such as application programming interfaces (APIs), or other user interface configurations. The service provider computer(s) 1002 may also include data store 1082. The data store 1082 may include one or more databases, data structures, or the like for storing and/or retaining information associated with the service provider computer(s) 1002 and/or information received from any suitable component of the inventory management system (e.g., the user device 1014, the user device(s) 1010, the conveyance device(s) 1004) including, but not limited to, navigational information, operational state information, user input provided at a user device (e.g., the user device 1014), and the like.

The various components and computing/management modules of FIG. 10 are depicted in an example configuration. It should be appreciated that any functionality provided by these components may be similarly provided in different architectures and configuration. As a non-limiting example, some portion of the functionality of the processing module 1062 (e.g., the functionality corresponding to the proximity monitoring engine of FIGS. 1 and 4-9) may be provided as part of the conveyance device(s) 1004 as depicted, and/or some portion of that functionality may be provided via a computing device that is separate from the conveyance device(s) 1004 but is in wired or wireless communication with the conveyance device(s) 1004. Some embodiments describe the functionality of the proximity monitoring engine at the receiver(s) 1058 (e.g., as part of a receiving device such as receiving device 614 of FIG. 6, that in some embodiments include any suitable combination of the receiver(s) 1058 and/or transmitter(s) 1059). These examples are used for illustrative purposes only and are not intended to limit the scope of this disclosure. Any suitable functionality of the receiver(s) 1058, transmitter(s) 1059, controller device(s) 1012 and/or 1063, processing module 1062, and the like, may be performed by separate devices in communication with one another, or any suitable portion of that functionality can be combined in any suitable manner and provided by any suitable combination of computing devices.

FIG. 11 illustrates in greater detail the components of a particular embodiment of a workspace management module 1101 (e.g., the workspace management module 102 of FIG. 1, the workspace management module 1081 of FIG. 10. As shown, the example embodiment includes a resource scheduling module 1102, a path planning module 1104, a segment reservation module 1106, an inventory module 1108, a communication interface module 1110, an authentication module 1114, an input/output processing module 1116, a fault detection module 1118, a location estimation module 1120, and an activation management module 1122. The workspace management module 1101 may represent a single component, multiple components located at a central location within an inventory management system of FIG. 1, or multiple components distributed throughout inventory management system.

In at least one embodiment, the resource scheduling module 1102 may be configured to process received inventory requests and generate one or more assigned tasks to be completed by the components of the inventory management system described in the figures above. The resource scheduling module 1102 may also select one or more appropriate components (e.g., one or more MDU(s) (e.g., MDU(s) 104 of FIG. 1, conveyance device(s) 1004 of FIG. 10), one or more robotic devices (e.g., the robotic device 111 of FIG. 1), one or more operators corresponding to one or more user device(s) 1010 of FIG. 10, etc.) for completing the assigned tasks (e.g., movement of a storage container, storage/retrieval of an item, performance of a maintenance task, etc.) and may communicate, via the communication interface module 1110, the assigned tasks to the relevant components. In some examples, the resource scheduling module 1102 may select the one or more appropriate components based on a location of the component, the capabilities of the component, a current task assignment of the component, and the like.

In at least one embodiment, the path planning module 1104 may receive path request(s) from the MDUs 104. A path request may identify one or more destinations associated with a task (e.g., moving a storage container, storing/retrieving an item within/from a storage container, etc.) the requesting component is tasked with executing. In response to receiving a path request, the path planning module 1104 may generate a path to one or more destinations identified in the path request. The path planning module 1104 may implement any appropriate algorithms utilizing any appropriate parameters, factors, and/or considerations to determine the appropriate path. After generating an appropriate path, the path planning module 1104 may transmit a path response identifying the generated path to the requesting robotic device using the communication interface module 1110.

In at least one embodiment, the segment reservation module 1106 may receive reservation requests from the MDUs 104 that are attempting to move along paths generated by the path planning module 1104. These reservation requests may indicate a request for the use of a particular portion of the workspace (referred to herein as a "segment") to allow the requesting MDUs 104 efficiently utilize the workspace with respect to other MDUs 104 of the system while moving across the reserved segment. In response to received reservation requests, segment reservation module 1106 may transmit a reservation response granting or denying the reservation request to the requesting robotic device using the communication interface module 1110.

In at least one embodiment, the inventory module 1108 may maintain information about the location and number of inventory items in the inventory management system. Information can be maintained about the number of inventory items in a particular storage container, and the maintained information can include the location of those inventory items in the storage container.

In at least one embodiment, the communication interface module 1110 may facilitate communication between workspace management module 1101 and other components of inventory management system such as the user device(s) 1010 (e.g., the user device 1014), the conveyance device(s)

1004 of FIG. 10, and/or the controller device(s) 1012 of FIG. 10. These communications may relate to reservation responses, reservation requests, path requests, path responses, task assignments, navigational information, operational state information, and the like. Depending on the configuration of workspace management module 1101, communication interface module 1110 may be responsible for facilitating either or both of wired and wireless communication between the various components of inventory management system. In particular embodiments, workspace management module 1101 may communicate via the communication interface module 1110 using communication protocols such as 802.11, Bluetooth, or Infrared Data Association (IrDA) standards. In such embodiments, communication interface module 1110 may facilitate communication between workspace management module 102 and other parts of the same system component.

In at least one embodiment, the authentication module 1114 may be configured to receive a connection request (e.g., from one or more user devices such as the user device 1014). In some embodiments, the authentication module 1114 may maintain a mapping for indicating particular transmitter(s) associated with particular user devices (e.g., a mapping indicating transmitter(s) 1048, an example of the transmitter devices 206 and 207 of FIG. 2, are associated with a particular user device (e.g., user device 1014). This data may be provided in the connection request or predefined. By way of example, the mapping may indicate that a user device (e.g., associated with an alphanumeric user device identifier) is associated with a first transmitter associated with a transmitter alphanumeric identifier (e.g., "apple") and a second transmitter associated with a transmitter alphanumeric identifier (e.g., "banana"). Upon receiving an activation request, the authentication module 1114 may verify that the user device is authorized to connect to the network. In some embodiments, this verification may include determining, from the mapping, that a device identifier of the activation request corresponds to a transmitter associated with a known user device. If the transmitter is authorized to connect, the authentication module 1114 may be configured to provide wireless network credentials to the requesting device (e.g., directly, via controller device(s) 1012, etc.) to enable the user device to connect to a wireless network (e.g., a WiFi network) of the inventory management system. In some embodiments, the authentication module 1114 may be configured to monitor network connectivity of the transmitters and provide an indication of the network connectivity of one or more transmitters of a user device to the input/output processing module 1116 and/or the fault detection module 1118. For example, if a user device is associated with two transmitters, the authentication module 1114 may detect when both transmitters have WiFi connection and may provide any suitable data to the input/output processing module 1116 and/or the fault detection module 1118 indicating the same.

In at least one embodiment, activation management module 1122 may be configured to receive an activation request from an access control unit (e.g., an example of the controller device(s) 1012 of FIG. 10) and/or a user device (e.g., the user device 1014 of FIG. 10). The activation management module 1122 may store a mapping between an identifier of the access control unit and an identifier of the user device as received in the request. When received from an access control unit, the activation request may relate to a request activating and/or allowing access of a user device at one or more access points (e.g., access point 109-1). In some embodiments, an activation request received from a user device may relate to a request to activate the user device. The activation management module 1122 may be configured with a predefined rule set to indicate one or more conditions for allowing a user device to be activated. By way of example, one rule of the set may specify that one or more transmitters of the user device is known to be operational. In some embodiments, the activation management module 1122 may determine operational status of the user device based at least in part on data obtained by the fault detection module 1118. If conditions are met to allow activation, the activation management module 1122 may be configured to cause data to be transmitted (e.g., via the input/output processing module 1116) to the user device pertaining to the activation device (e.g., the user device 1014) indicating the request has been granted and/or indicating an instruction to the user device to perform operations for activating the user device (e.g., to begin transmitting the radio signals discussed in connection with FIG. 1 for potentially modifying movements of other components of the system). If the conditions are not met, the activation management module 1122 may transmit an activation response (e.g., via the input/output processing module 1116) to the device that initiated the activation request (e.g., access controller device 534) indicating the activation request has been denied. In some embodiments, any suitable data related to the activation request may be provided in a response. If the request is denied, a reason code or other indicator indicating a reason why the request was denied may be included in the response and potentially displayed or otherwise communicated (e.g., with a light, a display, and/or speaker) via an interface associated with the access point.

The activation management module 1122 may be configured to receive (e.g., from the user device previously instructed to activate) an indication (e.g., an activation status message) that a user device has been activated. In some embodiments, the activation management module 1122 may consult the previously stored mapping to identify whether an access control unit (an example of the controller device(s) 1012) initially requested the activation. If an identifier of the user device (as received in the activation status message) is associated with an access control unit, the activation management module 1122 may transmit (e.g., via the input/output processing module 1116) an indication that the user device is active and/or instructions instructing the access control unit to allow access to the workspace via the access point. In some embodiments, the access control unit, upon receipt of this information, may be configured to allow access to the workspace (e.g., based at least in part on causing a physical barrier such as a light curtain, a door, a gate, and the like, to be removed).

In some embodiments, the input/output processing module 1116 may be configured to receive and/or transmit any suitable data to a user device (e.g., the user device 1014 of FIG. 10) and/or to the controller device(s) 1012. By way of example, upon receiving an indication that all the transmitters of a given user device are connected to a wireless network, the input/output processing module 1116 may be configured to provide any suitable data indicating that a particular user device is available for selection. Sending this data may cause a user device (e.g., a handheld user device such as a tablet of user device(s) 1010) to provide one or more user interfaces from which the user device (e.g., user device 1014) may be selected. The input/output processing module 1116 may receive an indication that a particular user device was selected by a user and may maintain an association between the user and the wearable user device.

In some embodiments, the input/output processing module 1116 may be configured to receive (e.g., from a handheld user device, an example of the user device(s) 1010 of FIG. 10) planned path data corresponding to another user device (e.g., a wearable user device such as user device 1014). In some embodiments, the planned path data may be provided to the path planning module 1104 such that paths of one or more MDUs of the system may be altered and/or generated based at least in part on the planned path of the wearable user device. In some embodiments, the input/output processing module 1116 may provide the planned path data to the location estimation module 1120 and/or store the planned path data in any suitable location accessible to the location estimation module and/or the path planning module 1104.

The input/output processing module 1116 may be configured to receive operational state information from one or more user devices (e.g., the user device 1014 of FIG. 10), conveyance device(s) 1004 (e.g., MDUs 104, robotic device 111, etc.). In some embodiments, upon receipt operational state information indicating an operational status for user device 1014, the input/output processing module 1116 may transmit any suitable data to the fault detection module 1118 indicating the same.

In some embodiments, the fault detection module 1118 may be configured to monitor for faults of one or more transmitters of one or more devices of the system (e.g., the transmitter(s) 1048, the transmitter(s) 1059 of FIG. 10). In some embodiments, the functionality of the fault detection module 1118 may be triggered by receiving an indication (e.g., from the input/output processing module 1116) that a particular user device is operating in an activated state (indicating that all transmitters associated with the user device are currently transmitting a signal). Upon receipt, the fault detection module 1118 may monitor the network connections associated with each transmitted of the activated user devices. In some embodiments, the fault detection module 1118 may detect when a transmitter has lost network connection. The fault detection module 1118 may further be configured to receive fault indications from any suitable transmitter device (e.g., the transmitter(s) 1048, the transmitter(s) 1059, etc.). These fault indications may indicate a fault associated with the transmitter device providing the indication and/or a fault associated with a different transmitter device than the one providing the indication.

In some embodiments, the fault detection module 1118 may detect a fault associated with one or more transmitter devices based at least in part on monitoring the network connections of the transmitter devices and/or receiving one or more fault indications from one or more transmitter devices. In some embodiments, fault indications regarding a transmitter device may be received from the processing module 1062 of FIG. 10 (that, among other things, may provide the functionality described in the proximity monitoring engines of FIGS. 1 and 6-10). In response to detecting a fault, the fault detection module 1118 may immediately cause a stop command to be transmitted to one or more conveyance device(s) of the system (e.g., MDUs 104, robotic device 111, computing devices associated with an area such as the workstation 108-1, etc.). Alternatively, the fault detection module 1118 may be configured to wait a predetermined time period (e.g., 160 seconds) after detecting the fault before transmitting a stop command. In some examples, the fault detection module 1118 may cause a stop command to be transmitted based at least in part on determining that the predetermined time period has elapsed since the transmitter lost network connection, and that the transmitter has not regained network connection. The stop command may be addressed to one or more conveyance and/or computing devices (e.g., MDUs 104, robotic device 111, controller device(s) 1012, user device(s) 1010, etc.) and/or the stop command may be broadcasted. Receipt of the stop command by any device may cause the device to halt motion or otherwise alter its state (e.g., stop processing, shut down, slow/halt motion, etc.).

In some embodiments, the fault detection module 1118 may detect a fault associated with one or more MDUs (e.g., an example of the conveyance device(s) 1004 of FIG. 10. By way of example, the fault detection module 1118 may receive (e.g., from the processing module 1062) an indication that at least one component of an MDU is faulty. In accordance with receiving such data, the fault detection module 1118 may be configured to instruct the MDU to stop. In some embodiments, the fault detection module 1118 may transmit a stop command to the MDU immediately. In some embodiments, the stop command may cause the MDU to halt motion upon receipt. Alternatively, the stop command may cause the MDU to halt motion when it reaches a next location indicator or a particular location within the workspace.

In some embodiments, the fault detection module 1118 may detect a fault associated with one or more receiving devices (e.g., the receiving device(s) 115 of FIG. 1, examples of the receiver(s) 1058 of FIG. 10). By way of example, the fault detection module 1118 may receive (e.g., from the processing module 1062 of FIG. 10) an indication that at least one component of a receiving device is faulty. In accordance with receiving such data, the fault detection module 1118 may be configured to instruct a device associated with the receiving device (e.g., the robotic device 111, a controller device associated with another device of a workstation, one or more of the user device(s) 1010) to stop motion or processing, or otherwise alter state. In some embodiments, the fault detection module 1118 may transmit a stop command to the robotic device 111 and/or controller device(s) 1012 of a workstation immediately. In some embodiments, the stop command may cause the robotic device and/or controller device(s) to halt motion of a moving device or to halt task assignment processing upon receipt.

In some embodiments, the location estimation module 1120 may be configured to receive navigational information and/or operational state information from one or more MDUs of the inventory management system. The location estimation module 1120 may be configured to estimate a location of a given wearable user device based at least in part on the planned path data associated with the wearable user device and/or the navigational information and/or operational state information received from the one or more MDUs. By way of example, the location estimation module 1120 may detect one or more MDUs that are operating at a reduced speed or stopped altogether due to receiving one or more signals from a wearable user device. The location estimation module 1120 may consult planned path data of each wearable user device of the system to determine that a particular wearable user device is most likely to be providing the signals affecting the MDUs. The locations, speeds, and/or operational states of the affected MDUs may be utilized to estimate a location of the wearable user device. The estimated location may be transmitted via the input/output processing module 1116 to the handheld user device. Receipt of the estimated location may cause the handheld user device to present an indication of the location of the wearable device at a display of the device.

In general, the resource scheduling module 1102, the path planning module 1104, the segment reservation module

1106, the inventory module 1108, the communication interface module 1110, the authentication module 1114, the input/output processing module 1116, the fault detection module 1118, the location estimation module 1120, and the activation management module 1122, may each represent any appropriate hardware and/or software suitable to provide the described functionality. In addition, as noted above, workspace management module 1101 may, in particular embodiments, represent multiple different discrete components and any or all of the resource scheduling module 1102, the path planning module 1104, the segment reservation module 1106, the inventory module 1108, the communication interface module 1110, the authentication module 1114, the input/output processing module 1116, the fault detection module 1118, the location estimation module 1120, and/or the activation management module 1122 may represent components physically separate but accessible from the remaining elements of workspace management module 1101. Moreover, functionality provided by the resource scheduling module 1102, the path planning module 1104, the segment reservation module 1106, the inventory module 1108, the communication interface module 1110, the authentication module 1114, the input/output processing module 1116, the fault detection module 1118, the location estimation module 1120, and/or the activation management module 1122 may be provided by fewer modules than those depicted in FIG. 11.

It should be appreciated that although a single workspace management module 1101 is depicted in various examples provided herein, more than one workspace management module 1101 may be utilized. As a non-limiting example, multiple workspace management modules may be utilized where each workspace management module is configured to manage various components (e.g., MDUs, operators, etc.) in a given area of a workspace (e.g., a sub-area of the workspace 110, a floor of the workspace 110, etc.). Each workspace management module may be configured to communicate with other workspace management modules to exchange operational state information associated with a wearable user device, a location estimation of the wearable user device, fault detection information associated with a wearable user device, or the like. It is also contemplated that a single workspace management module may be utilized to manage multiple sub-areas and/or floors of the workspace 110. In some embodiments, the fault detection module 1118 may be configured to detect a lost network connection associated with a particular transmitter device of a wearable user device. Another workspace management module (or the workspace management module 1101) may subsequently receive a connection request and/or user input from the wearable user device indicating that the wearable user device has traveled to a different sub-area and/or floor of the workspace 110. Based at least in part on the connection request and/or user input and/or a predetermined time elapsing since the connection in the previous area was lost, the fault detection module 1118 may transmit a stop command to one or more MDUs of the previous area. In some embodiments, such as when the user input and/or connection request indicates the wearable user device has traveled to a different area of the workspace 110, the fault detection module 1118 may transmit any suitable data to a handheld device (e.g., the user device of the user device(s) 1010) associated with the user of the wearable user device (e.g., user device 1014) to indicate that a fault is occurring in the previously occupied area. In some embodiments, the user may be instructed to return to the previously occupied area and/or the handheld user device may provide an override mechanism that, when selected, causes the fault detection module 1118 to perform one or more operations to recover from the fault (e.g., transmit a resume command to all MDUs in the previously occupied area).

Figure 12:
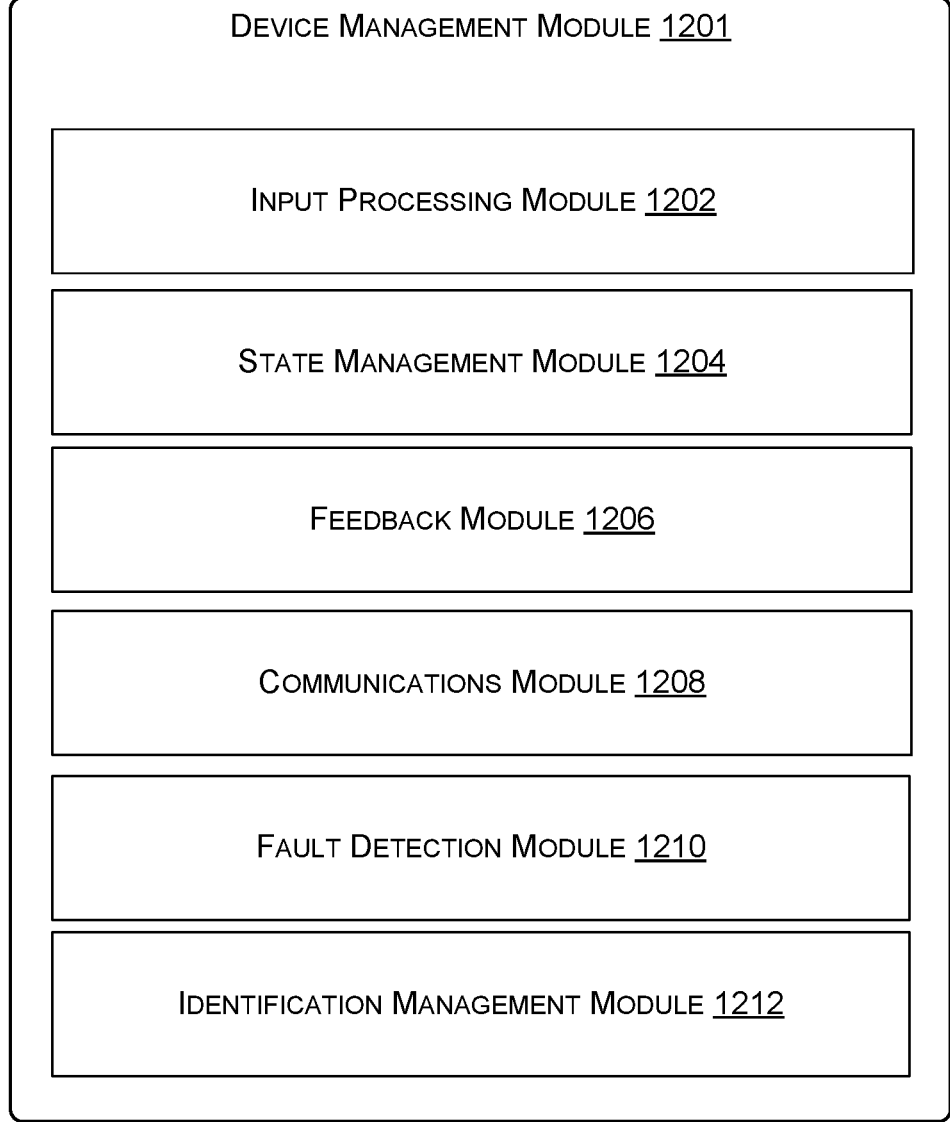
FIG. 12 illustrates in greater detail the components of a device management module, in accordance with at least one embodiment.

FIG. 12 illustrates in greater detail the components of a particular embodiment of a device management module 1201 (an example of the device management module 1050 of FIG. 10). As shown, the example embodiment includes an input processing module 1202, a feedback module 1206, a state management module 1204, a communications module 1208, a fault detection module 1210, and an identification management module 1212.

In some embodiments, the input processing module 1202 may be configured to receive input from one or more user input devices (e.g., the user input device 202 of FIG. 2) and/or from the workspace management module 1081 of FIG. 10. In some embodiments, the input processing module 1202 may provide the user input to the state management module 1204 and/or the feedback module 1206 and/or the identification management module 1212.

In some embodiments, the state management module 1204 may be configured to manage the state of the user device on which the device management module 1050 operates (e.g., user device 1014 of FIG. 10). In some embodiments, the state management module 1204 may be configured to transition the user device to operate in a particular state based at least in part on user input received via the input processing module 1202. In some embodiments, the (wearable) user device has a number of possible operational states (e.g., power on, activate, deactivate, etc.) each operational state being associated with a particular set of operations.

In some embodiments, the state management module 1204 may receive user input (e.g., via the input processing module 1202) indicating an action to activate the user device. In some embodiments, the user input may correspond to the user moving a knob to a position associated with powering on the wearable user device, although other user input mechanisms may be employed to indicate an action to power on the wearable user device. Upon receiving such input, the state management module 1204 may be configured to generate and store operational state information indicating the user device is powering on. In some embodiments, the state management module 1204 may be configured to provide the operational state information indicating a power on state to the feedback module 1206 and/or a remote system (e.g., the workspace management module 1101 of FIG. 11, an example of the workspace management module 102 of FIG. 1).

In some embodiments, the feedback module 1206 may be configured to receive user input via the input processing module 1202 and/or operational state information from the state management module 1204. The feedback module 1206 may determine a corresponding feedback indication to be provided via one or more feedback devices of the user device based at least in part on the user input and/or the operational state information indicating a current operational state of the wearable user device. As a non-limiting example, the feedback module 1206 may be configured to receive operational state information indicating that the user device is in a power on state. In response, the feedback module 1206 may be configured to provide any suitable feedback via one or more feedback devices of the user device to indicate the power on state. For example, one or more audible beeps corresponding to a power on state may be presented via a speaker of the wearable user device. Additionally, or alternatively, one or more LED lights of one or more feedback devices may present a particular color and/or pattern associated with a power on state (e.g., a relatively slow blue blinking light). Additionally, or alternatively, one or more feedback devices may be utilized present haptic feedback (e.g., a vibration) that indicates the power on state of the wearable user device. The particular strength of the vibration and/or the number and/or pattern of vibrations may be unique to the power on state.

In some embodiments, the communications module 1208 may be configured to attempt to connect to a network of the inventory management system. By way of example, the communications module 1208 may receive (e.g., from the input processing module 1202 and/or the state management module 1204, or any suitable component of the device management module 1050) the user input indicating a power on action and/or an operational state information associated with a power on state. In response to receiving such information, the communications module 1208 may be configured to transmit a network connection request (e.g., to the workspace management module 1101 of FIG. 11). The communications module 1208 may further be configured to receive network credentials (e.g., from the workspace management module 1101). Upon receipt of these credentials, the communications module 1208 may be configured to connect (e.g., via WiFi, utilizing the communication component(s) 1036 of FIG. 10) to a local network.

In some embodiments, the state management module 1204 may receive input (e.g., via the input processing module 1202) indicating an action to activate the user device. In some embodiments, the input may correspond to the user moving a knob to a position associated with activating the wearable user device, although other user input mechanisms may be employed to indicate an action to activate the wearable user device. In some embodiments, the input indicating the action to activate the user device may be received from the activation management module 1122 of FIG. 11 (e.g., via receiving instructions instructing the user device to activate). Upon receiving such input, the state management module 1204 may be configured to generate and store operational state information indicating the user device is activated. In some embodiments, the state management module 1204 may be configured to provide the operational state information indicating an activated state to the feedback module 1206 and/or a remote system (e.g., the service provider computer(s) 1002, the user device(s) 1010, the controller device(s) 1012, etc.). In some embodiments, the state management module 1204 may be configured to provide the operational state information to the communications module 1208. In some embodiments, receipt of the operational state information indicating an activate state, the communications module 1208 may be configured to begin transmitting one or more radio signals via the transmitter(s) 1048 of FIG. 10. As described above, if multiple radio signals are transmitted, each signal may differ in frequency and/or range. The communications module 1208 may be configured to provide the state management module 1204 feedback indicating that the radio signals are being transmitted. In some embodiments, the state management module 1204 may refrain from generating, providing, and/or storing operational state information until it receives feedback from the communications interface module 1110 indicating that the radio signals are being transmitted.

Providing the operational state information indicating an activated state to the workspace management module 1101 may cause the workspace management module 1101 to commence a fault detection process associated with the user device on which the device management module 1050 operates. Or in other words, trigger the functionality of the fault detection module 1118 of FIG. 11. In some embodiments, receiving the operational state information indicating the activated state may cause workspace management module 1101 to transmit an activation response to an access controller device (e.g., an access controller device of the controller device(s) 1012 that corresponds to a particular access point, an access controller that previously requested activation of the user device, etc.) to instruct or otherwise cause the access controller device to allow access to the workspace via its corresponding access point. This may include removing, or causing to be removed, any suitable number of physical barriers associated with the access point.

In some embodiments, the communications module 1208 may be configured to transmit the one or more radio signals via the transmitter(s) 1048 according to a predetermined scheme and/or schedule. By way of example, the communications module 1208 may cause a first transmitter of the transmitter(s) 1048 to transmit one or more radio signals at particular frequencies (e.g., 125 kHz, 925 MHz, 433 MHz, or any suitable combination of the above). The communications module 1208 may be configured to exchange information with any suitable number of additional transmitter(s) of a user device (e.g., the user device 1014) to exchange any suitable information associated with the transmitter(s). In some embodiments, the communications module 1208 may transmit any suitable data to coordinate alternating transmission of the one or more radio signals by multiple transmitter devices. In some embodiments, there may be multiple instances of the communications module 1208 in operation. Each instance may correspond to a single transmitter of the transmitter(s) 1048 of FIG. 10.

The fault detection module 1210 may be configured to monitor transmission of one or more other transmitters of a user device (e.g., the user device 1014). By way of example, while another transmitter device is transmitting one or more radio signals, the fault detection module 1118 may be configured to monitor the transmissions of the other transmitter device. Should the fault detection module 1210 fail to detect one or more of the expected transmissions of the other transmitter device, the fault detection module 1210 may be configured to inform the workspace management system that the other transmitter device is faulty (e.g., failing to transmit at least one expected radio signal). It should also be appreciated that fault detection module 1210 may be configured to monitor for errors/faults of any suitable component of a transmitter and transmit an indication of such errors/faults to the workspace management system. In some embodiments, there may be multiple instances of the fault detection module 1210 in operation. Each instance may correspond to a single transmitter of the transmitter(s) 1048 of FIG. 10.

According to some embodiments, the fault detection module 1210 and the communications module 1208 may exchange any suitable data in order to coordinate transmission and fault monitoring tasks according to any suitable predetermined scheme and/or schedule. By way of example, the communications module 1208 may be configured to transmit one or more radio signals for a predetermined period of time. When the period of time has elapsed, the communications module 1208 may cease transmitting and may transmit data to the fault detection module 1210 to cause the fault detection module 1210 to commence monitoring of the one or more other transmitters of the user device 1014. The fault detection module 1210 may further be configured to monitor for faults of the other transmitters for a predetermined monitoring time period. Upon that time period elapsing, the fault detection module 1210 may cease monitoring the other transmitters and may transmit any suitable data to the communications module 1208 to cause the communications module 1208 to begin another period of transmission. This process may be performed any suitable number of times. It should be appreciated that the fault detection module 1210 may monitor for faults of a particular transmitter at any suitable time regardless of whether the transmitter is currently transmitting radio signals or monitoring radio signals transmitted by other transmitter devices.

Upon receipt of an operational state information indicating an activated state, the feedback module 1206 may determine corresponding feedback to be provided via one or more feedback devices of the user device. While the wearable user device operates in an activated state, the feedback module 1206 may be configured to provide any suitable feedback via one or more feedback devices of the user device to indicate the activated state. For example, one or more audible beeps corresponding to a power on state may be presented via a speaker of the wearable user device. Additionally, or alternatively, one or more LED lights of one or more feedback devices (e.g., feedback device 212 of FIG. 2) may present a particular color and/or pattern associated with an activated state (e.g., a solid blue blinking light). Additionally, or alternatively, one or more feedback devices may be utilized present haptic feedback (e.g., a vibration) that indicates the power on state of the wearable user device. The particular strength of the vibration and/or the number and/or pattern of vibrations may be unique to the activated state.

In some embodiments, the state management module 1204 may receive user input (e.g., via the input processing module 1202) indicating an action to deactivate the user device. In some embodiments, the user input may correspond to the user moving a knob to a position associated with deactivating the wearable user device, although other user input mechanisms may be employed to indicate an action to deactivate the user device. As another example, a deactivation instruction may be received from the activation management module 1122 of FIG. 11. Upon receiving such input (e.g., from the user device or the activation management module 1122), the state management module 1204 may be configured to generate and store operational state information indicating the user device is deactivated. In some embodiments, the state management module 1204 may be configured to provide the operational state information indicating a deactivated state to the feedback module 1206 and/or a remote system (e.g., the activation management module 1122 or other component of the workspace management module 1101).

In some embodiments, the state management module 1204 may be configured to provide data indicating a deactivate action and/or the operational state information to the communications module indicating the deactivated state. Upon receiving such data, the communications module 1208 may be configured to cease transmission of one or more radio signals of the transmitter(s) 1048 of FIG. 10. In some embodiment, the state management module 1204 may transmit to the communications module 1208 the user input indicating the action to deactivate to cause the communications module 1208 to cease transmission of the one or more radio signals via the transmitter(s) 1048. The communications module 1208 may be configured to provide the state management module 1204 feedback indicating that radio signal transmission has been halted. In some embodiments, the state management module 1204 may refrain from generating, providing, and/or storing operational state information indicating a deactivate state until it receives feedback from the communications module 1208 indicating that the radio signals are being transmitted. Providing the operational state information indicating a deactivate state of the user device (identified by a device identifier) to the workspace management module 1101 may cause a fault detection process associated with the user device to cease. For example, the workspace management module 1101, upon receiving operational state information indicating a deactivated state may, among other things, cause fault detection module 1118 to cease monitoring the network connections of the transmitter associated with that user device.

Upon receipt of operational state information indicating a deactivated state, the feedback module 1206 may determine a corresponding feedback to be provided via one or more feedback devices of the wearable user device. While the wearable user device operates in a deactivated state, the feedback module 1206 may be configured to provide any suitable feedback via one or more feedback devices of the user device (e.g., feedback device 212) to indicate the deactivated state. For example, one or more audible beeps corresponding to a power on state may be presented via a speaker of the wearable user device. Additionally, or alternatively, one or more LED lights of one or more feedback devices may present a particular color and/or pattern associated with a deactivated state (e.g., a relative slow blue blinking light). Additionally, or alternatively, one or more feedback devices may be utilized present haptic feedback (e.g., a vibration) that indicates the deactivated state of the wearable user device. The particular strength of the vibration and/or the number and/or pattern of vibrations may be unique to the deactivated state, although in some embodiment the feedback provided in response to the deactivated state may be the same, or similar to the feedback provided in response to the power on state.

At any suitable time (potentially regardless of whether the user device is operating in an activated or deactivated state), the identification management module 1212 may be configured to transmit identification information identifying a particular user device (e.g., the user device 1014). In some embodiments, the identification information may be transmitted by the feedback device 212 (e.g., a light emitting diode (LED)) via one or more light signals. In some examples, the identification information may be transmitted based at least in part on modulating a light signal according to a predefined protocol to indicate an identifier for the user device. In some embodiments, the feedback module 1206 and the identification management module 1212 may manage output of a common device (e.g., feedback device 212) to indicate operational state as well as to communicate identification information for the user device. In some embodiments, communication of the operational state of the user device and the identification information of the user device utilizes a common feedback device and the communications associated with each are offset such that communicating operational state does not interfere with communications associated with the identification information, and vice versa. By way of example, both feedback of operational status and communication of identification information may utilize light signals corresponding to different rates, frequencies, durations, colors, signal patterns, or the like. For example, a blinking green light may be emitted via the user device to indicate an active operational status. This light may be visible to the human eye and may blink once a second, for example. The same user device may emit, periodically, a rapid sequence and/or pattern of light signals to communicate the identification information associated with the user device. The light emissions provided for indicating operational status may be offset (purposefully transmitted at a different time and/or according to a different periodicity or schedule) so as not interfere with the light emissions provided that communicate the identification information of the user device.

Figure 13:
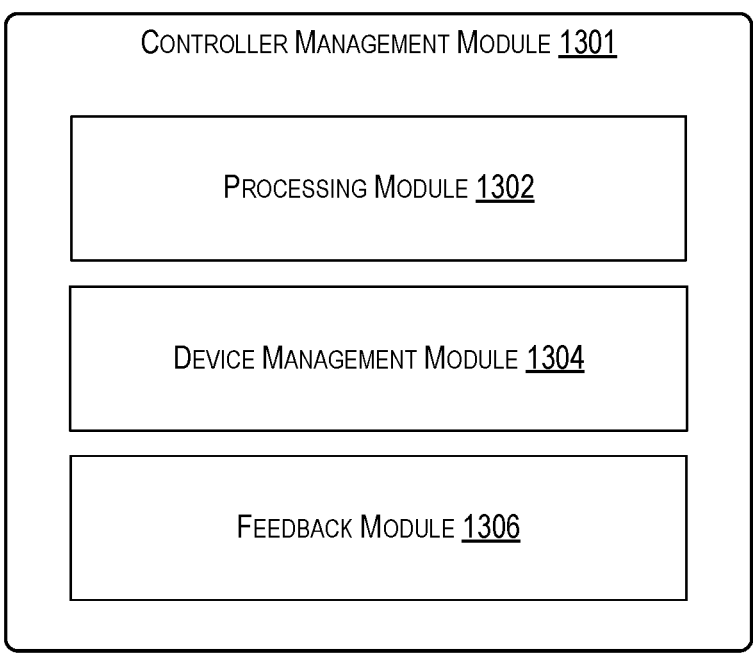
FIG. 13 illustrates in greater detail the components of a particular embodiment of a controller management module, in accordance with at least one embodiment.

FIG. 13 illustrates in greater detail the components of a particular embodiment of a controller management module 1301 (an example of the management module 1030 of FIG. 10). As depicted in FIG. 13, controller management module 1301 includes processing module 1302, device management module 1304, and feedback module 1306 although more or fewer modules may be utilized to provide the functionality described.

Processing module 1302 may be configured to receive and process any suitable data received from a user device (e.g., via the device management module 1050 of FIG. 10 of the user device 1014 of FIG. 10) and/or from a service provider computer (e.g., via the workspace management module 1081 of FIG. 10). By way of example, in some embodiments, the controller management module 1301 may operate at an access device associated with an access point (e.g., 109-1). The processing module 1302 may be configured to receive (e.g., via WiFi) identification information associated with a particular user device (e.g., the user device 1014). In some embodiments, the identification information is received from the actual user device corresponding to the identification information and/or from another user device (e.g., a handheld device, a stationary computer, etc.) separate from the one that corresponds to the identification information. In some embodiments, the processing module 1302 may be configured to store the identification information received for the user device.

In some embodiments, the identification information may be received as part of an access request (e.g., a request to allow access to user device 1014 at a particular access point). In some embodiments, the access request may be additionally considered to be an activation request for a particular user device for which access is requested (e.g., a request to activate user device 1014). In some embodiments, a component of a user device (e.g., user input device 202) may be positioned at a receiving device associated with an access point of the workspace (e.g., workspace 110 of FIG. 1). The component of the user device may be utilized to communicate (e.g., via one or more light signals produced by a light emitting diode) identification information for the user device for which access and/or activation is requested. In some embodiments, processing module 1302 may be configured to determine whether the identification information previously received and stored (referred to as "initial identification information") matches the identification information received at the receiving device (e.g., through the utilization of the one or more light signals). In some embodiments, the processing module 1302 may be configured to reject the request for access and/or activation if the initial identification information does not match the identification information receive at the receiving device. In some embodiments, the processing module 1302 may be configured to transmit a request for access and/or activation to a remote system (e.g., the workspace management module 1101 of FIG. 11) if the initial identification information matches the identification information receive at the receiving device. The request transmitted to the remote system may include the identification information for the user device, any suitable identification information (e.g., one or more identifiers) of the access point and/or a corresponding access controller device, or the like.

In some embodiments, the feedback module 1306 may present (e.g., via a light, a display, a speaker, etc.) any suitable indication of the operations and/or status of the access controller device and/or the access point. By way of example, the feedback module 1306 may indicate a state of the device(s) controlled by the controller device. As another example, the feedback module 1306 may be configured to present information (e.g., via the display and/or speaker) indicating a request for access (or activation) has been transmitted (e.g., to the workspace management module 1101). The feedback module 1306 may present any suitable data received (e.g., from the workspace management module 1101) indicating that access/activation was granted and/or denied.

Device management module 1304 may be configured to control one or more other devices (e.g., actuators, physical barrier devices (such as a door, a lock, a gate, a light curtain, etc.), conveyor belts, computing devices (e.g., user device(s) 1010 of FIG. 10) associated with a workstation, etc.). As a non-limiting example, the device management module 1304 may be configured to operate one or more actuators that enables a door associated with an access point (e.g., a door associate with one of access points 109 of FIG. 1) to be locked or unlocked. In some embodiments, the device management module 1304 may be configured to allow access (e.g., unlock a door) such that access is allowed in one direction (e.g., out of the workspace) while restricted from another direction (e.g., into the workspace). The functionality of the device management module 1304 may be invoked by the processing module 1302. By way of example, receiving an indication that the user device corresponding to a previously transmitted access request has been activated may cause the processing module 1302 to invoke the functionality of the device management module 1304 to allow access to the workspace. As another example, receiving data from an input device (e.g., a button) of the workspace (located within the workspace) may cause the processing module 1302 to invoke (e.g., via function call or otherwise) the functionality of the device management module 1304 to enable the barrier device to be moved (e.g., a door to be opened enabling a user and/or device to exit the workspace). As yet another example, the processing module 1302 may receive a signal or other indication (e.g., via an input device) indicating the access point is being placed in a particular operational state (e.g., disarmed, under maintenance, etc.). As a result, the processing module 1302 may invoke the functionality of the device management module 1304 to enable a barrier device to be moved. The same or different input device may be utilized to transition the access point in a similar manner back to a state in which access is allowed or restricted based on receiving identification information of a user device.

In some embodiments, processing module 1302 may identify a request to exit the workspace (e.g., via a button within the workspace). In some embodiments, processing module 1302 may invoke the functionality of the feedback module 1306 to prompt a deactivation request. For example, any suitable data may be presented via the input/output devices of the user device (e.g., via a display, a speaker, a light, etc.) to prompt the user to deactivate the user device. In some embodiments, deactivation may include the user positioning the feedback device 212 at a receiving device (e.g., a receiving device associated with an access point). Once again, identification information for the user device may be obtained by the processing module 1302 in this manner. In some embodiments, the user device, currently operating in an activated state, may specifically include an indication that the identification information is provided as part of a deactivation request. In other embodiments, the processing module 1302 may maintain identification information corresponding to previously activated and/or currently active user devices (e.g., activated either at a corresponding access point or another access point of the workspace). Additionally, or alternatively, the processing module 1302 may request (e.g., from the workspace management module 1101) information indicating whether the user device currently operating in an activated state or not. If the identification information corresponds to a previously activated user device, the processing module 1302 may determine that the identification information corresponds to a deactivation request. The processing module 1302 may transmit (e.g., to the workspace management module 1101) any suitable information (e.g., any suitable portion of the identification information associated with/received from the user device, an indicator indicating the request is a deactivation request, or the like) to request deactivation of the user device. The workspace management module 1101 may process the deactivation request. As part of that processing, the workspace management module 1101 may transmit and/or exchange any suitable data with the user device to cause the user device to transition to a deactivated state. While operating in the deactivated state, the user device may no longer transmit radio signals which would, if transmitted, modify movements of various components of the workspace (e.g., the MDUs 104 of FIG. 1).

Figure 14:
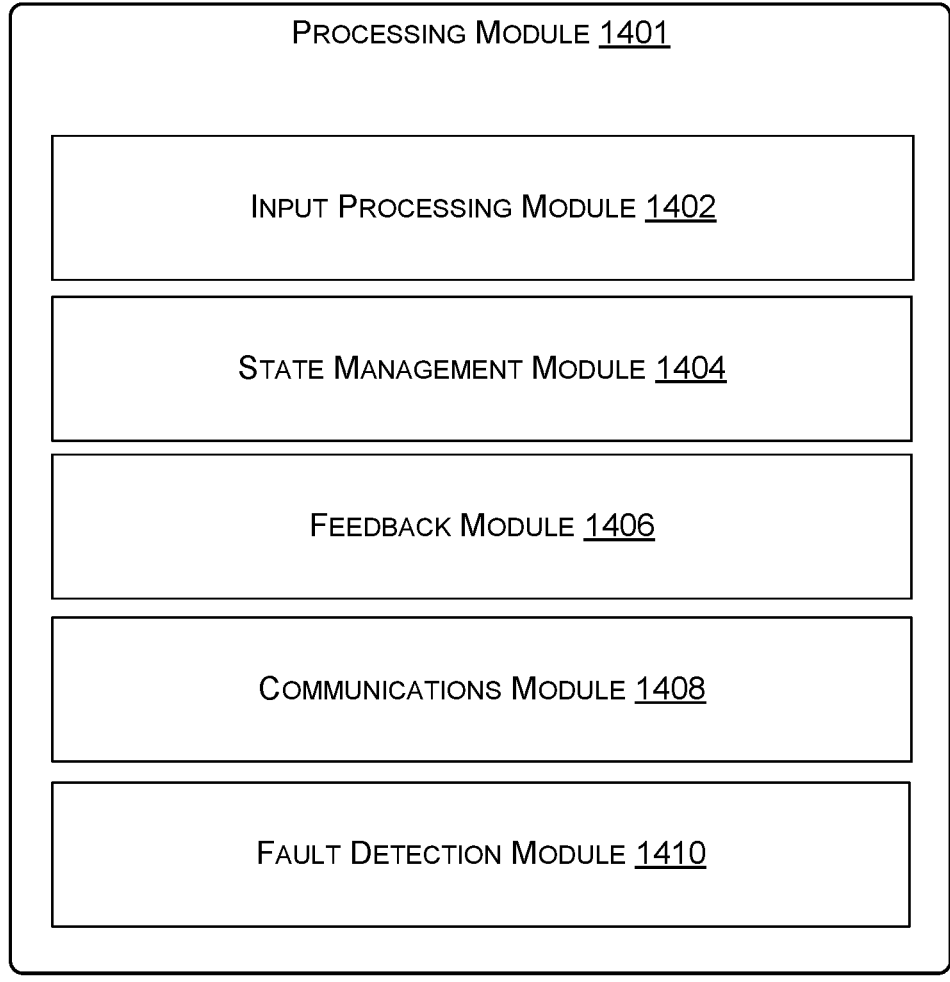
FIG. 14 illustrates in greater detail the components of a particular embodiment of a processing module, in accordance with at least one embodiment.

FIG. 14 illustrates in greater detail the components of a particular embodiment of a processing module 1401 (an example of the processing module 1062 of FIG. 10, an example of the proximity monitoring engine 117 of FIG. 1). As shown, the example embodiment includes an input processing module 1402, a state management module 1404, a feedback module 1406, a communications module 1408, and a fault detection module 1410. In some embodiments, the processing module 1401 operates as part of one of the conveyance device(s) 1004 of FIG. 10. In other embodiments, at least a part of the processing module 1062 may be provided by a separate computing device that is associated with the conveyance device(s) 1004.

In some embodiments, the input processing module 1402 may be configured to receive input from one or more user devices (e.g., the user device(s) 1010 of FIG. 1010) and/or from the workspace management module 1081 of FIG. 10. In some embodiments, the input processing module 1402 may provide the input to the state management module 1404 and/or the feedback module 1406.

In some embodiments, the state management module 1404 may be configured to manage the state of the conveyance device on which the processing module 1401 operates (e.g., conveyance device(s) 1004 of FIG. 10, an example of MDU 104 or robotic device 111 of FIG. 1). In some embodiments, the state management module 1404 may be configured to transition the conveyance device to operate in a particular state based at least in part on user input received via the input processing module 1402. In some embodiments, the conveyance device has a variety of possible operational states (e.g., slow, halted, operational, etc.) each operational state being associated with a particular set of operations.

In some embodiments, the feedback module 1406 may be configured to receive operational state information from the state management module 1204. The feedback module 1406 may determine a corresponding feedback indication to be provided via one or more feedback devices associated with the conveyance device based at least in part on the operational state information. As a non-limiting example, the feedback module 1406 may be configured to receive operational state information indicating that the MDU and/or the robotic device is operating in an operational state. As another example, the feedback module 1406 may receive operational state information indicating the motion of the MDU and/or the robotic device is being slowed, or is altogether halted, due to receiving one or more signals (e.g., signals from transmitter(s) 1048 of FIG. 10). The feedback module 1406 may be configured to cause any suitable feedback such as audible or visual feedback at one or more feedback devices associated with, or operating at, the conveyance device. Additionally, or alternatively, one or more LED lights of one or more feedback devices may present a particular color and/or pattern associated with a slowed and/or halted state.

In some embodiments, the communications module 1408 may be configured to attempt to transmit (e.g., via the network(s) 1006 of FIG. 10) operational state information associated with the conveyance device. In some embodiments, the operational state information may indicate whether one or more receiver(s) (e.g., receiver(s) 1058 of FIG. 10) and/or one or more transmitter(s) (e.g., transmitter(s) 1059) are operating properly.

In some embodiments, a conveyance device may include a fault detection module 1410. The fault detection module 1410 may be configured to monitor any suitable component of the conveyance device(s) 1004 for error(s) and/or fault(s). By way of example, the fault detection module 1410 may be configured to monitor the processor(s) 1054, the memory 1052, the receiver(s) 1058, the transmitter(s) 1059, the communication component(s) 1056, and the I/O device(s) 1060, the controller device(s) 1012) or any suitable combination of the above. If an error and/or fault is detected by the fault detection module 1410, the fault detection module 1410 may transmit data indicating the fault to the workspace management module 1081. As a specific, non-limiting example, the fault detection module 1410 may monitor the receiver(s) 1058 for faults. Upon detecting a fault in at least one of the receiver(s) 1058, the fault detection module 1410 may transmit any suitable data to the workspace management module 1081 indicating the same. In some embodiments, the workspace management module 1081 (e.g., the workspace management module 102 of FIG. 1) may be configured to instruct the conveyance device providing the information to stop (e.g., stop immediately, stop at the next location indicator or a particular location within the workspace, etc.). In some embodiments, the conveyance device may not return to being controlled by the workspace management module 1081 until user input has been received (e.g., by the workspace management module 1081) indicating that the conveyance device has been repaired.

As a non-limiting example, the fault detection module 1410 may be configured to transmit the one or more radio signals via the transmitter(s) 1059 according to a predetermined scheme and/or schedule. By way of example, the fault detection module 1410 may cause a first transmitter of the transmitter(s) 1059 to transmit one or more radio signals at particular frequencies (e.g., 125 kHz, 925 MHz, 433 MHZ, or any suitable combination of the above). The fault detection module 1410 may monitor whether the signals transmitted by the transmitter(s) 1059 are received by the receiver(s) 1058. The transmitter(s) 1059 may be configured to provide the transmissions according to a predefined schedule or periodicity, or the fault detection module 1410 may be configured to initiate the transmissions of the transmitter(s) 1059 according to a predefined schedule or periodicity. In some embodiments, the fault detection module 1410 may be configured to differentiate the transmission provided by the transmitter(s) 1059 from the transmissions provided by the transmitter(s) 1048 of the user device 1014 of FIG. 10. In some embodiments, the fault detection module 1410 can differentiate the transmissions based on timing and identifying that the fault detection module 1410 initiated the transmission. In other embodiments, the fault detection module 1410 may be configured to expect a receiver to receive the transmissions from a corresponding transmitter of the transmitter(s) 1059 and may identify a fault receiver based at least in part on determining the receiver is not reporting the transmission according to the expected frequency or schedule. In still further embodiments, the transmissions of transmitter(s) 1059 may correspond to the same frequency/frequencies of transmitter(s) 1048 may vary in at least one other aspect (e.g., duration, periodicity, etc.) such that the transmissions of transmitter(s) 1059 may be differentiated from transmission of transmitter(s) 1048. In some embodiments, the transmitter(s) 1059 are intended to simulate the transmissions of the transmitter(s) 1048 in order to identify faulty receivers of the receiver(s) 1058. In some embodiments, the receiver(s) operate as part of the workstation 108-1 to detect when a user device (e.g., user device 118-1 of FIG. 1 breaches area 119). Depending on the configuration of the receiver(s) 1058 and the particular devices operating within the area covered by receiver(s) 1058 (e.g., robotic device 111), the fault detection module 1410 (and/or the workspace management module 1101 of FIG. 1) may execute operations to cause an immediate change in the operations of the conveyance device. For example, detection of a faulty receiver that creates a blind spot within area 119 where a breach may go undetected may cause the fault detection module 1410 (and/or the workspace management module 1101 of FIG. 1) to execute operations that cause the robotic device 111 and/or any suitable device of the workstation(s) 108 to halt motion. In some embodiments, halting motion may not be immediate. The robotic device 111 may take a period of time (e.g., due to momentum and/or safe stopping procedures) to come to a full stop.

It should be appreciated that the conveyance device(s) 1004 may be configured with multiple instances of the fault detection module 1410. In some embodiments, each instance of the fault detection module 1410 may correspond to a particular component of the conveyance device. By way of example, one instance of the fault detection module 1410 may correspond to a first receiver of the receiver(s) 1058, while another instance of the fault detection module 1410 may correspond to a second receiver of the receiver(s) 1058. Alternatively, some or all of the components of the conveyance device(s) 1004 may be monitored by a single instance of the fault detection module 1410.

FIG. 15 illustrates a flow diagram of an example method 1500 for utilizing various components of an inventory management system, in accordance with at least one embodiment. The method 1500 may be performed with any suitable combination of the user device(s) 1010 of FIG. 10 (each an example of a handheld device and/or the user device 118 of FIG. 1), one or more controller devices (e.g., controller device(s) 1012 of FIG. 10), one or more conveyance device(s) 1004 of FIG. 10 (e.g., the robotic device 111 of FIG. 1, the robotic device 402 of FIGS. 4 and 5), and/or one or more service provider computers (e.g., the service provider computer(s) 1002 of FIG. 10). The operations of method 1500 may be performed in any suitable order. In some embodiments, more or fewer operations are contemplated.

The method may begin at 1502, where a first signal (e.g., FQ1 of FIG. 9, a short-range wireless transmission signal) is received. The first signal may be transmitted by a user device (e.g., the user device 118-1 of FIG. 1) and received by a proximity monitoring engine (e.g., the proximity monitoring engine 916 of FIG. 9). In some embodiments, one or more receiving devices (e.g., the receiving devices 614 and 616 of FIG. 6, the receiving devices 704 of FIG. 7, the receiving devices 804 of FIG. 8) may receive the first signal and communicate an indication of the reception to the proximity monitoring engine. As discussed above, any suitable portion of the proximity monitoring engine may operate at one or more of the receiving devices. In some embodiments, the first signal is transmitted by a transmitter device of the user device (e.g., one of transmitter devices 206 or 207 of FIG. 2, transmitter(s) 1048 of FIG. 10). In some embodiments, the user device being configured to the first signal (e.g., a 125 kHz signal, a short-range wireless transmission signal) and a second signal (e.g., 933 MHz, a longer-range wireless transmission signal). In some embodiments, the first signal has a shorter transmission range than a transmission range associated with the second signal.

At 1504, notification data (e.g., data indicating reception of the first signal) may be transmitted (e.g., periodically, by the proximity monitoring engine 916) to another device (e.g., a controller device such as one or more controller devices 918, 908, 920, and/or 922. Each of the controller devices may be configured to modify motion of a corresponding computing or robotic device in response to receiving the notification data. By way of example, the notification data may indicate an affirmative command to halt processing and/or motion of the computing and/or robotic device. In some embodiments, the computing and/or robotic devices may be configured to remain halted until a new command is received that instructs the computing and/or robotic devices to resume processing and/or motion. As another example, the notification data may be used to suppress processing and/or motion. That is, so long as the notification data is received and another instance of the notification data is received before an expiration of a predefined time period has elapsed, the computing and/or robotic devices may be configured to remain halted. Once the predefined time period has elapsed from the last reception of the notification data, the computing and/or robotic devices may be configured (or may be instructed by their corresponding controller devices) to resume processing and/or motion.

At 1506, it may be determined (e.g., by the proximity monitoring engine 916) that the first signal is no longer being received. By way of example, the user device emitting/transmitting the signal may move out of range of the device that was previously receiving the signal.

At 1508, in response to the determination at 1506, the proximity monitoring engine 916 may execute one or more operations that cause the controller device (e.g., the robot controller 918) to execute additional operations that cause the robotic device (or computing device) to resume motion.

Utilizing the techniques, devices, and device interactions discussed above, the operations for activating the user device may be automated and required before access to the workspace may be granted. This may result in an enhanced user experience and reduce the chance of user error and/or allowing a faulty or deactivated user device to enter the workspace. Additionally, at least one component of the user device can be utilized for multiple purposes such as providing visible feedback of the operational status of the user device as well as providing identification information (e.g., via imperceptible light emissions) that may be used to activate or deactivate the device. By utilizing the described techniques, the efficiency of the system as a whole may be improved as the procedures for activating the user device are simplified with respect to the user. The system may experience increased throughput and improved efficient as a whole by reducing the chance of collisions and/or of introducing faulty user devices within the workspace that might detrimentally modify movements of various components of the workspace. The system may perform operations for prompting the user to deactivate the user device upon exiting the workspace. In some embodiments, a deactivation request can be initiated in a similar manner (e.g., based on emitting imperceptible light emission in proximity of a receiving device at the access point). A similar automated process may be thereafter performed to deactivate the user device. These operations may reduce the chance of user devices operating outside the workspace from affecting the movements of components within the workspace.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
a workspace comprising a robotic device, the robotic device being positioned at a stationary location within the workspace and within a robotic work cell, the robotic work cell being configured with one or more receiving devices that are configured by placement to detect signals from devices located within an area associated with the robotic work cell, the area being identified based at least in part on a distance that is determined to be great enough to account for a corresponding user device traveling at a presumed or known speed toward the robotic device such that the robotic device is able to halt motion completely prior to the corresponding user device reaching the robotic device;
the user device comprising one or more transmitter devices configured to transmit one or more corresponding signals, the one or more corresponding signals being configured to affect movement of devices within the workspace upon receipt;
a controller device configured to control the robotic device; and
a proximity monitoring engine, comprising:
a processor; and
one or more memories having thereon computer-executable instructions that, when executed by the processor, cause the proximity monitoring engine to:
monitor for one or more faults in the one or more receiving devices, wherein detecting a fault based on monitoring causes the proximity monitoring engine to determine whether a sub-area of the area exists in which signals cannot be received and, when the sub-area exists, to transmit an indication of the fault causing the controller device to halt motion of the robotic device;
receive, from the one or more receiving devices, data indicating receipt of a signal corresponding to one of the one or more transmitter devices of the user device;
transmit, to the controller device, notification data that indicates the signal has been received, the controller device being configured to halt motion of the robotic device based at least in part on receipt of the notification data;

determine that the signal is no longer being received by the one or more receiving devices; and
execute one or more operations that causes the robotic device to resume motion.

2. The inventory management system of claim 1, wherein the workspace comprises a plurality of mobile drive units, wherein the one or more corresponding signals transmitted by the one or more transmitter devices of the user device are configured to affect motion of the plurality of mobile drive units upon receipt.

3. The inventory management system of claim 1, wherein the user device is a wearable device.

4. The inventory management system of claim 1, wherein each of the one or more receiving devices comprises two receivers, each of the two receivers being configured to receive one signal of the one or more corresponding signals transmitted by the one or more transmitter devices of the user device.

5. A computer-implemented method performed by a proximity monitoring engine that is associated with a robotic work cell of a workspace, comprising:
monitoring for one or more faults in one or more receiving devices that are placed at respective locations within the robotic work cell to receive signals transmitted by user devices within an area of the robotic work cell, the area being identified based at least in part on a distance that is determined to be great enough to account for a corresponding user device traveling at a presumed or known speed toward the robotic device such that a robotic device of the robotic work cell is able to halt motion completely prior to the corresponding user device reaching the robotic device, wherein detecting a fault in the one or more receiving devices based on the monitoring causes the proximity monitoring engine to determine whether a sub-area of the area exists in which the signals transmitted by other devices cannot be received and, when the sub-area exists, to transmit an indication of the fault causing a controller device of the robotic work cell to halt motion of a robotic device of the robotic work cell;
receiving, by the receiving device that is monitored by the proximity monitoring engine, from the user device, a signal transmitted by a transmitter device of the user device;
transmitting, to the controller device associated with the robotic work cell, notification data that indicates the signal is being received, the controller device being configured to halt motion of the robotic device of the robotic work cell based at least in part on receiving the notification data;
determining, by the proximity monitoring engine, that the signal is no longer being received by the receiving device; and
executing one or more operations that cause the controller device to instruct the robotic device to resume motion.

6. The computer-implemented method of claim 5, wherein executing the one or more operations further comprises halting ongoing transmissions of the notification data to the controller device.

7. The computer-implemented method of claim 5, wherein a receiving device of the one or more receiving devices is associated with a corresponding transmitter, and wherein monitoring for the one or more faults comprises:
transmitting, by the corresponding transmitter, a second signal that simulates the signal transmitted by the transmitter device of the user device; and determining, by the proximity monitoring engine, that the receiving device is not receiving the second signal from the corresponding transmitter.

8. The computer-implemented method of claim 5, wherein the proximity monitoring engine periodically transmits the notification data that indicates the signal is being received while the signal is being received, and wherein the controller device is configured to cause the robotic device to resume motion when a predefined time period has elapsed since the notification data was last received.

9. The computer-implemented method of claim 5, wherein the controller device causes a second device of the robotic work cell to halt motion based at least in part on receipt of the notification data, wherein the second device is separate from the robotic device.

10. The computer-implemented method of claim 5, wherein the robotic device is at least one of a robotic arm or transfer apparatus, the robotic device and transfer apparatus being individually configured to move items from one location to another location within the workspace, while the robotic device and transfer apparatus remained affixed to a stationary location of the workspace.

11. The computer-implemented method of claim 5, wherein the receiving device is one of a plurality of receiving devices that are associated with the robotic work cell, and wherein the controller device is configured to halt motion of the robotic device based at least in part on receiving an corresponding indication that any of the plurality of receiving devices is receiving the signal.

12. A non-transitory computer-readable storage medium storing computer-executable instructions that, when executed by one or more processors of a proximity monitoring engine operating within a robotic work cell of a workspace, causes the proximity monitoring engine to:

monitor for one or more faults in one or more receiving devices that are placed at respective locations of the robotic work cell to detect signals transmitted by user devices within an area, the area being identified based at least in part on a distance that is determined to be great enough to account for a corresponding user device traveling at a presumed or known speed toward a robotic device of the robotic work cell such that the robotic device is able to halt motion completely prior to the corresponding user device reaching the robotic device, wherein detecting a fault based on the monitoring causes the proximity monitoring engine to determine whether a sub-area of the area exists within the robotic work cell in which signals from the user devices cannot be received and, when the sub-area exists, to transmit an indication of the fault causing a controller device of the robotic work cell to halt motion of a robotic device of the robotic work cell;

receive, from the user device via the receiving device, a first signal transmitted by a transmitter device of the user device, the user device being configured to the first signal and a second signal, the first signal having a shorter transmission range than a transmission range associated with the second signal;

periodically transmit, to the controller device while the first signal is being received, notification data that indicates the first signal is being received, the controller device being configured to halt motion of the robotic device of the robotic work cell based at least in part on receiving the notification data;

determine that the first signal is no longer being received; and execute one or more operations that cause the controller device to execute additional operations that cause the robotic device to resume motion.

13. The non-transitory computer-readable storage medium of claim 12, wherein executing the computer-executable instructions further causes the proximity monitoring engine to transmit, to a workspace management module of the workspace, an indication that the robotic device has halted motion, the workspace management module being configured to manage motion of at least one device within the workspace and to identify respective task assignments for a plurality of robotic devices within the workspace, the plurality of robotic devices comprising the robotic device, wherein transmitting the indication to the workspace management module causes the workspace management module to modify a task assignment associated with a second robotic device of the plurality of robotic devices based at least in part on receiving the indication.

14. The non-transitory computer-readable storage medium of claim 12, wherein the first signal is received by a plurality of receiving devices associated with the proximity monitoring engine, and wherein the notification data continues to be periodically transmitted while at least one of the plurality of receiving devices is receiving the first signal transmitted by the user device.

15. The non-transitory computer-readable storage medium of claim 14, wherein the plurality of receiving devices are placed within the workspace according to a predefined configuration that is associated with the robotic work cell.

16. The non-transitory computer-readable storage medium of claim 12, wherein the workspace comprises a second work cell, the second work cell comprising a second robotic device that is different from the robotic device, the second work cell further comprising a second proximity monitoring engine that is configured to cause the second robotic device to halt motion based at least in part on determining that the first signal is being received.

17. The non-transitory computer-readable storage medium of claim 12, wherein the controller device is configured to instruct one or more machine controllers, each of the one or more machine controllers being configured to instruct one or more physical devices comprising the robotic device.

18. The non-transitory computer-readable storage medium of claim 12, wherein the workspace comprises a mobile drive unit that is configured to move to different locations within the workspace, and wherein the mobile drive unit is configured to 1) slow on receipt of the second signal, and 2) halt motion on receipt of the first signal.

19. The non-transitory computer-readable storage medium of claim 13, wherein the robotic device is a first robotic device, and wherein the task assignment associated with the second robotic device assigns the second robotic device to a task associated with repairing the first robotic device.

* * * * *